US011924421B2

(12) United States Patent
Zhang et al.

(10) Patent No.: US 11,924,421 B2
(45) Date of Patent: Mar. 5, 2024

(54) BLENDING METHOD FOR INTER PREDICTION WITH GEOMETRY PARTITION

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

(*) Notice: Subject to any disclaimer, the term of this patent is extended or adjusted under 35 U.S.C. 154(b) by 129 days.

(21) Appl. No.: 17/317,375

(22) Filed: May 11, 2021

(65) Prior Publication Data

US 2021/0266562 A1    Aug. 26, 2021

Related U.S. Application Data

(63) Continuation of application No. PCT/CN2019/120276, filed on Nov. 22, 2019.

(30) Foreign Application Priority Data

Nov. 22, 2018  (WO) ................ PCT/CN2018/116886
Dec. 28, 2018  (WO) ................ PCT/CN2018/124639
(Continued)

(51) Int. Cl.
H04N 19/119    (2014.01)
H04N 19/105    (2014.01)
(Continued)

(52) U.S. Cl.
CPC ......... *H04N 19/119* (2014.11); *H04N 19/105* (2014.11); *H04N 19/139* (2014.11); *H04N 19/176* (2014.11); *H04N 19/52* (2014.11)

(58) Field of Classification Search
CPC .. H04N 19/105; H04N 19/119; H04N 19/139; H04N 19/176; H04N 19/52
See application file for complete search history.

(56) References Cited

U.S. PATENT DOCUMENTS 8,442,109 B2    5/2013  Wang et al.
9,020,030 B2 *  4/2015  Chen ..................... H04N 19/17
                                                348/222.1
(Continued)

FOREIGN PATENT DOCUMENTS

CN    101502119 A    8/2009
CN    101822058 A    9/2010
(Continued)

OTHER PUBLICATIONS

Final Office Action from U.S. Appl. No. 17/115,462 dated Jan. 27, 2022.
(Continued)

*Primary Examiner* — Jeremiah C Hallenbeck-Huber
(74) *Attorney, Agent, or Firm* — Perkins Coie LLP

(57) ABSTRACT

Devices, systems and methods for digital video coding, which includes using default motion candidates for video coding, are described. An exemplary method for video processing includes determining, for a conversion between a block of a video and a bitstream representation of the video, weights to use for a weighted average of prediction samples along an edge of two partitions of the block. The two partitions are generated according to a geometry partition mode, and the weights are selected from a first weighting factor group that at least one of the weights is equal to (Continued)

0 or 1. The method also includes performing the conversion based on the determining.

20 Claims, 58 Drawing Sheets

(30) Foreign Application Priority Data

Feb. 22, 2019 (WO) ................ PCT/CN2019/075856
Mar. 21, 2019 (WO) ................ PCT/CN2019/079061

(51) Int. Cl.
*H04N 19/139* (2014.01)
*H04N 19/176* (2014.01)
*H04N 19/52* (2014.01)

(56) References Cited

U.S. PATENT DOCUMENTS

| | | | |
|---|---|---|---|
| 9,271,006 B2 | 2/2016 | Huang et al. | |
| 9,621,888 B2 | 4/2017 | Jeon et al. | |
| 9,807,424 B2* | 10/2017 | Guo | ........ H04N 19/86 |
| 10,116,941 B2 | 10/2018 | Jeon et al. | |
| 10,178,403 B2 | 1/2019 | Seregin et al. | |
| 10,200,711 B2 | 2/2019 | Li et al. | |
| 10,412,387 B2 | 9/2019 | Pang et al. | |
| 10,516,882 B2 | 12/2019 | He et al. | |
| 10,567,754 B2 | 2/2020 | Li et al. | |
| 10,582,213 B2 | 3/2020 | Li et al. | |
| 10,764,601 B2 | 9/2020 | Xu et al. | |
| 11,128,882 B2 | 9/2021 | Zhang et al. | |
| 11,202,065 B2 | 12/2021 | Zhang et al. | |
| 11,252,405 B2 | 2/2022 | Lee | |
| 11,265,541 B2 | 3/2022 | Zhang et al. | |
| 11,405,613 B2 | 8/2022 | Lee | |
| 11,431,973 B2 | 8/2022 | Zhang et al. | |
| 2011/0200097 A1* | 8/2011 | Chen | ........ H04N 19/513 |
| | | | 375/E7.243 |
| 2011/0200110 A1* | 8/2011 | Chen | ........ H04N 19/615 |
| | | | 375/E7.125 |
| 2011/0200111 A1* | 8/2011 | Chen | ........ H04N 19/137 |
| | | | 375/240.16 |
| 2012/0300850 A1* | 11/2012 | Yie | ........ H04N 19/44 |
| | | | 375/E7.256 |
| 2013/0114717 A1 | 5/2013 | Zheng et al. | |
| 2013/0128974 A1 | 5/2013 | Chien et al. | |
| 2014/0184740 A1 | 7/2014 | Zhang et al. | |
| 2014/0286395 A1 | 9/2014 | Lee et al. | |
| 2014/0307780 A1 | 10/2014 | Cohen et al. | |
| 2015/0271515 A1 | 9/2015 | Pang et al. | |
| 2015/0373358 A1 | 12/2015 | Pang et al. | |
| 2017/0238020 A1 | 8/2017 | Karczewicz et al. | |
| 2017/0332095 A1 | 11/2017 | Zou et al. | |
| 2018/0041778 A1 | 2/2018 | Zhang et al. | |
| 2018/0041779 A1 | 2/2018 | Zhang et al. | |
| 2018/0098063 A1 | 4/2018 | Chen et al. | |
| 2018/0098088 A1 | 4/2018 | Chuang et al. | |
| 2018/0103273 A1* | 4/2018 | Guo | ........ H04N 19/159 |
| 2018/0359483 A1 | 12/2018 | Chen et al. | |
| 2019/0068989 A1 | 2/2019 | Lee | |
| 2019/0200023 A1 | 6/2019 | Hanhart et al. | |
| 2019/0215532 A1 | 7/2019 | He et al. | |
| 2019/0238811 A1 | 8/2019 | Xiu et al. | |
| 2019/0289315 A1 | 9/2019 | Hsiao et al. | |
| 2020/0084441 A1 | 3/2020 | Lee et al. | |
| 2020/0112716 A1 | 4/2020 | Han et al. | |
| 2020/0120334 A1 | 4/2020 | Xu et al. | |
| 2020/0128266 A1* | 4/2020 | Xu | ........ H04N 19/52 |
| 2020/0275093 A1 | 8/2020 | Lin et al. | |
| 2020/0288150 A1 | 9/2020 | Jun et al. | |
| 2020/0359020 A1* | 11/2020 | Ahn | ........ H04N 19/147 |
| 2021/0006787 A1 | 1/2021 | Zhang et al. | |
| 2021/0006788 A1 | 1/2021 | Zhang et al. | |
| 2021/0014499 A1 | 1/2021 | Lee | |
| 2021/0021811 A1 | 1/2021 | Xu et al. | |
| 2021/0051324 A1 | 2/2021 | Zhang et al. | |
| 2021/0092379 A1 | 3/2021 | Zhang et al. | |
| 2021/0112254 A1 | 4/2021 | Ahn | |
| 2021/0321092 A1 | 10/2021 | Zhang et al. | |

FOREIGN PATENT DOCUMENTS

| | | |
|---|---|---|
| CN | 102113326 A | 6/2011 |
| CN | 102668569 A | 9/2012 |
| CN | 102972026 A | 3/2013 |
| CN | 103004198 A | 3/2013 |
| CN | 104054349 A | 9/2014 |
| CN | 104054350 A | 9/2014 |
| CN | 104104963 A | 10/2014 |
| CN | 104160704 A | 11/2014 |
| CN | 104584549 A | 4/2015 |
| CN | 104717513 A | 6/2015 |
| CN | 104885470 A | 9/2015 |
| CN | 104980762 A | 10/2015 |
| CN | 105531999 A | 4/2016 |
| CN | 106416243 A | 2/2017 |
| CN | 106416253 A | 2/2017 |
| CN | 106464905 A | 2/2017 |
| CN | 107079161 A | 8/2017 |
| CN | 107113440 A | 8/2017 |
| CN | 107113446 A | 8/2017 |
| CN | 108141605 A | 6/2018 |
| CN | 108353184 A | 7/2018 |
| CN | 108432250 A | 8/2018 |
| CN | 108462873 A | 8/2018 |
| IN | 201847037087 A | 11/2018 |
| JP | 2011035677 A | 2/2011 |
| WO | 2012097378 A1 | 7/2012 |
| WO | 2013056656 A1 | 4/2013 |
| WO | 2014078068 A1 | 5/2014 |
| WO | 2015106121 A1 | 7/2015 |
| WO | 2015124110 A1 | 8/2015 |
| WO | 2015169200 A1 | 11/2015 |
| WO | 2015180014 A1 | 12/2015 |
| WO | 2016048834 A1 | 3/2016 |
| WO | 2017058633 A1 | 4/2017 |
| WO | 2017076221 A1 | 5/2017 |
| WO | 2017118409 A1 | 7/2017 |
| WO | 2017148345 A1 | 9/2017 |
| WO | 2017192898 A1 | 11/2017 |
| WO | 2017205701 A1 | 11/2017 |

OTHER PUBLICATIONS

Blaser et al. "Geometry-based Partitioning for Predictive Video Coding with Transform Adaptation," PCS 2018, p. 134-138.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4-Related: Modified History-based MVP to Support Parallel Processing," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0106, 2018.

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0368, 2018.

Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

JEM-7.0: https://jvet.hhi.fraunhofer.de/svn/svn_HMJEMSoftware/tags/ HM-16.6-JEM-7.0.

Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0278, 2018.

(56) References Cited

OTHER PUBLICATIONS

"ITU-T H.265 ""High efficiency video coding"" Series H: Audiovisual and Multimedia SYSTEMSInfrastructure of audiovisual services—Coding of movingvideo, Telecommunicationstandardization Sectorof ITU, (Feb. 2018)."

Lee et al. "CE4:Simplification of the Common Base for Affine Merge (Test 4.2.6)," Joint Video Experts Team (JVET) of ITU-T SG 16 WP 3 and ISO/IEC JTC 1/SC 29/WG 11, 12th Meeting, Macau, CN, Oct. 8-12, 2018, document JVET-L0142, 2018.

Li et al. "An Affine Motion Compensation Framework for High Efficiency Video Coding," Dec. 31, 2015, IEEE, pp. 525-528.

Li et al. "An Efficient Four-Parameter Affine Motion Model for Video Coding," IEEE Transactions on Circuits and Systems for Video Technology, Aug. 2018, 28(8):1934-1948.

Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting: Macao, CN, Oct. 3-12, 2018, document JVET-L0124, 2018.

Kwon et al. "AHG5: Fast Encoding Using Early Skipping of Intra Block Copy (IntraBC) Search," Joint Collaborative Team on Video Coding (JCT-VC) of ITU-T SG 16 WP 3 and ISO/IEC JTC 1/SC 29/WG 11, 15th Meeting, Geneva, CH, Oct. 23-Nov. 1, 2013, document JCTVC-O0245, 2013.

Rapaka et al. "Improved Intra Block Copy and Motion Search Methods for Screen Content Coding," Applications of Digital Image Processing, Proc. Of SPIE, vol. 9599, 2015.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

Xu et al. "CE4-Related: Constraint of Pruning in History-based Motion Vector Prediction," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0448, 2018.

Zhang et al. "CE4-Related: History-based Motion Vector Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0104, 2018.

International Search Report and Written Opinion from International Patent Application No. PCT/CN2019/120272 dated Feb. 21, 2020 (10 pages).

International Search Report and Written Opinion from International Patent Application No. PCT/CN2019/120275 dated Mar. 4, 2020 (9 pages).

International Search Report and Written Opinion from International Patent Application No. PCT/CN2019/120276 dated Feb. 3, 2020 (10 pages).

International Search Report and Written Opinion from International Patent Application No. PCT/CN2019/120280 dated Jan. 20, 2020 (12 pages).

International Search Report and Written Opinion from International Patent Application No. PCT/CN2019/128134 dated Mar. 31, 2020 (10 pages).

Non Final Office Action from U.S. Appl. No. 17/115,462 dated Jan. 25, 2021.

Final Office Action from U.S. Appl. No. 17/115,462 dated May 17, 2021.

Non Final Office Action from U.S. Appl. No. 17/358,568 dated May 25, 2022.

Non Final Office Action from U.S. Appl. No. 17/115,462 dated Sep. 24, 2021.

Notice of Allowance from U.S. Appl. No. 17/115,462 dated Jan. 27, 2023.

Non Final Office Action from U.S. Appl. No. 17/115,462 dated Aug. 29, 2022.

Nam et al. "Non-CE8: Block Vector Predictor for IBC," Joint Video Experts Team (JVET) of ITU-T SG 16 WP 3 and ISO/IEC JTC 1/SC 29/WG 1112th Meeting: Macau, CN, Oct. 8-12, 2018, document JVET-L0159, 2018. (cited in CN'201980076712.2 OA1 dated Sep. 27, 2023).

\* cited by examiner

BLENDING METHOD FOR INTER PREDICTION WITH GEOMETRY PARTITION

CROSS REFERENCE TO RELATED APPLICATIONS

This application is a continuation of international No. PCT/CN2019/120276, filed on Nov. 22, 2019, which claims the priority to and benefits of International Patent Application No. PCT/CN2018/116886, filed on Nov. 22, 2018, International Patent Application No. PCT/CN2018/124639, filed on Dec. 28, 2018, International Patent Application No. PCT/CN2019/075856, filed on Feb. 22, 2019 and International Patent Application No. PCT/CN2019/079061, filed on Mar. 21, 2019. For all purposes under the U.S. law, the entire disclosures of the aforementioned applications are incorporated by reference as part of the disclosure of this application.

TECHNICAL FIELD

This patent document relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to default motion candidates for video coding are described. The described methods may be applied to both the existing video coding standards (e.g., High Efficiency Video Coding (HEVC)) and future video coding standards or video codecs.

In one representative aspect, the disclosed technology may be used to provide a method for video processing. This method includes determining, for a conversion between a current block of a video and a bitstream representation of the video, that a six-parameter affine merge candidate is a default motion candidate to be added to a motion candidate list. The default motion candidate is added to the motion candidate list in response to a number of candidates in the motion candidate list being less than a maximum value allowed. The method also includes performing the conversion based on the determining.

In another representative aspect, the disclosed technology may be used to provide a method for video processing. This method includes determining, for a conversion between a current block of a video and a bitstream representation of the video, a reference picture index K of a first default motion candidate that is to be added to a motion candidate list, K being a non-negative integer. The first default motion candidate is added to the motion candidate list in response to a number of candidates in the motion candidate list being less than a maximum value allowed. The method also includes performing the conversion based on the determining.

In another representative aspect, the disclosed technology may be used to provide a method for video processing. This method includes determining, for a conversion between a current block of a video and a bitstream representation of the video, an affine model type of a default motion candidate to be added to a motion candidate list based on available motion candidates of the current block. The default motion candidate is added to the motion candidate list in response to a number of candidates in the motion candidate list being less than a maximum value allowed. The method also includes performing the conversion based on the determining.

In another representative aspect, the disclosed technology may be used to provide a method for video processing. This method includes determining, for a conversion between a current block of a video and a bitstream representation of the video, a default motion candidate for a geometry prediction mode candidate list. The triangular prediction mode partitions the current video block into multiple partitions. The method also includes performing the conversion based on the determining.

In another representative aspect, the disclosed technology may be used to provide a method for video processing. This method includes determining, for a conversion between a current block of a video and a bitstream representation of the video, one or more motion candidates for a geometry partition mode using one or more pairwise average candidates that are obtained by averaging a pair of candidates in a motion candidate list for the current block. The geometry partition mode includes partitioning the current block into multiple partitions. The method also includes performing the conversion based on the determining.

In another representative aspect, the disclosed technology may be used to provide a method for video processing. This method includes determining, for a conversion between a current block of a video and a bitstream representation of the video, a motion candidate for a geometry partition mode based on a first set of temporal blocks and a second set of temporal blocks. The first set of temporal blocks comprises a bottom-right temporal block and a central temporal block that are co-located with the current block, and the second set is different than the first set. The geometry partition mode includes partitioning the current block into multiple partitions. The method also includes performing the conversion based on the determining.

In another representative aspect, the disclosed technology may be used to provide a method for video processing. This method includes determining, for a conversion between a current block of a video and a bitstream representation of the video, whether a motion candidate is excluded from a candidate list based on whether the motion candidate is associated with a first reference picture in a current picture in which the current block is located. The current block is coded with a second reference picture not pointing to the current picture. The method also includes performing the conversion based on the determining.

In another representative aspect, the disclosed technology may be used to provide a method for video processing. This method includes determining, for a conversion between a current block of a video and a bitstream representation of the video, an insertion order of a reference picture List 0 information and a reference picture List 1 information of a bi-prediction merge candidate based on an insertion order used in previously processed block of the video. The method also includes performing the conversion based on the determining.

In another representative aspect, the disclosed technology may be used to provide a method for video processing. This method includes determining, for a conversion between a current block of a video and a bitstream representation of the video, one or more motion candidates for a geometry partition mode based on a size of a regular merge list. The geometry partition mode includes partitioning the current block into multiple partitions. The method also includes performing the conversion based on the determining.

In another representative aspect, the disclosed technology may be used to provide a method for video processing. This method includes determining, for a conversion between a block of a video and a bitstream representation of the video, weights to use for a weighted average of prediction samples along an edge of two partitions of the block. The two partitions are generated according to a geometry partition mode. The weights are selected from a first weighting factor group that at least one of the weights is equal to 0 or 1. The method also includes performing the conversion based on the determining.

In another representative aspect, the disclosed technology may be used to provide a method for video processing. This method includes determining, for a conversion between a block of a video and a bitstream representation of the video, weights to use for a weighted average of prediction samples along an edge of two partitions of the block. The two partitions are generated according to a geometry partition mode. The weights are selected from a first weighting factor group of at least two weighting factor groups based on a characteristic of the block. The method also includes performing the conversion based on the determining.

In another representative aspect, the disclosed technology may be used to provide a method for video processing. This method includes determining, for a conversion between a current block of a video and a bitstream representation of the video using a geometry partition mode, whether to apply a redundancy check for a motion candidate based on a coding condition for the current block. The motion candidate is derived from one or more regular merge candidates for the geometry partition mode. The method also includes performing the conversion based on the determining.

In another representative aspect, the disclosed technology may be used to provide a method for video processing. This method includes determining, for a conversion between a current block of a video and a bitstream representation of the video, whether a geometry partition mode is enabled based on whether a slice comprising the current block is a B slice. The geometry partition mode includes partitioning the current block into multiple partitions. The method also includes performing the conversion based on the determining.

In another representative aspect, the disclosed technology may be used to provide a method for video processing. This method includes inserting, for a conversion between a block of a video and a bitstream representation of the video, at least one past motion candidate in a table of past motion candidates to a motion candidate list. The table of past motion candidates is derived based on past conversions. The method includes determining, after the at least one past motion candidate is inserted, that a motion candidate is not to be added to the motion candidate list. The motion candidate is derived based on the table of past motion candidates. The method also includes performing the conversion based on the motion candidate list.

In another representative aspect, the disclosed technology may be used to provide a method for video processing. This method includes performing, based on a motion candidate, a conversion between a block of a video and a bitstream representation of the video, and determining, based on a coding condition of the conversion, whether a table of past motion candidates derived based on past conversions is to be updated.

In another representative aspect, the disclosed technology may be used to provide a method for video processing. This method includes inserting, for a conversion between a block of a video and a bitstream representation of the video, one or more motion candidates to a candidate list until the candidate list is full. The one or more motion candidates are determined according to a table of past motion candidates derived based on past conversions. The method also includes performing the conversion based on the candidate list.

In another representative aspect, the disclosed technology may be used to provide a method for video processing. This method includes determining, for a conversion between a block of a video and a bitstream representation of the video, an Intra-Block Copy (IBC) candidate list based on a size of a regular merge list that is used for an inter coded block. The IBC represents a technique in which the block is reconstructed based on previously coded samples in a same picture of the block. The method also includes performing the conversion based on the determining.

In another representative aspect, the disclosed technology may be used to provide a method for video processing. This method includes performing a conversion between a block of a video and a bitstream representation of the video. The block is coded with an Intra-Block Copy (IBC) mode, and the bitstream representation comprises an indicator indicating a size of an IBC candidate list for the block. The indicator is always smaller than or equal to P, P being a positive integer. The IBC represents a technique in which the block is reconstructed based on previously coded samples in a same picture of the block.

In another representative aspect, the disclosed technology may be used to provide a method for video processing. This method includes performing a conversion between a block of a video and a bitstream representation of the video. The block is coded with an Intra-Block Copy (IBC) mode, and the bitstream representation comprises an indicator indicating a size of an IBC candidate list for the block. The indicator is always larger than or equal to Q, Q being a non-negative integer. The IBC represents a technique in which the block is reconstructed based on previously coded samples in a same picture of the block.

In another representative aspect, the disclosed technology may be used to provide a method for video processing. This method includes performing a conversion between a block of a video and a bitstream representation of the block. The block is coded with an Intra-Block Copy (IBC) mode, and the bitstream representation comprises an indicator indicating a size of an IBC candidate list. The indicator comprises a difference between the size of the IBC candidate list and an integer value K.

In another representative aspect, the disclosed technology may be used to provide a method for video processing. This method includes determining, for a conversion between a block of a video and a bitstream representation of the video, whether to reset a table of motion candidates derived based on past conversions according to whether an Intra-Block Copy (IBC) mode is enabled. The IBC represents a technique in which the block is reconstructed based on previously coded samples in a same picture. The method also includes performing the conversion based on the determining.

In another representative aspect, the disclosed technology may be used to provide a method for video processing. This method includes identifying a merge candidate to be a default motion candidate, adding, based on the identifying, the merge candidate to a merge candidate list, and reconstructing, based on the merge candidate list, the current video block.

In another representative aspect, the disclosed technology may be used to provide a method for video processing. This method includes deriving a triangular prediction mode (TPM) candidate from a regular motion candidate of a current video block, selectively adding the TPM candidate to a TPM candidate list, and reconstructing, based on the TPM candidate list, the current video block.

In yet another representative aspect, the disclosed technology may be used to provide a method for video processing. This method includes selecting, upon determining that a current video block is a TPM coded block, a weighting factor group, and reconstructing, based on the weighting factor group, the current video block.

In yet another representative aspect, the disclosed technology may be used to provide a method for video processing. This method includes generating pruned TPM candidates by selectively pruning one or more TPM candidates that are derived from a plurality of regular merge candidates, and reconstructing, based on the pruned TPM candidates, a current video block.

In yet another representative aspect, the disclosed technology may be used to provide a method for video processing. This method includes inserting, based on an insertion order, a first plurality of motion candidates from a first list and a second plurality of motion candidates from a second list into a candidate list, wherein the insertion order is based on a previous insertion order of a third plurality of motion candidates into the candidate list, and reconstructing, based on the candidate list, a current video block.

In yet another representative aspect, the disclosed technology may be used to provide a method for video processing. This method includes determining a slice type and a value of a TPM flag in a sequence parameter set (SPS) associated with a current video block, and reconstructing, based on the slice type and the value, the current video block.

In another representative aspect, a method of video processing is disclosed. The method includes controlling, during a conversion between a current video block and a bitstream representation of the current video block, generation of a merge candidate list for an intra coding mode based on a size of a regular merge candidate list; and performing the conversion using the merge candidate list for the intra coding mode.

In another example aspect, another method of video processing is disclosed. The method includes performing, for a history based motion vector predictor (HMVP) table for a conversion between a current video block and a bitstream representation of the current video block, a reset operation at a boundary of a video region in which an intra coding mode is enabled, wherein the current video block is a part of the video region; and performing the conversion using the HMVP table In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 16 shows an example of motion vector storage.

FIG. 25 shows an example of intra-picture block copy.

DETAILED DESCRIPTION

Figure 1:
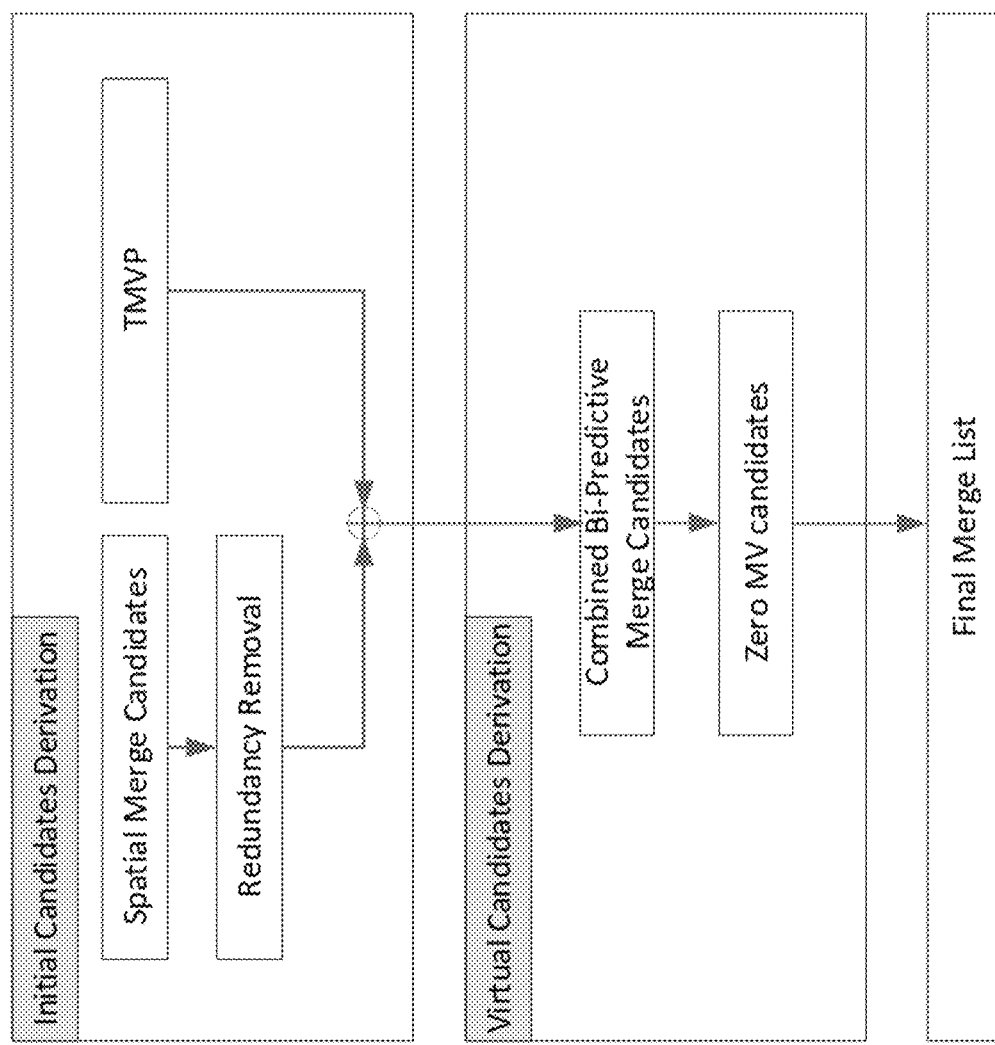
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1 Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference picture index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
   Step 1.1: Spatial candidates derivation
   Step 1.2: Redundancy check for spatial candidates
   Step 1.3: Temporal candidates derivation
Step 2: Additional candidates insertion
   Step 2.1: Creation of bi-predictive candidates
   Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
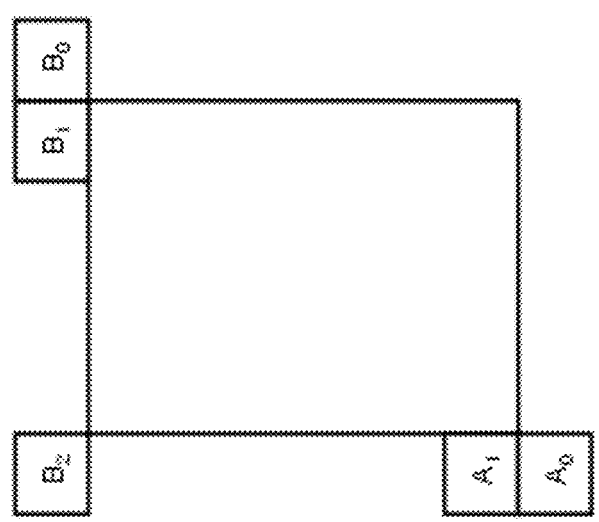
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
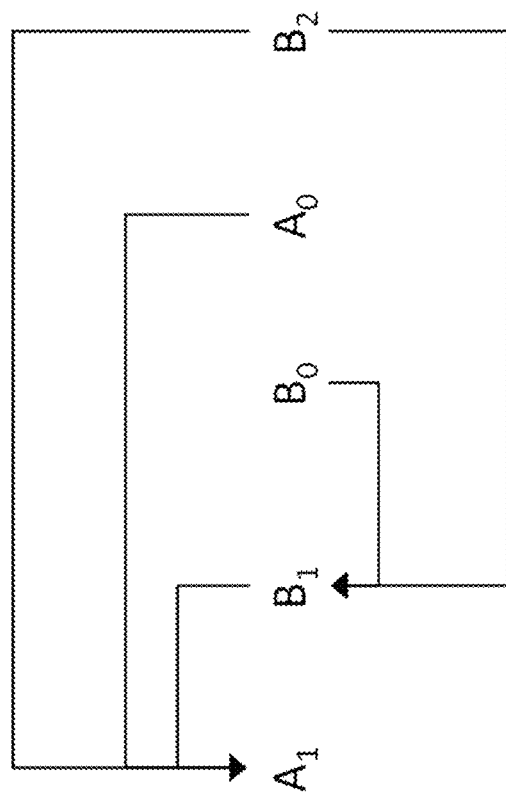
FIG. 3 shows an example of candidate pairs subject to a redundancy check of spatial merge candidates.
Figure 4B:
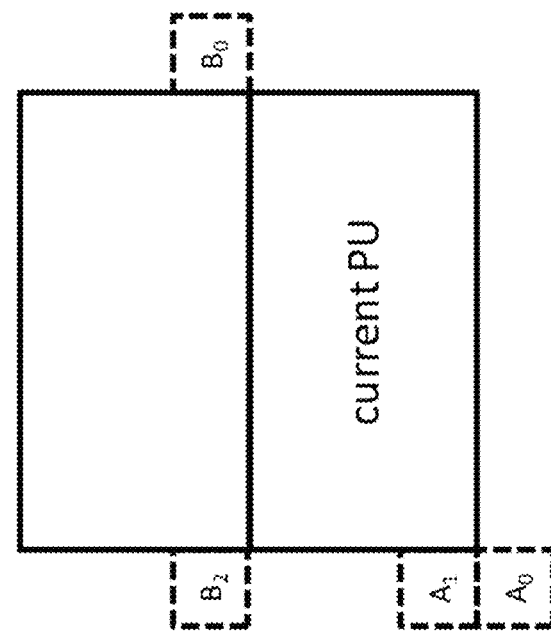
FIGS. 4A and 4B show examples of the position of a second prediction unit (PU) based on the size and shape of the current block.
Figure 4A:
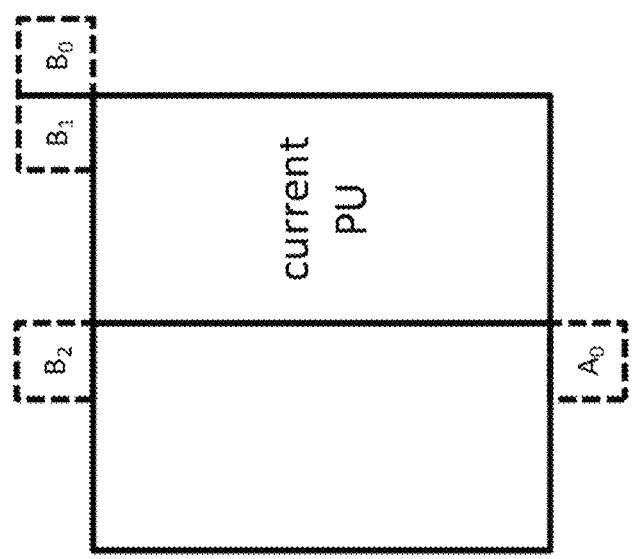

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "secondPU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
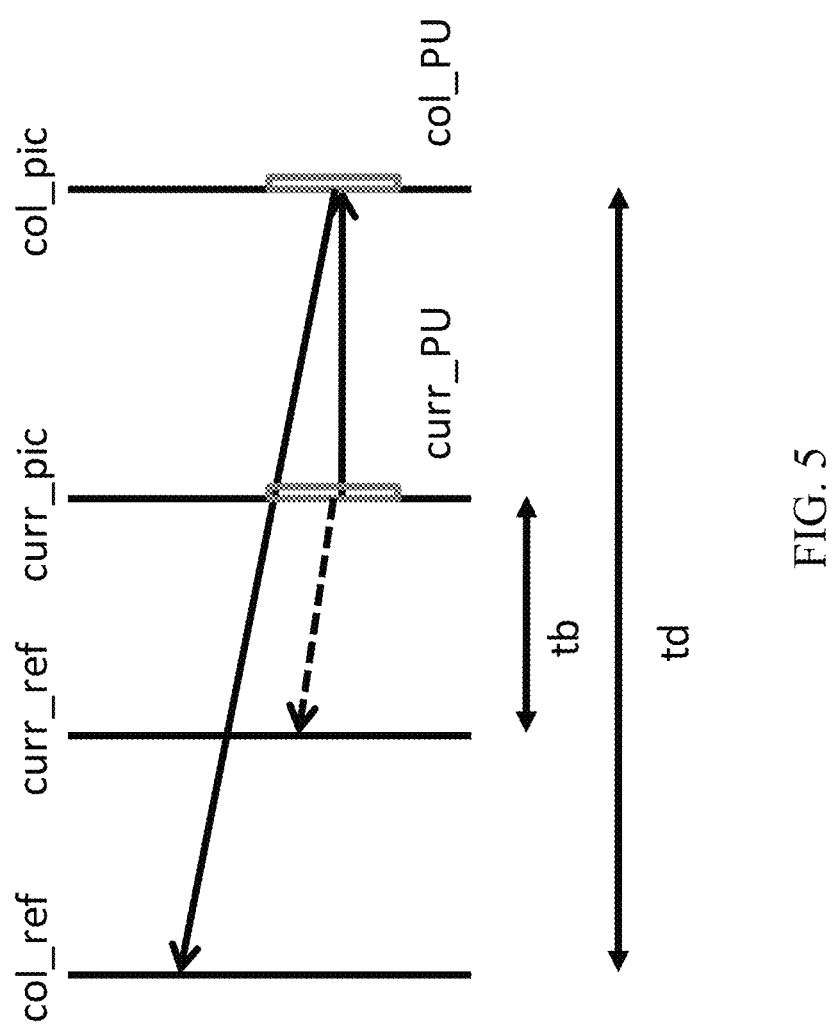
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
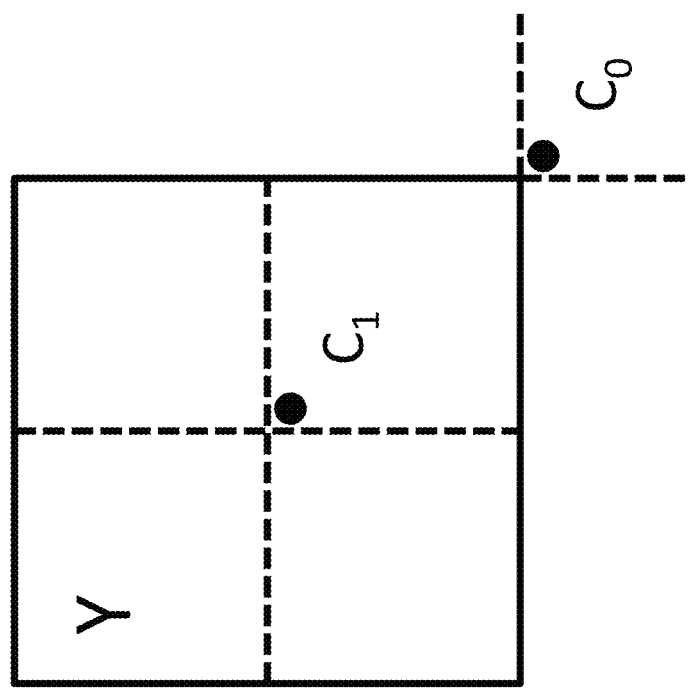
FIG. 6 shows an example of candidate positions for temporal merge candidates.

In the co-located PU (Y) belonging to the reference frame, the position for the temporal candidate is selected between candidates Co and Ci, as depicted in FIG. 6. If PU at position Co is not available, is intra coded, or is outside of the current CTU, position Ci is used. Otherwise, position Co is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
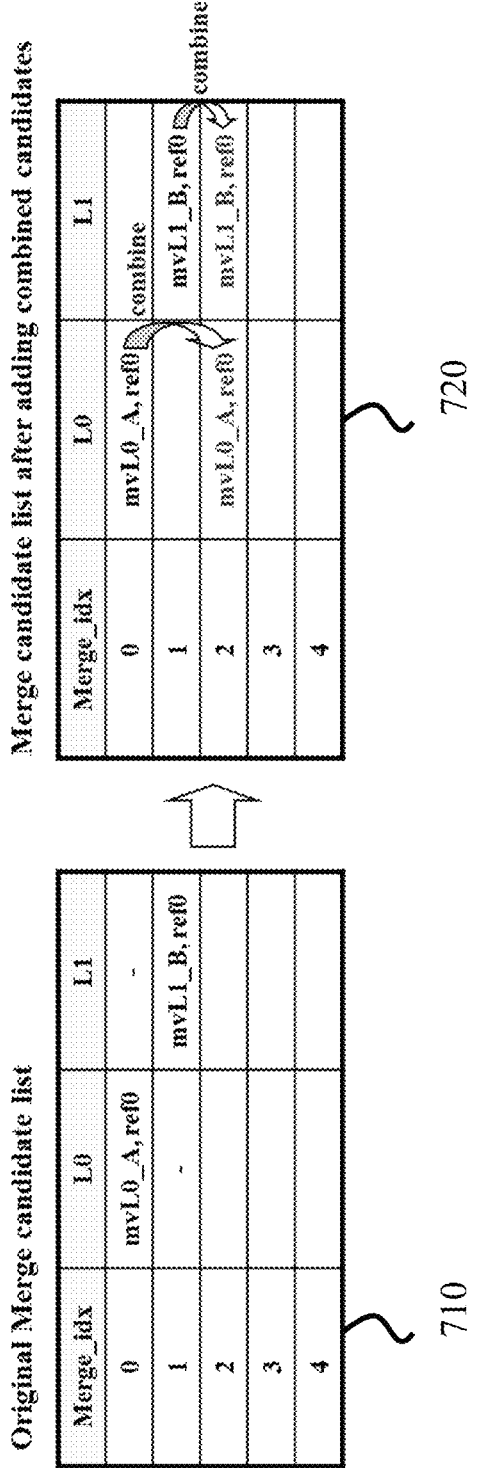
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

In some embodiments, the following steps are performed in order till the merge list is full:

(1) Set variable numRef to either number of reference picture associated with list 0 for P slice, or the minimum number of reference pictures in two lists for B slice;

(2) Add non-repeated zero motion candidates:

For variable i being 0 . . . numRef−1, add a default motion candidate with MV set to (0, 0) and reference picture index set to i for list 0 (if P slice), or for both lists (if B slice).

(3) Add repeated zero motion candidates with MV set to (0, 0), reference picture index of list 0 set to 0 (if P slice) and reference picture indices of both lists set to 0 (if B slice).

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Deriving AMVP Candidates

Figure 8:
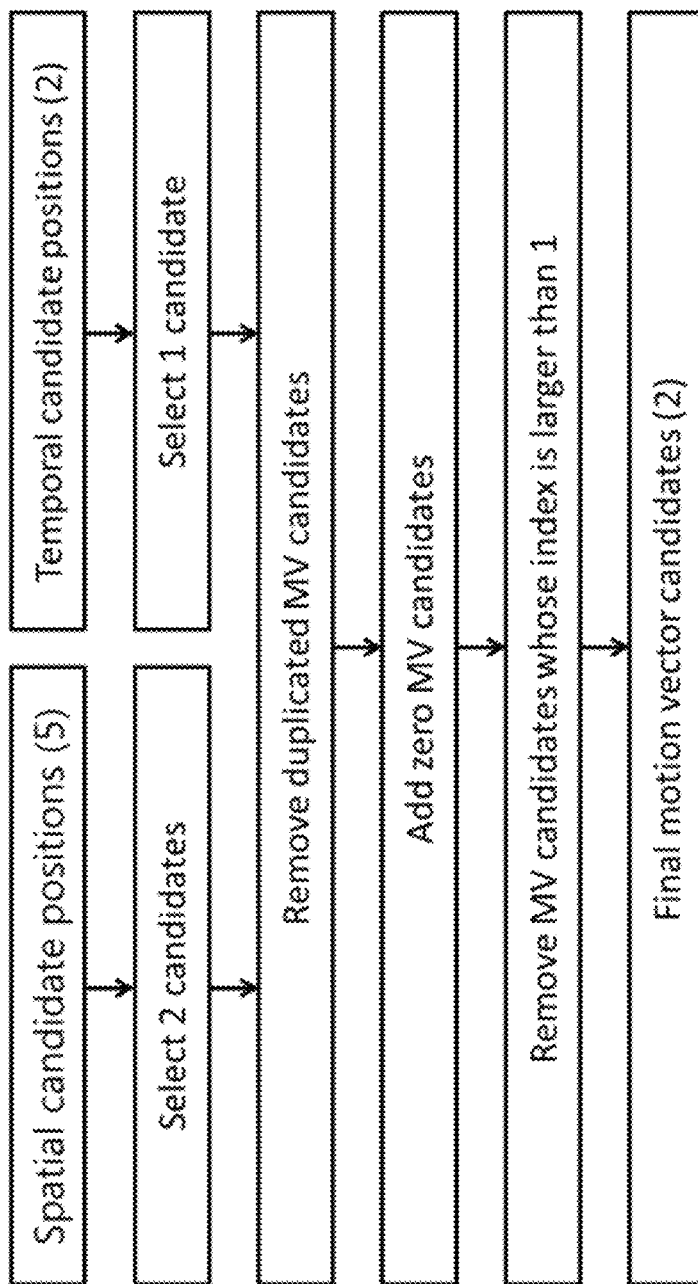
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
  (1) Same reference picture list, and same reference picture index (same POC)
  (2) Different reference picture list, but same reference picture (same POC)

Spatial scaling
  (3) Same reference picture list, but different reference picture (different POC)
  (4) Different reference picture list, and different reference picture (different POC)

The no-spatial-scaling cases are checked first followed by the cases that allow spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
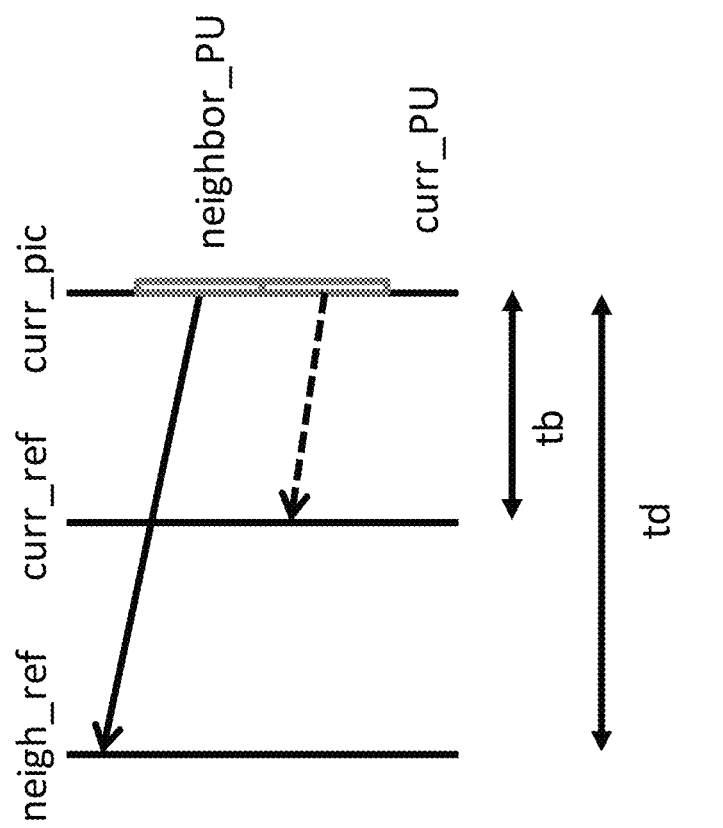
FIG. 9 shows an example of motion vector scaling for spatial motion vector candidates.

As shown in the example in FIG. 9, for the spatial scaling case, the motion vector of the neighboring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
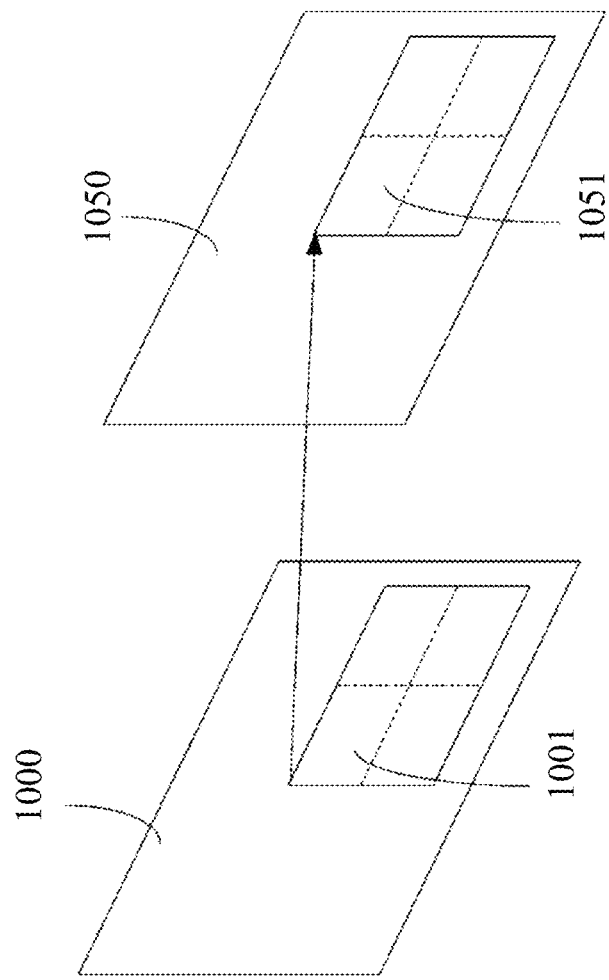
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference picture index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

2.1.2 Examples of Spatial-Temporal Motion Vector Prediction (STMVP)

Figure 11:
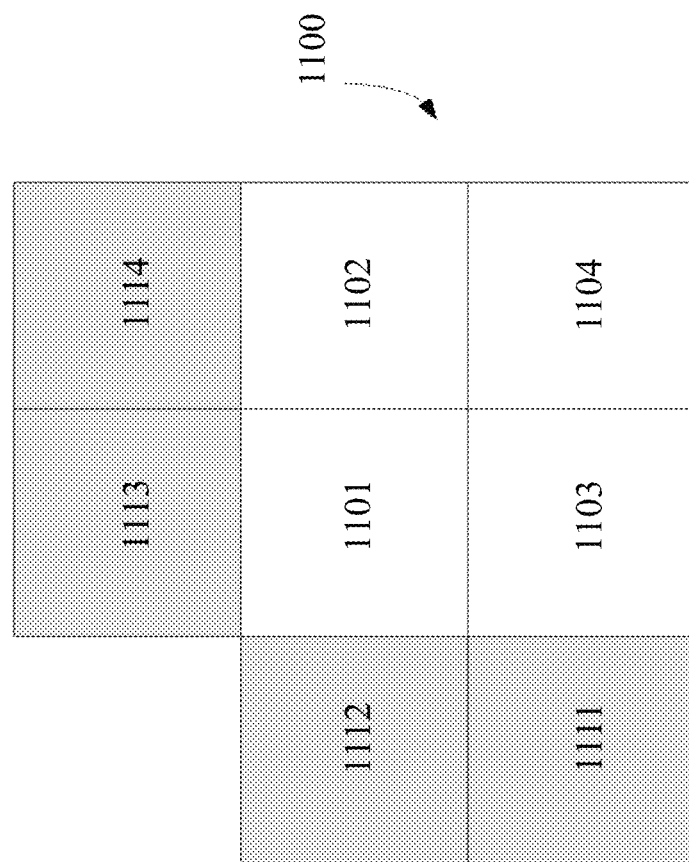
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Example of Inter Prediction Methods in VVC

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.2.1 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD component, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
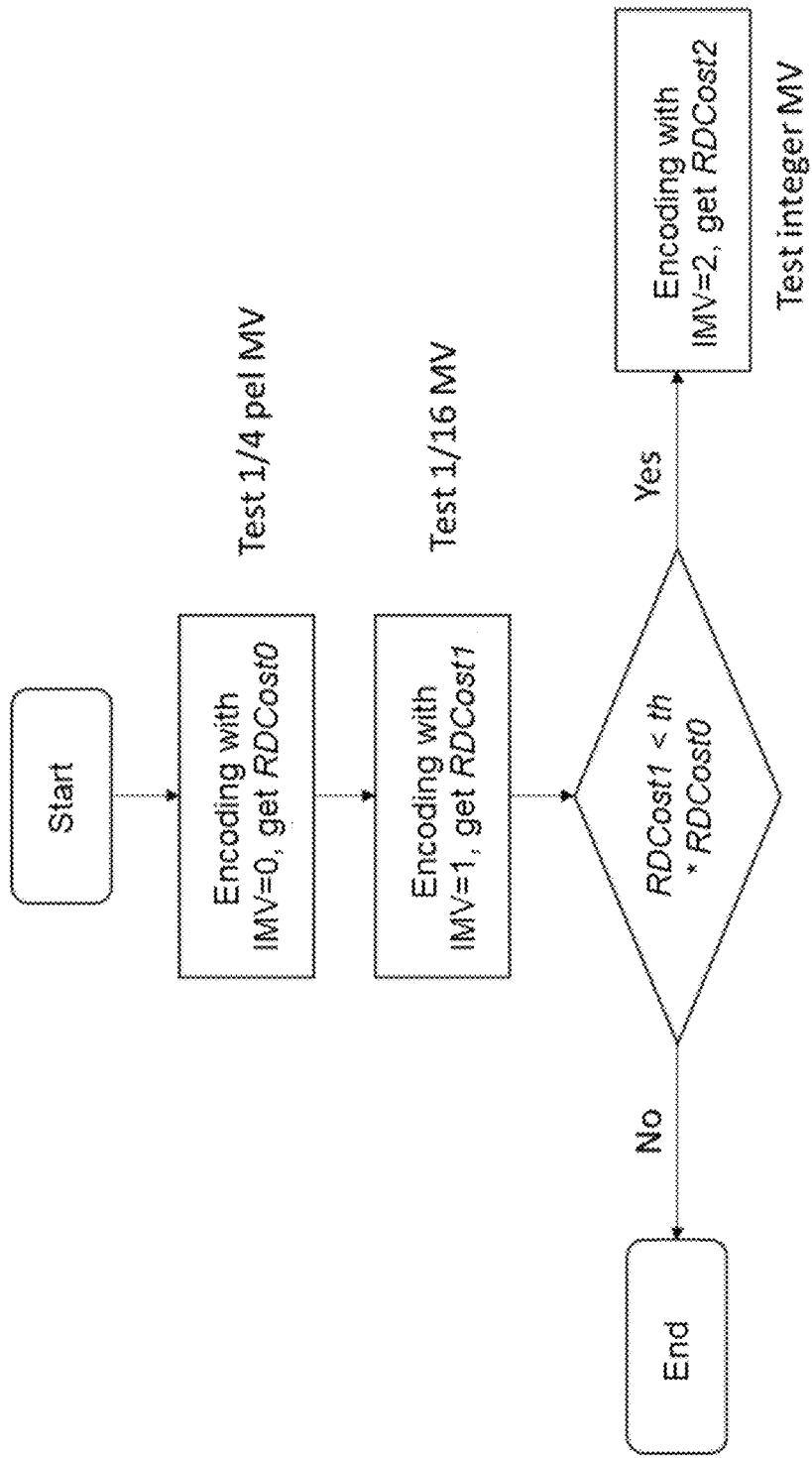
FIG. 12 shows an example flowchart for encoding with different MV precisions.

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive valued threshold), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.2.2 Example of the Triangular Prediction Unit Mode

Figures 13A, 13B:
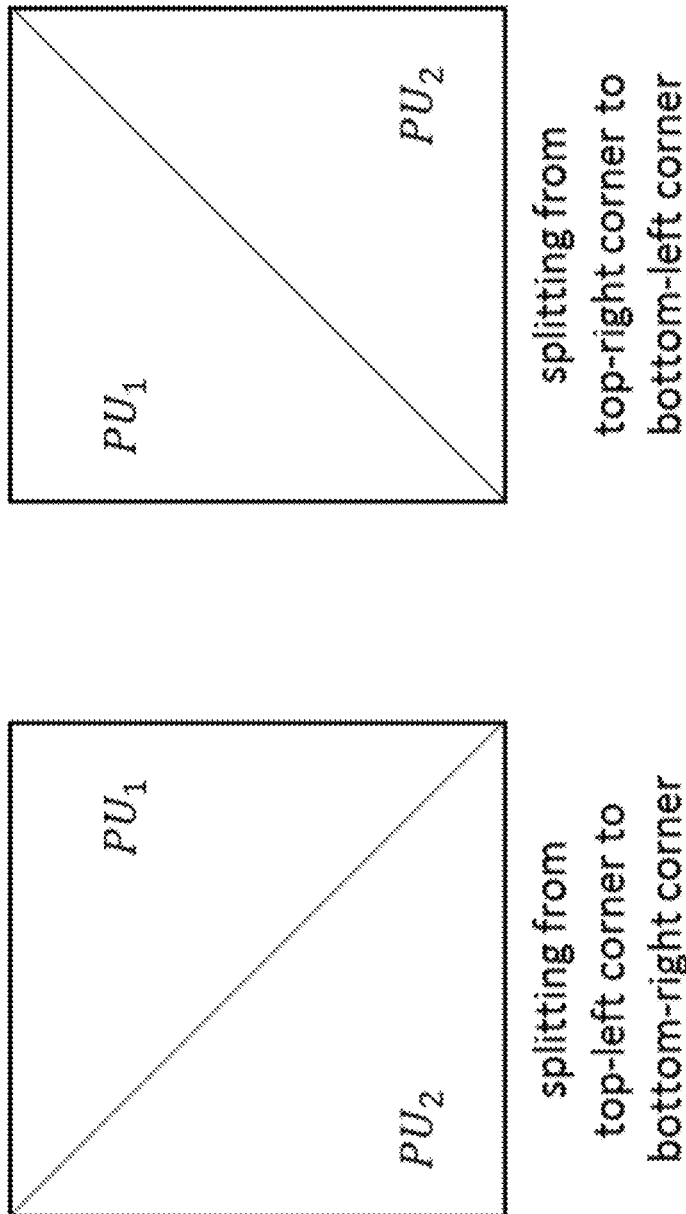
FIGS. 13A and 13B show examples of splitting a coding unit (CU) into two triangular prediction units (PUs).

The concept of the triangular prediction unit mode is to introduce a new triangular partition for motion compensated prediction. As shown in FIGS. 13A and 13B, the triangular prediction unit mode splits a CU into two triangular prediction units, in either diagonal or inverse diagonal direction. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

Uni-prediction candidate list for TPM

Figure 14:
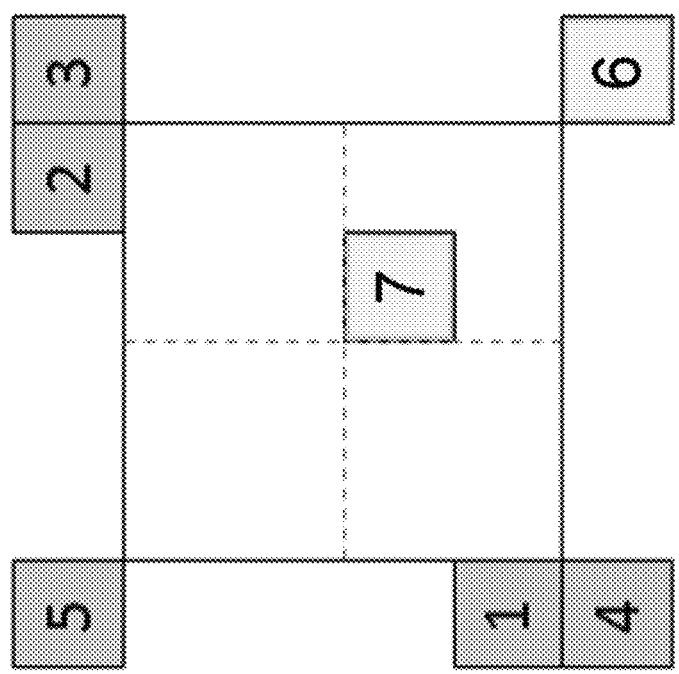
FIG. 14 shows an example of the positions of neighboring blocks.

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 14. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:

1) Obtain regular motion candidates from $A_1$, $B_1$, $B_0$, $A_0$, $B_2$, Col and Col2 (corresponding to block 1-7 in FIG. 14) without any pruning operations.
2) Set variable numCurrMergeCand=0
3) For each regular motion candidates derived from $A_1$, $B_1$, $B_0$, $A_0$, $B_2$, Col and Col2 and numCurrMergeCand is less than 5, if the regular motion candidate is uni-prediction (either from List 0 or List 1), it is directly added to the merge list as an TPM candidate with numCurrMergeCand increased by 1. Such a TPM candidate is named 'originally uni-predicted candidate'.

Full pruning is applied.

4) For each motion candidates derived from $A_1$, $B_1$, $B_0$, $A_0$, $B_2$, Col and Col2 and numCurrMergeCand is less than 5, if the regular motion candidate is bi-prediction, the motion information from List 0 is added to the TPM merge list (that is, modified to be uni-prediction from List 0) as a new TPM candidate and numCurrMergeCand increased by 1. Such a TPM candidate is named 'Truncated List0-predicted candidate'.

Full pruning is applied.

5) For each motion candidates derived from $A_1$, $B_1$, $B_0$, $A_0$, $B_2$, Col and Col2 and numCurrMergeCand is less than 5, if the regular motion candidate is bi-prediction, the motion information from List 1 is added to the TPM merge list (that is, modified to be uni-prediction from List 1) and numCurrMergeCand increased by 1. Such a TPM candidate is named 'Truncated List1-predicted candidate'.

Full pruning is applied.

6) For each motion candidates derived from $A_1$, $B_1$, $B_0$, $A_0$, $B_2$, Col and Col2 and numCurrMergeCand is less than 5, if the regular motion candidate is bi-prediction, If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the TPM merge list, such a TPM candidate is called averaged uni-prediction from List 1 motion candidate and numCurrMergeCand increased by 1.

Full pruning is applied.

7) If numCurrMergeCand is less than 5, zero motion vector candidates are added.

When inserting a candidate to the list, if it has to be compared to all previously added candidates to see whether it is identical to one of them, such a process is called full pruning.

Adaptive Weighting Process

After predicting each triangular prediction unit, an adaptive weighting process is applied to the diagonal edge between the two triangular prediction units to derive the final prediction for the whole CU. Two weighting factor groups are listed as follows:

1st weighting factor group: {7/8, 6/8, 4/8, 2/8, 1/8} and {7/8, 4/8, 1/8} are used for the luminance and the chrominance samples, respectively; and $2^{nd}$ weighting factor group: {7/8, 6/8, 5/8, 4/8, 3/8, 2/8, 1/8} and {6/8, 4/8, 2/8} are used for the luminance and the chrominance samples, respectively.

Figure 15:
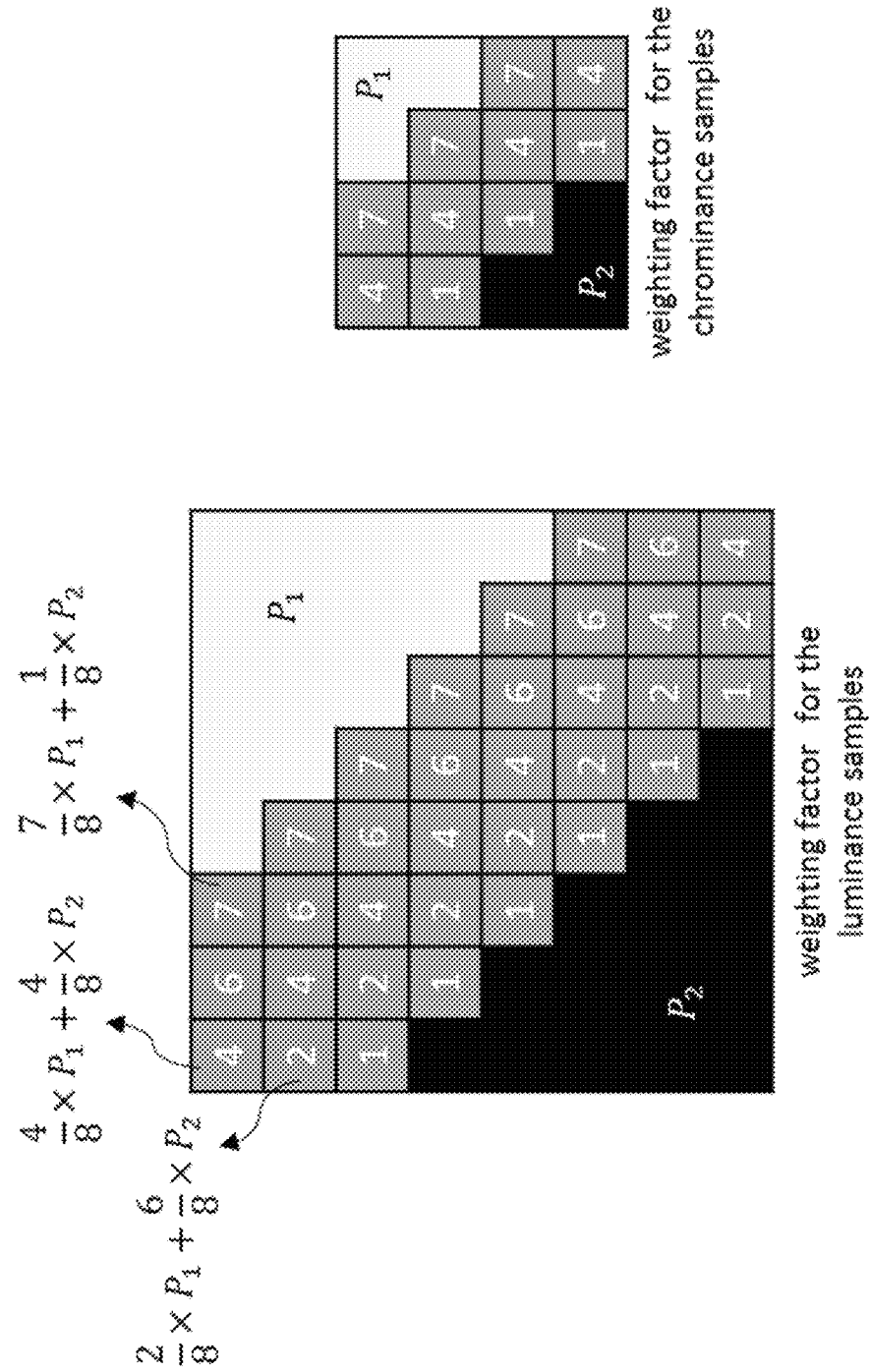
FIG. 15 shows an example of a CU applying the $1^{st}$ weighting factor group.

One weighting factor group is selected based on the comparison of the motion vectors of two triangular prediction units. The $2^{nd}$ weighting factor group is used when the reference pictures of the two triangular prediction units are different from each other or their motion vector difference is larger than 16 pixels. Otherwise, the $1^{st}$ weighting factor group is used. An example of applying the 1st weighting factor group is shown in FIG. 15.

Motion Vector Storage

Figure 16:
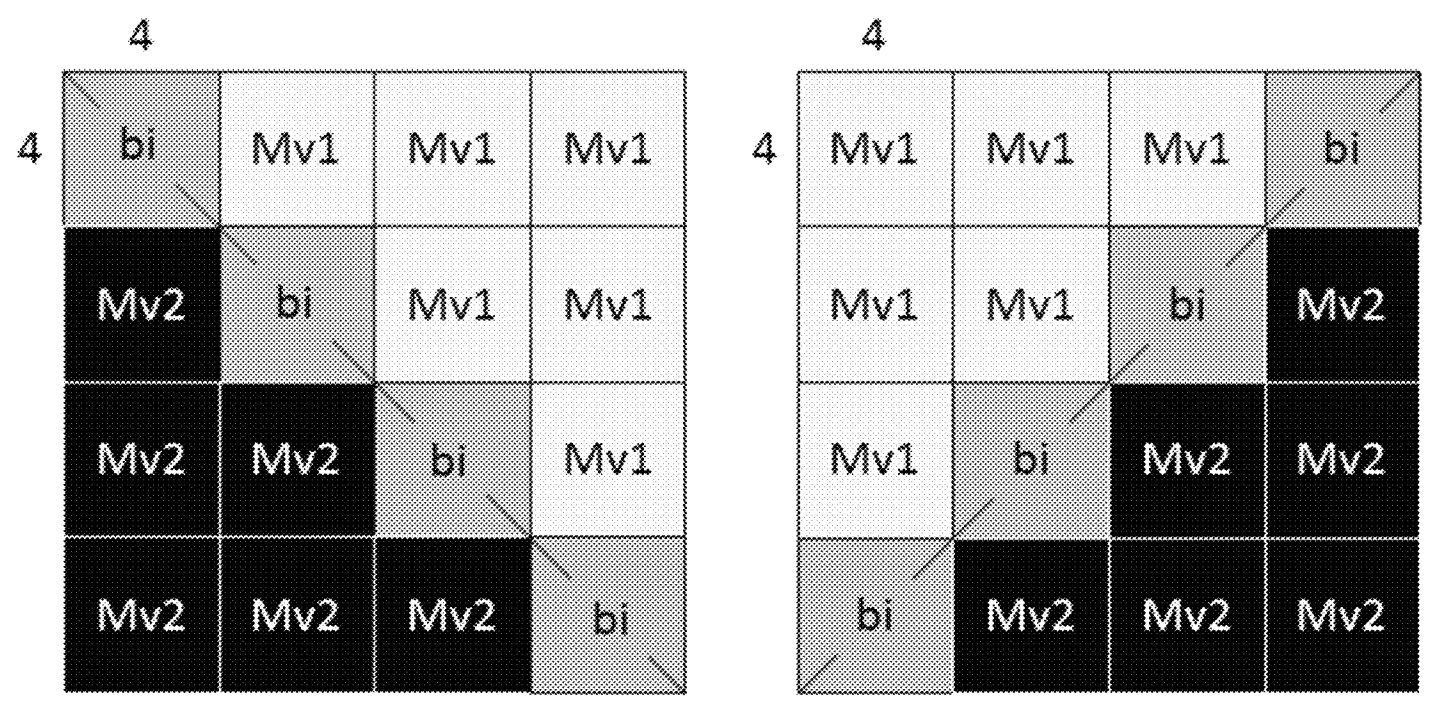

The motion vectors (Mv1 and Mv2 in FIG. 16) of the triangular prediction units are stored in 4×4 grids. For each 4×4 grid, either uni-prediction or bi-prediction motion vector is stored depending on the position of the 4×4 grid in the CU. As shown in FIG. 16, uni-prediction motion vector, either Mv1 or Mv2, is stored for the 4×4 grid located in the non-weighted area. On the other hand, a bi-prediction motion vector is stored for the 4×4 grid located in the weighted area. The bi-prediction motion vector is derived from Mv1 and Mv2 according to the following rules:

1) In the case that Mv1 and Mv2 have motion vector from different directions (L0 or L1), Mv1 and Mv2 are simply combined to form the bi-prediction motion vector.
2) In the case that both Mv1 and Mv2 are from the same L0 (or L1) direction:
2a) If the reference picture of Mv2 is the same as a picture in the L1 (or L0) reference picture list, Mv2 is scaled to the picture. Mv1 and the scaled Mv2 are combined to form the bi-prediction motion vector.
2b) If the reference picture of Mv1 is the same as a picture in the L1 (or L0) reference picture list, Mv1 is scaled to the picture. The scaled Mv1 and Mv2 are combined to form the bi-prediction motion vector.
2c) Otherwise, only Mv1 is stored for the weighted area.

Signaling of Triangular Prediction Mode (TPM)

One bit flag to indicate whether TPM is used may be firstly signaled. Afterwards, the indications of two splitting patterns (as depicted in FIGS. 13A and 13B), and selected merge indices for each of the two partitions are further signaled.

Signaling of TPM Flag

Denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

Figure 17:
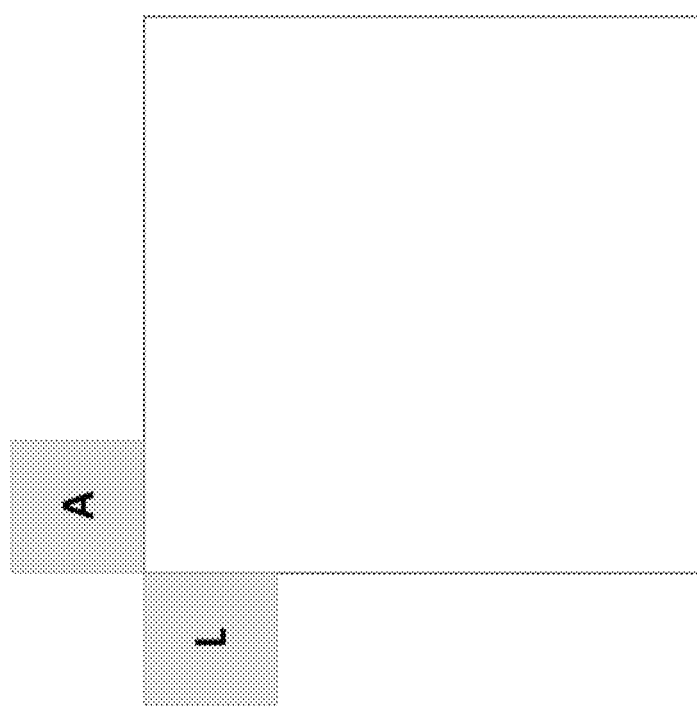
FIG. 17 shows an example of neighboring block used for context selection in triangular prediction mode (TPM) flag coding.

The flag is coded with 3 contexts, in view of FIG. 17, and based on the following equation:

Ctx index=((left block $L$ available && $L$ is coded with TPM?)1:0)+((Above block $A$ available && $A$ is coded with TPM?)1:0);

Signaling an indication of two splitting patterns and selected merge indices

It is noted that splitting patterns (as shown in FIGS. 13A and 13B), merge indices of two partitions are jointly coded. In some embodiments, it is restricted that the two partitions couldn't use the same reference picture index. Therefore, there are 2 (splitting patterns)*N (maximum number of merge candidates)*(N−1) possibilities wherein N is set to 5. One indication is coded and the mapping between the splitting patterns, two merge indices and coded indication are derived from the array defined below:

const uint8_t g_TriangleCombination[TRIANGLE_MAX_NUM_CANDS][3]={{0, 1, 0}, {1, 0, 1}, {1, 0, 2}, {0, 0, 1}, {0, 2, 0}, {1, 0, 3}, {1, 0, 4}, {1, 1, 0}, {0, 3, 0}, {0, 4, 0}, {0, 0, 2}, {0, 1, 2}, {1, 1, 2}, {0, 0, 4}, {0, 0, 3}, {0, 1, 3}, {0, 1, 4}, {1, 1, 4}, {1, 1, 3}, {1, 2, 1}, {1, 2, 0}, {0, 2, 1}, {0, 4, 3}, {1, 3, 0}, {1, 3, 2}, {1, 3, 4}, {1, 4, 0}, {1, 3, 1}, {1, 2, 3}, {1, 4, 1}, {0, 4, 1}, {0, 2, 3}, {1, 4, 2}, {0, 3, 2}, {1, 4, 3}, {0, 3, 1}, {0, 2, 4}, {1, 2, 4}, {0, 4, 2}, {0, 3, 4}};

splitting patterns (45 degree or 135 degree)=g_TriangleCombination[signaled indication][0];

Merge index of candidate A=g_TriangleCombination[signaled indication][1];

Merge index of candidate B=g_TriangleCombination[signaled indication][2];

Once the two motion candidates A and B are derived, the two partitions' (PU1 and PU2) motion information could be set either from A or B. Whether PU1 uses the motion information of merge candidate A or B is dependent on the prediction directions of the two motion candidates. Table 1 shows the relationship between two derived motion candidates A and B, with the two partitions.

TABLE 1

Derivation of partitions' motion information from derived two merge candidates (A, B)

| Prediction direction of A | Prediction direction of B | PU1's motion information | PU2's motion information |
| --- | --- | --- | --- |
| L0 | L0 | A (L0) | B (L0) |
| L1 | L1 | B (L1) | A (L1) |
| L0 | L1 | A (L0) | B (L1) |
| L1 | L0 | B (L0) | A (L1) |

Entropy Coding of the Indication (Denoted by merge_triangle_idx)

merge_triangle_idx is within the range [0, 39], inclusively. K-th order Exponential Golomb (EG) code is used for binarization of merge_triangle_idx wherein K is set to 1.

K-th Order EG

To encode larger numbers in fewer bits (at the expense of using more bits to encode smaller numbers), this can be generalized using a nonnegative integer parameter k. To encode a nonnegative integer x in an order-k exp-Golomb code:

(1) Encode $\lfloor x/2^k \rfloor$ using order-0 exp-Golomb code described above, then
(2) Encode x mod $2^k$ in binary

TABLE 2

Exp-Golomb-k coding examples

| x | k = 0 | k = 1 | k = 2 |
| --- | --- | --- | --- |
| 0 | 1 | 10 | 100 |
| 1 | 010 | 11 | 101 |
| 2 | 011 | 0100 | 110 |
| 3 | 00100 | 0101 | 111 |
| 4 | 00101 | 0110 | 01000 |
| 5 | 00110 | 0111 | 01001 |
| 6 | 00111 | 001000 | 01010 |
| 7 | 0001000 | 001001 | 01011 |
| 8 | 0001001 | 001010 | 01100 |
| 9 | 0001010 | 001011 | 01101 |
| 10 | 0001011 | 001100 | 01110 |
| 11 | 0001100 | 001101 | 01111 |
| 12 | 0001101 | 001110 | 0010000 |
| 13 | 0001110 | 001111 | 0010001 |
| 14 | 0001111 | 00010000 | 0010010 |
| 15 | 000010000 | 00010001 | 0010011 |
| 16 | 000010001 | 00010010 | 0010100 |
| 17 | 000010010 | 00010011 | 0010101 |
| 18 | 000010011 | 00010100 | 0010110 |
| 19 | 000010100 | 00010101 | 0010111 |

2.2.3 Examples of Affine Motion Compensation Prediction

Figure 18A:
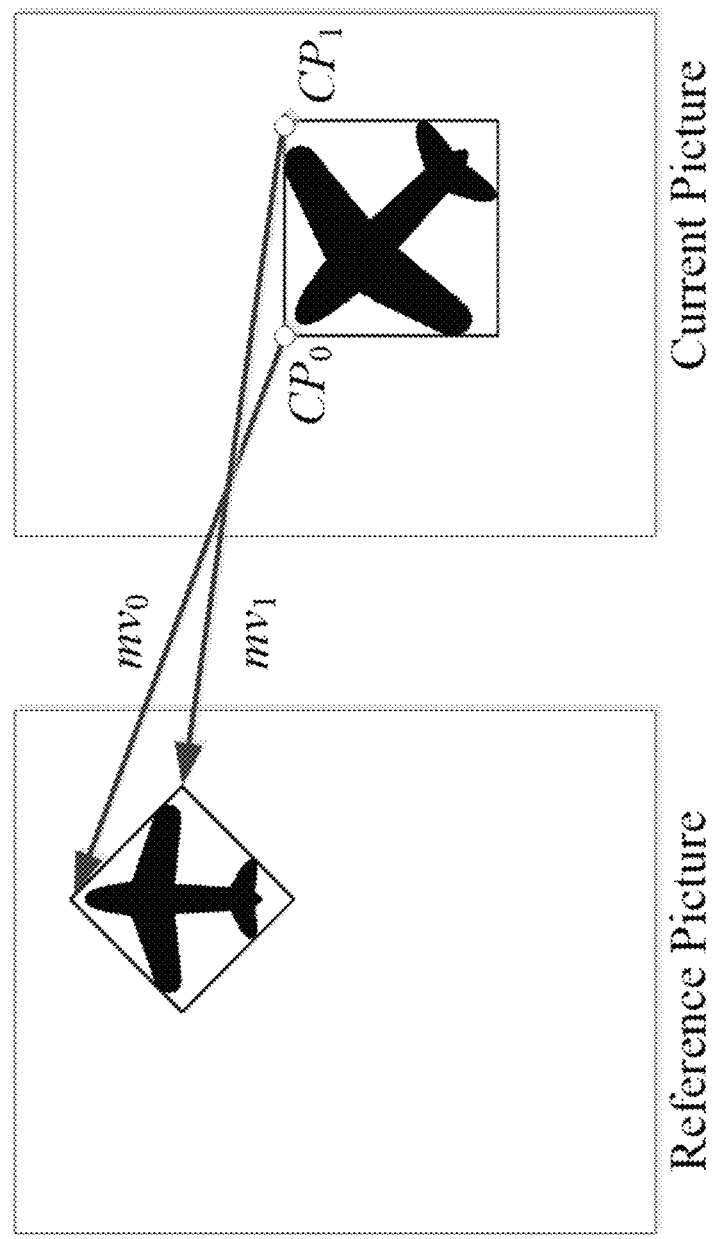
FIGS. 18A and 18B show examples of the simplified 4-parameter affine model and the simplified 6-parameter affine model, respectively.
Figure 18B:
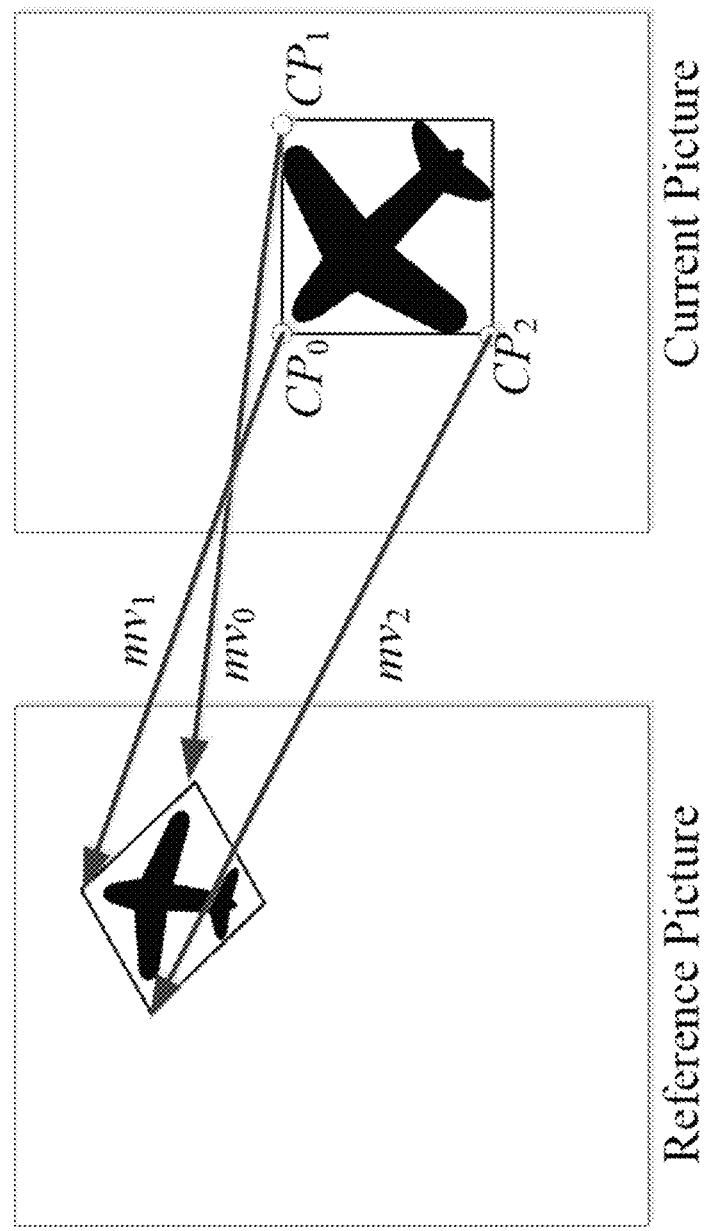

In HEVC, only a translation motion model is applied for motion compensation prediction (MCP). However, the camera and objects may have many kinds of motion, e.g. zoom in/out, rotation, perspective motions, and/or other irregular motions. In VVC, a simplified affine transform motion compensation prediction is applied with 4-parameter affine model and 6-parameter affine model. As shown in FIGS. 18A and 18B, the affine motion field of the block is described by two (in the 4-parameter affine model that uses the variables a, b, e and f) or three (in the 6-parameter affine model that uses the variables a, b, c, d, e and f) control point motion vectors, respectively.

The motion vector field (MVF) of a block is described by the following equation with the 4-parameter affine model and 6-parameter affine model respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad \text{Eq. (1)}$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad \text{Eq. (2)}$$

Herein, $(mv^h_0, mv^h_0)$ is motion vector of the top-left corner control point (CP), and $(mv^h_1, mv^h_1)$ is motion vector of the top-right corner control point and $(mv^h_2, mv^h_2)$ is motion vector of the bottom-left corner control point, (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (e.g., 4×4 in VTM), the representative point is utilized to derive the motion vector for the whole sub-block.

Figure 19:
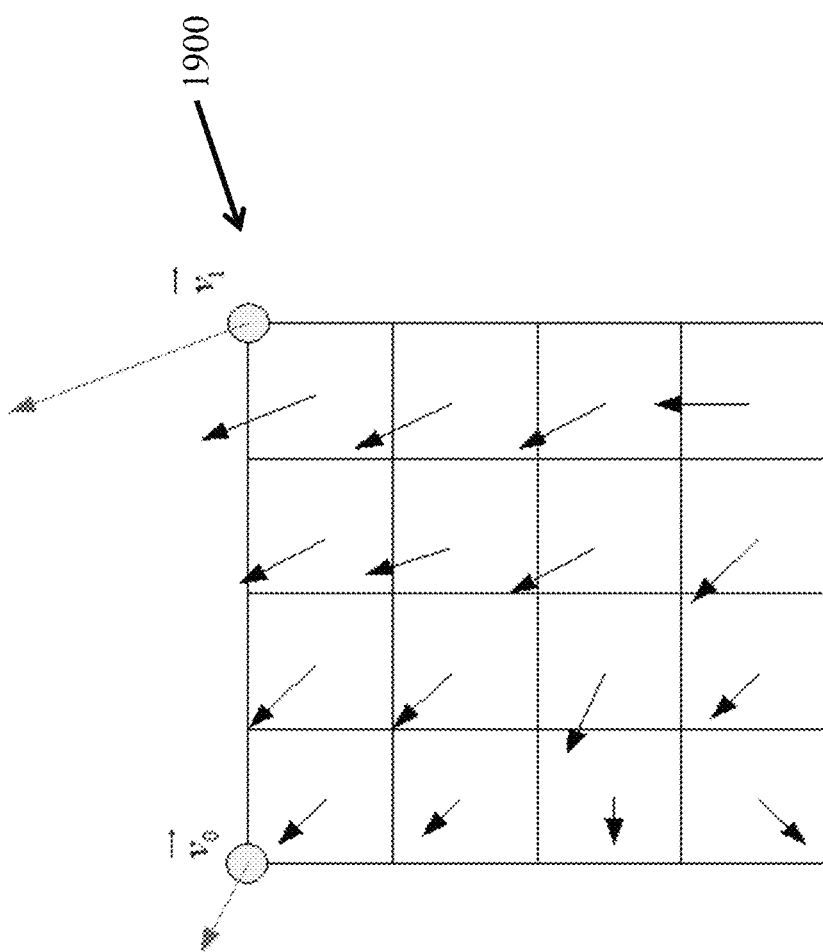
FIG. 19 shows an example of an affine motion vector field (MVF) per sub-block.

FIG. 19 shows an example of affine MVF per sub-block for a block 1900, wherein in order to further simplify the motion compensation prediction, sub-block based affine transform prediction is applied. To derive motion vector of each M×N sub-block, the motion vector of the center sample of each sub-block can be calculated according to Eqs. (1) and (2), and rounded to the motion vector fraction accuracy (e.g., 1/16 in JEM). Then the motion compensation interpolation filters can be applied to generate the prediction of each sub-block with derived motion vector. The interpolation filters for 1/16-pel are introduced by the affine mode. After the MCP, the high accuracy motion vector of each sub-block is rounded and saved as the same accuracy as the normal motion vector.

2.2.4 Examples for Signaling of Affine Prediction

Similar to the translational motion model, there are also two modes for signaling the side information due affine prediction. They are AFFINE_INTER and AFFINE_MERGE modes.

2.2.5 Examples of AF_INTER Mode

For CUs with both width and height larger than 8, AF_INTER mode can be applied. An affine flag in CU level is signaled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 22) and the estimated CPMVs are signalled. In addition, the index of affine AMVP candidate from which the estimated CPMVs are derived is further signalled.

1) Inherited affine motion predictors

Figure 21:
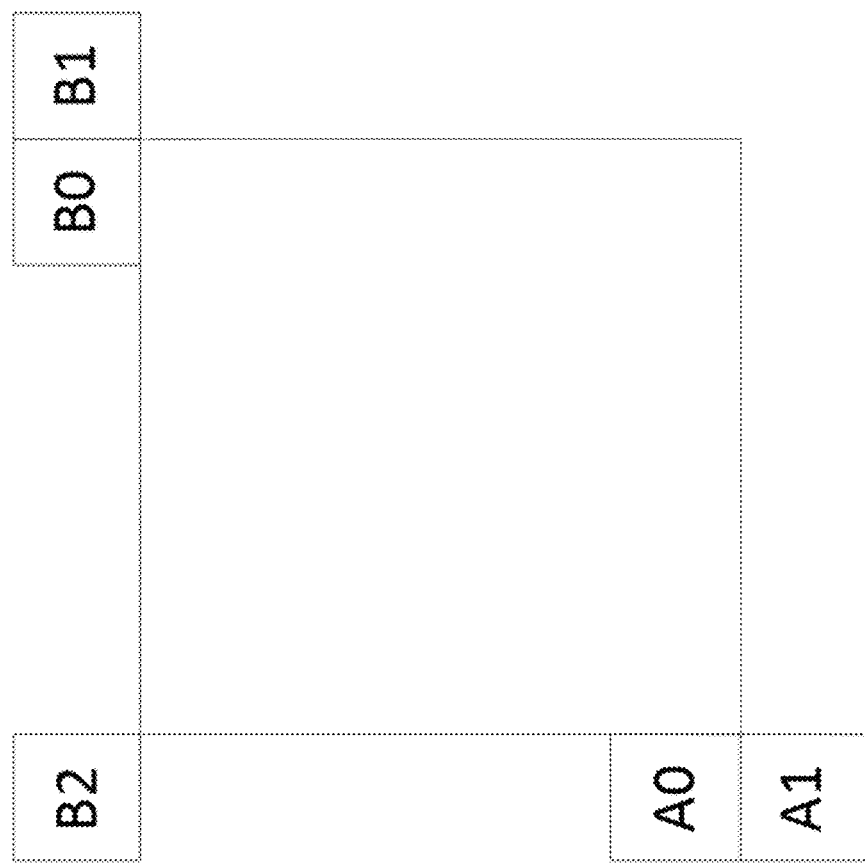
FIG. 21 shows an example of motion vector prediction for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 21.

Figure 23A:
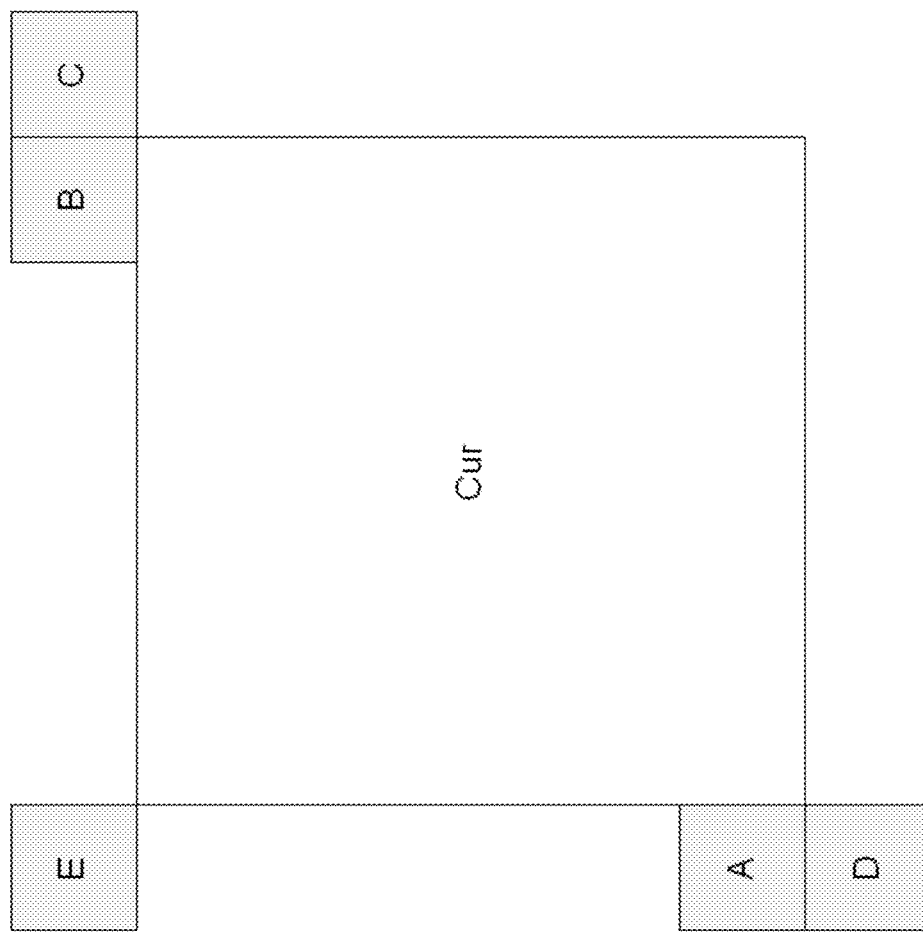
FIGS. 23A and 23B show example candidates for the AF_MERGE affine motion mode.
Figure 23B:
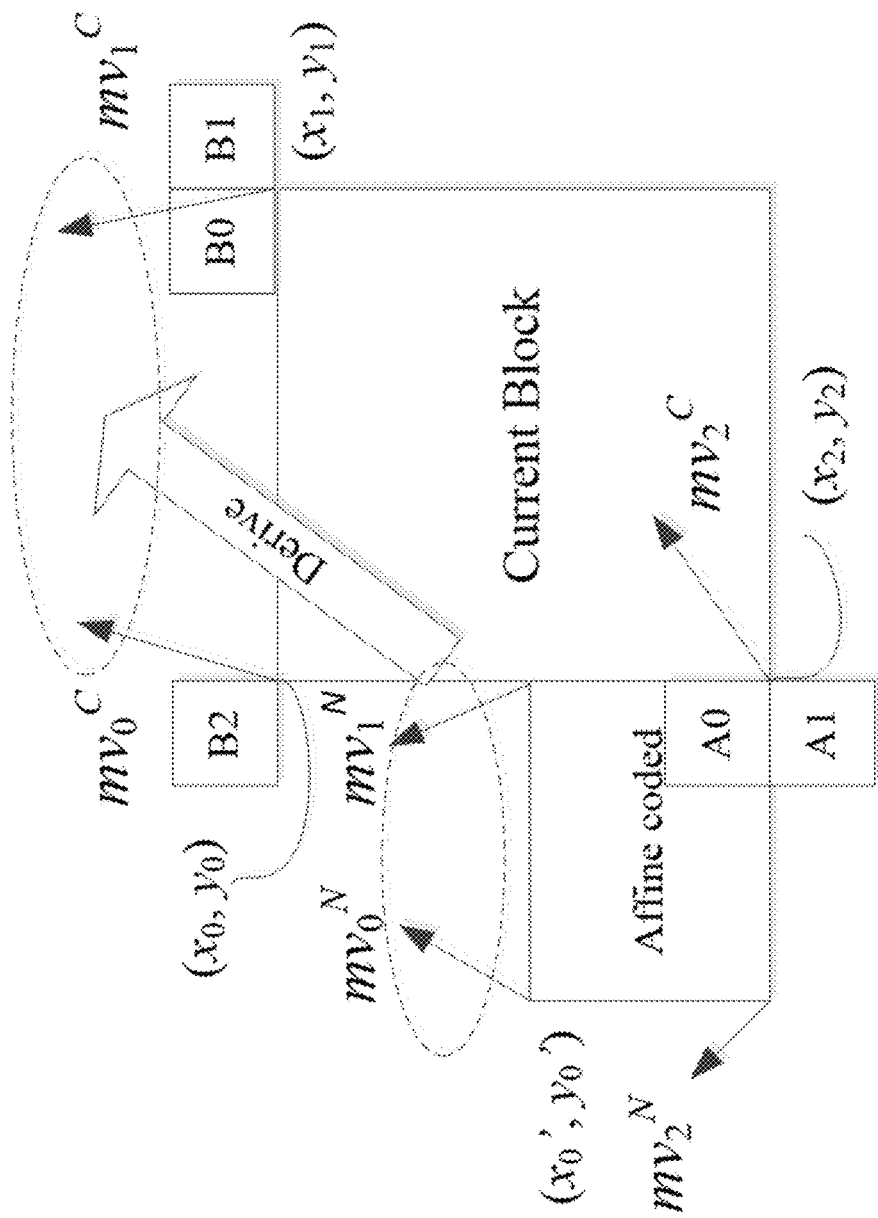

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 23B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed affine motion predictors

Figure 22:
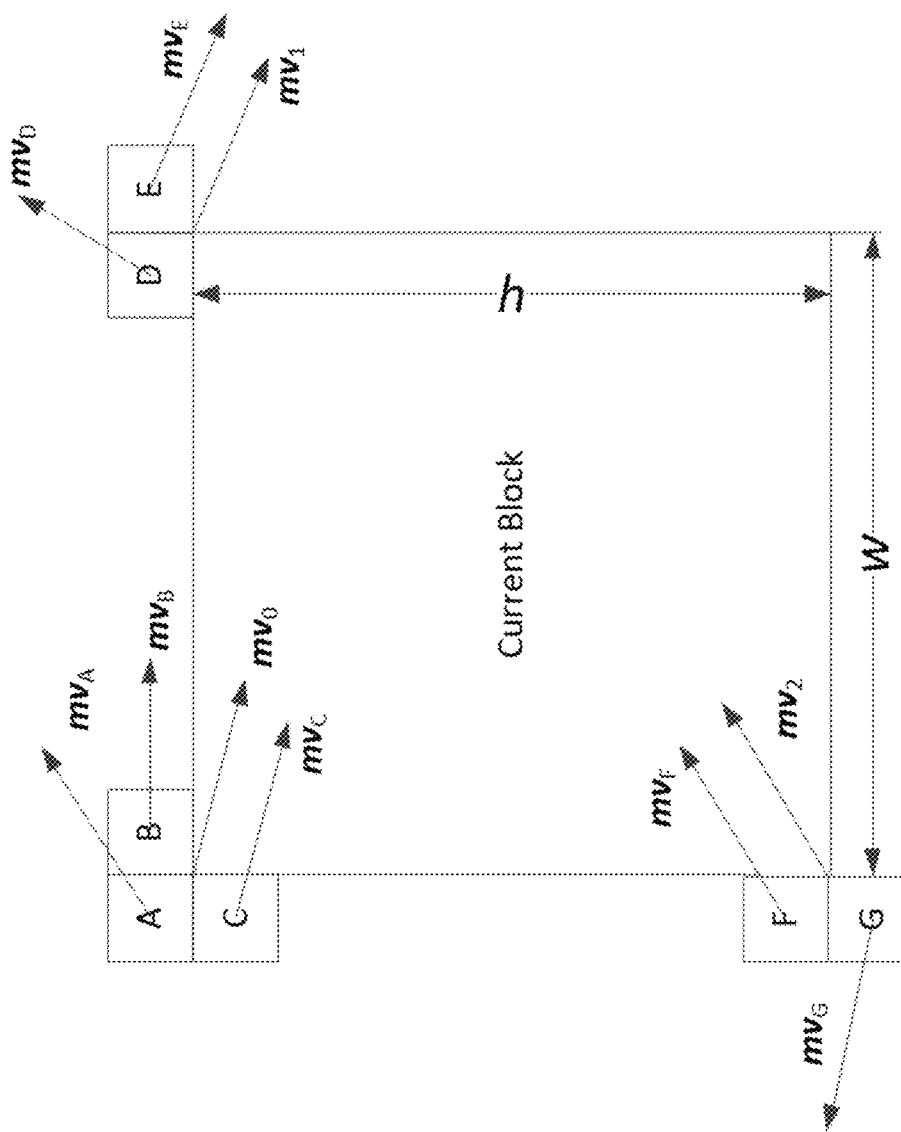
FIG. 22 shows an example of motion vector prediction for AF_INTER for constructed affine candidates.

A constructed affine motion predictor consists of control-point motion vectors (CPMVs) that are derived from neighboring inter coded blocks, as shown in FIG. 22, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

- If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

- If the current affine motion model is 6-parameter affine, then a constructed affine motion predictor is inserted into the candidate list only if $mv_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP motion predictors

The following applies until the number of affine motion predictors reaches the maximum.

4) Derive an affine motion predictor by setting all CPMVs equal to $\overline{mv}_2$ if available.
    5) Derive an affine motion predictor by setting all CPMVs equal to $\overline{mv}_1$ if available.
    6) Derive an affine motion predictor by setting all CPMVs equal to $\overline{mv}_0$ if available.
    7) Derive an affine motion predictor by setting all CPMVs equal to HEVC TMVP if available.
    8) Derive an affine motion predictor by setting all CPMVs to zero MV.

Note that $\overline{mv}_i$ is already derived in constructed affine motion predictor.

Figure 20B:
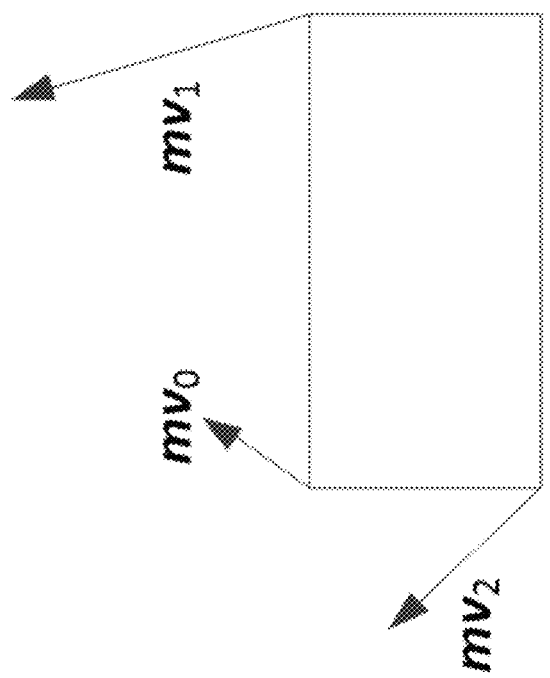
FIGS. 20A and 20B show examples of the 4-parameter and 6-parameter affine models, respectively.
Figure 20A:
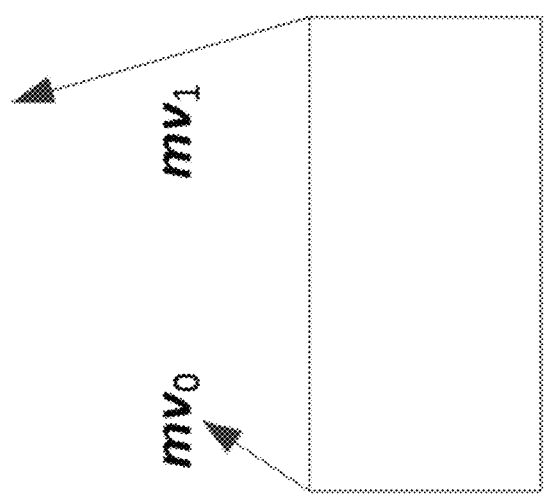

In AF_INTER mode, when 4/6 parameter affine mode is used, ⅔ control points are required, and therefore ⅔ MVD needs to be coded for these control points, as shown in FIGS. 20A and 20B. In an existing implementation, the MV may be derived as follows, e.g., it predicts $mvd_1$ and $mvd_2$ from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Herein, $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 20B. In some embodiments, the addition of two motion vectors (e.g., mvA(xA, yA) and mvB(xB, yB)) is equal to summation of two components separately. For example, newMV=mvA+mvB implies that the two components of newMV are set to (xA+xB) and (yA+yB), respectively.

2.2.6 Examples of AF_MERGE Mode

When a CU is applied in AF_MERGE mode, it gets the first block coded with an affine mode from the valid neighboring reconstructed blocks. And the selection order for the candidate block is from left, above, above right, left bottom to above left as shown in FIG. 23A (denoted by A, B, C, D, E in order). For example, if the neighbour left bottom block is coded in affine mode as denoted by A0 in FIG. 23B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU v0 and v1 are computed according to the affine motion model in Eqs. (1) and (2), the MVF of the current CU can be generated. In order to identify whether the current CU is coded with AF_MERGE mode, an affine flag can be signaled in the bitstream when there is at least one neighboring block is coded in affine mode.

In some embodiments, an affine merge candidate list may be constructed with following steps:

1) Insert Inherited Affine Candidates

Figure 24:
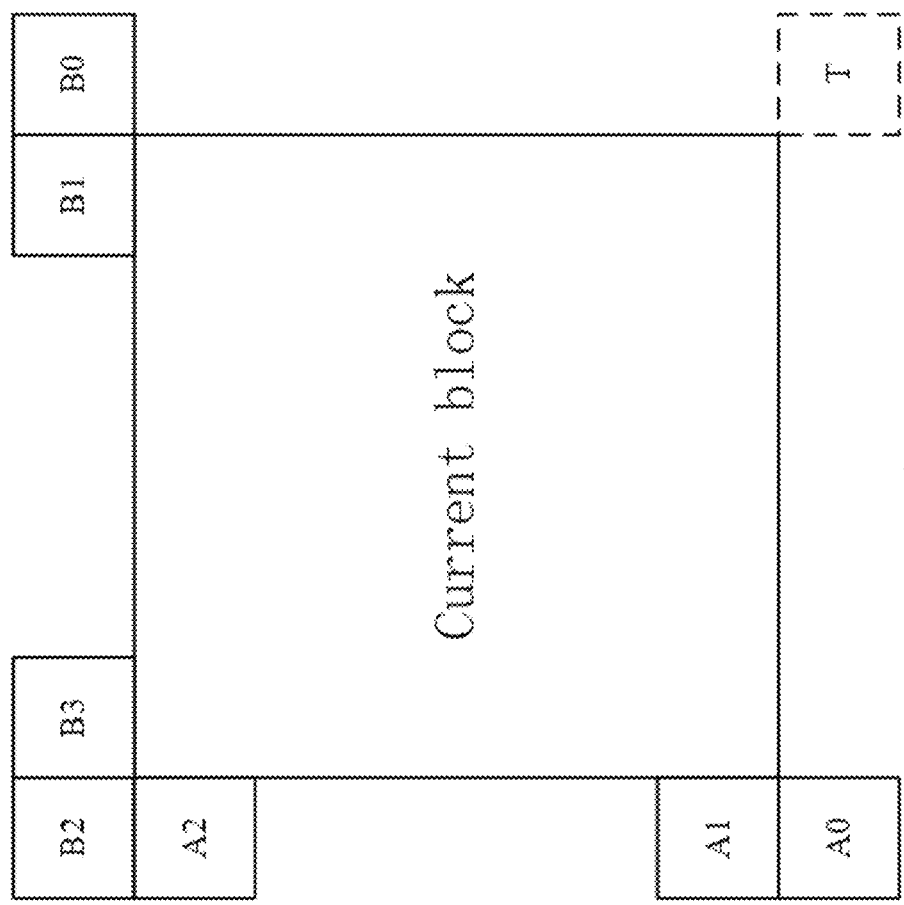
FIG. 24 shows an example of candidate positions for affine merge mode.

Inherited affine candidate means that the candidate is derived from the affine motion model of its valid neighbor affine coded block. In the common base, as shown in FIG. 24, the scan order for the candidate positions is: A1, B1, B0, A0 and B2.

After a candidate is derived, full pruning process is performed to check whether same candidate has been inserted into the list. If a same candidate exists, the derived candidate is discarded.

2) Insert Constructed Affine Candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 24. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with Zero Motion Vectors

If the number of candidates in affine merge candidate list is less than 5, zero motion vectors with zero reference indices are insert into the candidate list, until the list is full.

In some embodiments, for the sub-block merge candidate list, a 4-parameter merge candidate with MVs set to (0, 0) and prediction direction set to uni-prediction from list 0 (for P slice) and bi-prediction (for B slice).

2.3 Examples of Current Picture Referencing (CPR)

Figure 25:
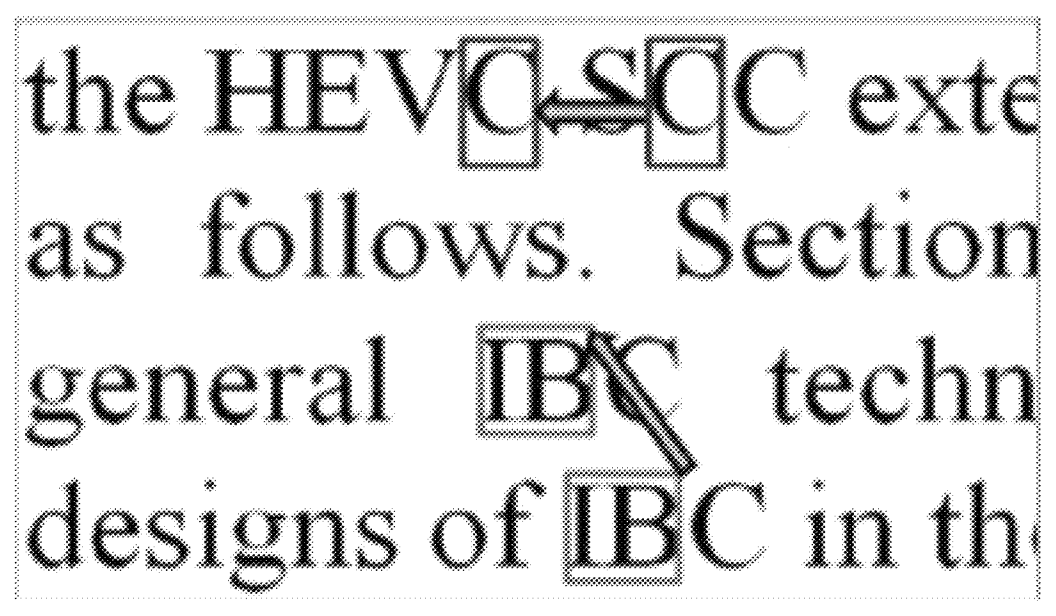

Intra block copy (IBC, or intra picture block compensation), also named current picture referencing (CPR) was adopted in HEVC screen content coding extensions (SCC). This tool is very efficient for coding of screen content video in that repeated patterns in text and graphics rich content occur frequently within the same picture. Having a previously reconstructed block with equal or similar pattern as a predictor can effectively reduce the prediction error and therefore improve coding efficiency. An example of the intra block compensation is illustrated in FIG. 25.

Similar to the design of CRP in HEVC SCC, In VVC, The use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed on top of the existing VVC inter mode to signal the use of the IBC mode.

Some of the features of CPR include:
It is treated as a normal inter mode. Therefore, merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise a normal inter mode coded one with different pictures as reference pictures.
Block vector prediction and coding schemes for the IBC mode reuse the schemes used for motion vector prediction and coding in the HEVC inter mode (AMVP and MVD coding).
The motion vector for the IBC mode, also referred as block vector, is coded with integer-pel precision, but stored in memory in 1/16-pel precision after decoding as quarter-pel precision is required in interpolation and deblocking stages. When used in motion vector prediction for the IBC mode, the stored vector predictor will be right shifted by 4.
Search range: it is restricted to be within the current CTU.
CPR is disallowed when affine mode/triangular mode/GBI/weighted prediction is enabled.

2.4 Examples of ATMVP in VTM-3.0

ATMVP in VTM-3.0 is much simpler than in JEM. When an ATMVP merge candidate is generated, the following steps are applied in order:
(a) Check neighbouring blocks A1, B1, B0, A0 as shown in FIG. 2 in order, to find the first inter-coded, but not CPR-coded block, denoted as block X;
(b) Initialize TMV=(0,0). If there is a MV (denoted as MVn) of block X, referring to the collocated reference picture (as signaled in the slice header), TMV is set equal to MVn.
(c) Suppose the center point of the current block is (x0, y0), then locate a corresponding position of (x0,y0) as M=(x0+MV*x, y0+MV*y) in the collocated picture. Find the block Z covering M.
   (i) If Z is intra-coded, then ATMVP is unavailable;
   (ii) If Z is inter-coded, MVZ_0 and MVZ_1 for the two lists of block Z are scaled to (Reflist 0 index 0) and (Reflist 1 index 1) as MVdefault0, MVdefault1, and stored.
(d) For each 8×8 sub-block, suppose its center point is (x0S, y0S), then locate a corresponding position of (x0S, y0S) as MS=(x0S+MV*x, y0S+MV*y) in the collocated picture. Find the block ZS covering MS.
   (i) If ZS is intra-coded, MVdefault0, MVdefault1 are assigned to the sub-block;
   (ii) If ZS is inter-coded, MVZS_0 and MVZS_1 for the two lists of block ZS are scaled to (Reflist 0 index 0) and (Reflist 1 index 0) and are assigned to the sub-block.

2.4.1 MV Clipping and Masking in ATMVP

Figure 26:
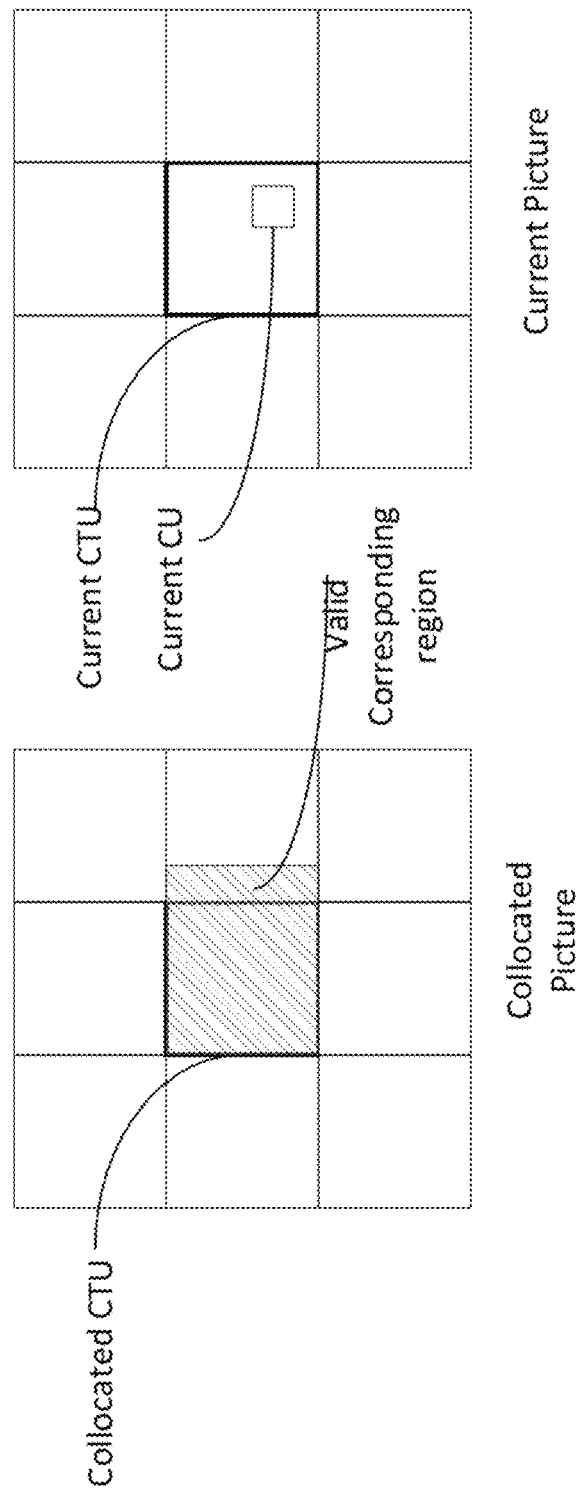
FIG. 26 shows an example of a valid corresponding region in a collocated picture.

When locating a corresponding position such as M or MS in the collocated picture, it is clipped to be inside a predefined region, as shown in the example in FIG. 26. The CTU size is S×S, S=128 in VTM-3.0. Suppose the top-left position of the collocated CTU is (xCTU, yCTU), then the corresponding position M or MS at (xN, yN) will be clipped into the valid region xCTU<=xN<xCTU+S+4; yCTU<=yN<yCTU+S.

Besides Clipping, (xN, yN) is also masked as xN=xN&MASK, yN=yN&MASK, where MASK is an integer equal to ~(2N−1), and N=3, to set the lowest 3 bits to be 0. So xN and yN must be numbers which are times of 8. ("~" represents the bitwise complement operator).

2.5 Examples of Merge List Design in VVC

There are three different merge list construction processes supported in VVC:
(1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
(2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks. In some embodiments, the uni-prediction TPM merge list size is fixed to be 5.
(3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

Additional Embodiments

In some embodiments, the ATMVP merge candidate in the normal merge list is moved to the first position of the affine merge list. Such that all the merge candidates in the new list (i.e., sub-block based merge candidate list) are based on sub-block coding tools.

Construction Process of the Sub-Block Merge Candidate List

In VTM-3.0, a special merge candidate list, known as sub-block merge candidate list (a.k.a affine merge candidate list) is added besides the regular merge candidate list. The sub-block merge candidate list is filled with candidates in the following order:
 (a) ATMVP candidate (maybe available or unavailable);
 (b) Inherited Affine candidates;
 (c) Constructed Affine candidates;
 (d) Padding as zero MV 4-parameter affine model Regular Merge List Different from the merge list design, in VVC, the history-based motion vector prediction (HMVP) method is employed. In some embodiments, combined bi-predictive merge candidates have been replaced by pairwise bi-predictive merge candidates.

HMVP

Figure 27:
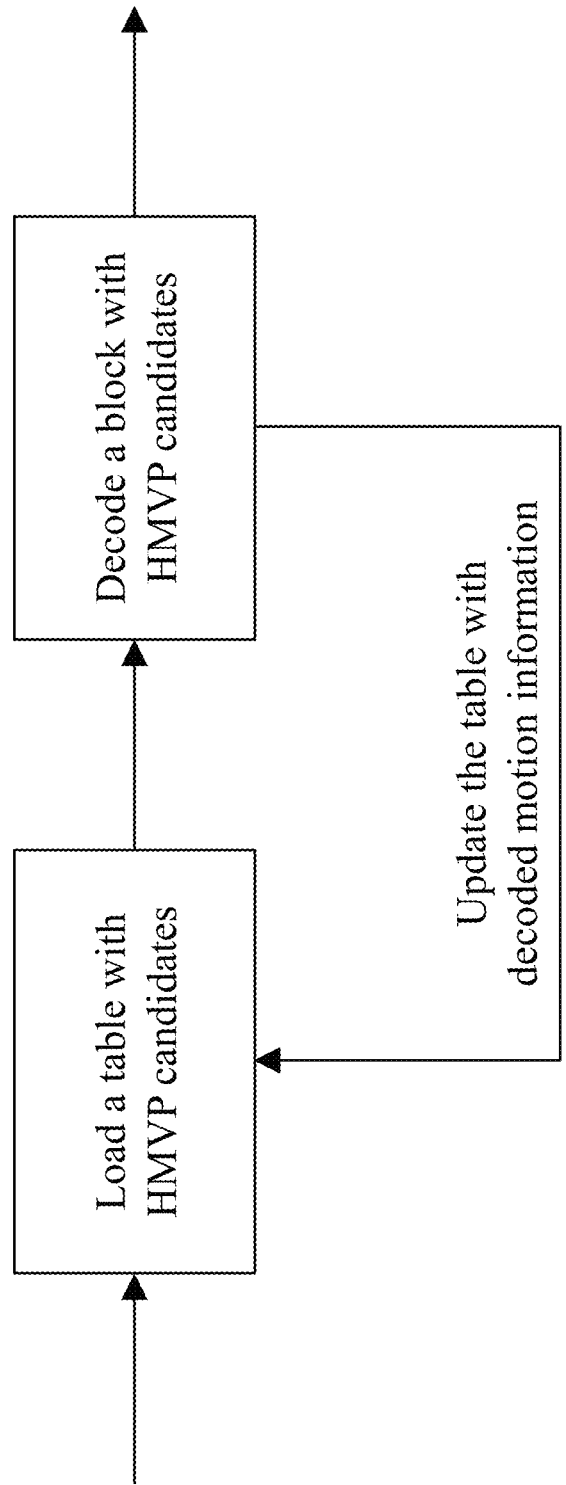
FIG. 27 shows an example of the coding flow for history-based motion vector prediction (HMVP) candidates.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new slice. Whenever there is an inter-coded block, the associated motion information is added to the last entry of the table as a new HMVP candidate. The overall coding flow is depicted in FIG. 27.

Figure 28:
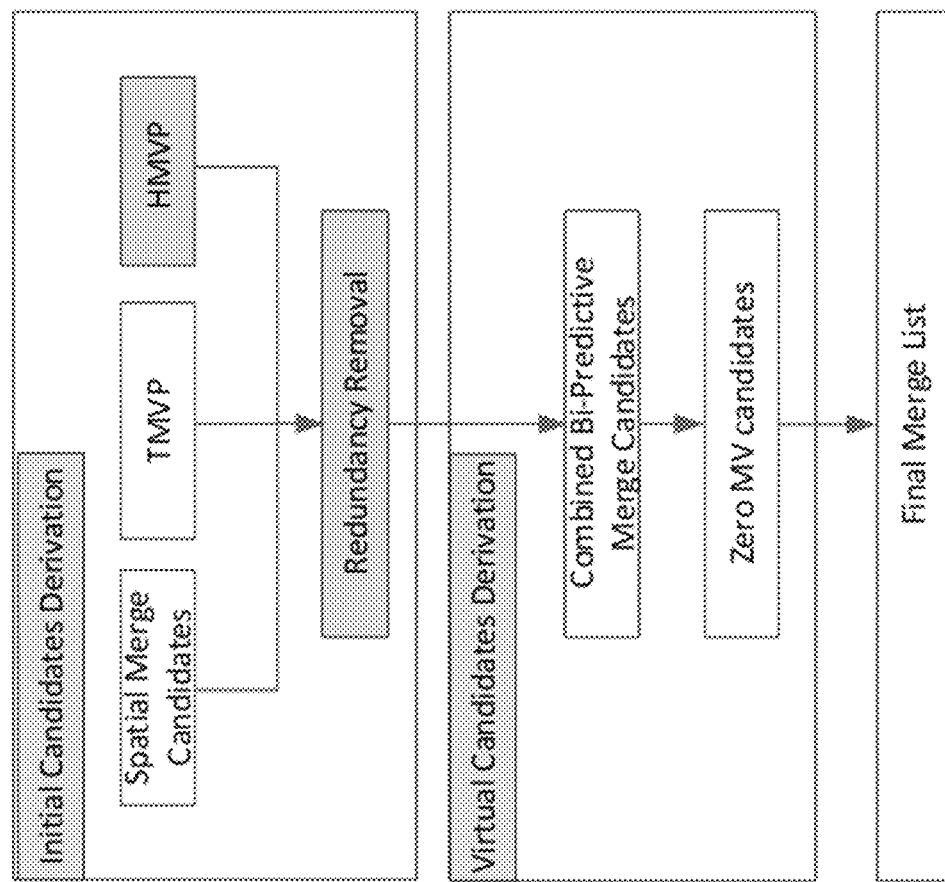
FIG. 28 shows an example of a modified merge list construction process.

HMVP candidates could be used in both AMVP and merge candidate list construction processes. FIG. 28 depicts the modified merge candidate list construction process (highlighted in grey). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

Pairwise Average Candidates

Pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. The pairwise average candidates replace the combined candidates in HEVC standard. Suppose the MVs of two merge candidates are MV0=(MV0x, MV0y) and MV1=(MV1x, MV1y), then the MV of the pairwise merge candidate denoted as MV*=(MV*x, MV*y) is derived as $$MV^*x=(MV0x+MV1x)/2;$$

$$MV^*y=(MV0y+MV1y)/2;$$

In addition, when MV0 and MV1 refer to the current picture (i.e., CPR mode), MV*x and MV*y are further rounded to remove the part with a higher precision than full pixel to make sure the integer MV is obtained:

$$MV^*x=(MV^*x/16)<<4;$$

$$MV^*y=(MV^*y/16)<<4;$$

It is noted that for each pair, if one of the two is coded with CPR and the other is not, such pair is disallowed to generate the pairwise average candidate.

Regular Merge List Construction Process

When a block is predicted using the regular merge mode, an index pointing to an entry in the regular merge candidates list is parsed from the bitstream and used to retrieve the motion information. The construction of this list is specified in the current VVC standard and can be summarized according to the following sequence of steps, with steps that have changes compared to HEVC followed by (*):
 Step 1: Initial candidates derivation
  Step 1.1: Spatial candidates derivation
  Step 1.2: Redundancy check/removal for spatial candidates
  Step 1.3: Temporal candidates derivation
  Step 1.4: HMVP candidates with redundancy check/removal (newly introduced by VVC compared to HEVC) (*)
 Step 2: Virtual candidates insertion
  Step 2.1: Creation of pairwise bi-predictive candidates (replace the original combined bi-predictive candidates in HEVC) (*)
  Step 2.2: Insertion of default motion candidates (zero motion candidates)

3 Drawbacks of Existing Implementations

In existing implementations (e.g., the current design of VVC), three different merge list are utilized with different procedures which increases the hardware implementation cost.
 (1) For the sub-block merge candidate list, a 4-parameter merge candidate with MVs set to (0, 0) and prediction direction set to uni-prediction from list 0 (for P slice) and bi-prediction (for B slice). Such a design will result in repeated candidates.
 (2) The 2nd weighting factor group is used when any one of the following condition is true:
  (i) the reference pictures of the two triangular prediction units are different from each other.
  (ii) absolute value of the difference of two motion vectors' horizontal values is larger than 16 pixels.
  (iii) absolute value of the difference of two motion vectors' vertical values is larger than 16 pixels.

Some existing implementations do not fully consider the diversity of blocks.

(3) For the current design in the TPM merge list construction process, it is possible there are less than 5 candidates after inserting all TPM candidates. How to fill in the remaining TPM candidate list needs to be resolved.

(4) The embodiments described in PCT/CN2018/115183, gives some solutions to reuse the regular merge list for the TPM candidate list and derivations of virtual candidates, but may still be some room to further improve the coding efficiency.

(5) The signaling of TPM applied flag at block level depends on the SPS flag and slice type. However, such information is the same for all blocks within one slice. Checking these conditions introduces complexity burden in the parsing process.

4 Example Methods for Default Motion Candidates for Video Coding

Embodiments of the presently disclosed technology overcome the drawbacks of existing implementations, thereby providing video coding with higher coding efficiencies. The use of default motion candidates for video coding, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined. It should be noted that some of the proposed technologies could be applied to existing candidate list construction process.

In some embodiments, default motion candidates are derived and may be used to fill in the last few candidates in a candidate list. A default motion candidate may be added to the list in a repeated way, e.g., multiple identical default motion candidates. A regular motion candidate is defined as a motion candidate with its motion information derived from a previously coded block (e.g., adjacent or non-adjacent spatial/temporal blocks). A HMVP candidate could also be treated as a regular motion candidate. A candidate derived from multiple previously coded blocks (e.g., the ATMVP/STMVP candidate) may be also treated as a regular motion candidate.

In some embodiments, the 'triangular partition mode' is used to represent an example of the non-square/non-rectangular partition mode (TPM), and the motion vector prediction candidate inserted to TPM candidate list is named 'TPM candidates'. It should be noted other kinds of partitions may be also applicable. The proposed methods for the TPM candidate list could be applied to any other motion candidate list of non-square/non-rectangular partitions, e.g., geometry partitions.

Example 1. For the affine/sub-block merge candidate list, a 6-parameter affine merge candidate may be utilized as the default motion candidate.

(a) In one example, for the default motion candidate, MVs are set to (0, 0) and prediction direction set to uni-prediction from list 0 (for P slice) and bi-prediction (for B slice).

Example 2. For the default motion candidates to be added to an affine/sub-block merge candidate list, the reference picture index may be set to K (K is non-zero integer value).

(a) In one example, several default motion candidates may be added based on the increasing order of reference index (also referred to as reference picture index in this document).

Example 3. The affine model type of the default motion candidates to be added to an affine/sub-block merge candidate list may be dependent on the available motion candidates.

(a) In one example, the default motion candidate to be added may reuse the same affine model type as that of the first available motion candidate.

(b) Alternatively, the default motion candidate to be added may reuse the same affine model type that is the most frequently used affine model type among partial or all available motion candidates.

Example 4. The default motion candidates for the TPM candidate list may be modified with the following ways:

(a) In one example, a default motion candidate may be added repeatedly to fill in the TPM candidate list until it is full.

(i) In one example, such a candidate (named repeated motion candidate) is with zero MV, prediction from List 0 or List 1 and reference index equal to M (e.g., M=0).

(ii) The repeated motion candidate is associated with a reference index set to M wherein M could be pre-defined or signalled in SPS/VPS/PPS/picture header/slice header/tile group header/CTUs.

(iii) The repeated motion candidate is associated with a reference index set to M wherein M could be the index associated with a co-located picture.

(iv) The repeated motion candidate is associated with prediction direction (i.e., from List 0 or List 1) may depend on slice/tile/picture type.

(b) In one example, firstly, zero motion vectors associated with reference indices from zero to the number of List 0 reference pictures minus one are used to fill any remaining entries in order; secondly, zero motion vectors associated with reference indices from zero to the number of List 1 reference pictures minus one are used to fill any remaining entries in order; finally, add the repeated motion candidate with zero MV and a given reference picture index in List 0 (or List 1) multiple times to fill any remaining entries in order.

(i) Suppose there are NumRefL0 and NumRefL1 reference pictures for List 0 and List 1, respectively. The following candidates C(mv(x,y), reference index, prediction direction) are added in order till the list is full:

C(mv(0,0), 0, list0), C(mv(0,0), 1, list0) . . . C(mv(0,0), NumRefL0−1, list0),

C(mv(0,0), 0, list1), C(mv(0,0), 1, list1) . . . C(mv(0,0), NumRefL1−1, list1),

C(mv(0,0), M, list0), C(mv(0,0), M, list0) . . . C(mv(0,0), M, list0).

(c) Alternatively, for each reference picture index, add two default motion candidates with zero MVs and same reference picture index for two lists in order. The inserting of candidates is further based on ascending order of reference picture index until it reaches the minimum number of reference pictures in all reference picture lists. finally, add the repeated motion candidate with zero MV and a given reference picture index in List 0 (or List 1) multiple times to fill any remaining entries in order.

(i) Suppose there are NumRefL0 and NumRefL1 reference pictures for List 0 and List 1, respectively. The following candidates C(mv(x,y), reference index, prediction direction) are added in order till the list is full:

C(mv(0,0), 0, list0), C(mv(0,0), 0, list1),
C(mv(0,0), 1, list0), C(mv(0,0), 1, list1),
. . . .
C(mv(0,0), min(NumRefL0, NumRefL1)−1, list0),
C(mv(0,0), min(NumRefL0, NumRefL1)−1, list1),
C(mv(0,0), M, list0), C(mv(0,0), M, list0) . . .
C(mv(0,0), M, list0).

In some examples, the variable thresh (set to min(NumRefL0, NumRefL1)−1 in the above examples) may be replaced by other values. Alternatively, some candidates with zero motion vectors and a reference index larger than or equal to thresh may be also added to the list if it is still not full.

(d) For above examples, the assertion of candidates with ascending order of reference picture index may be replaced by a descending order.

(e) For above examples, zero motion vector may be replaced by other default motion vectors.

(f) For above examples, default motion candidates before adding the repeated motion candidate may be replaced by other kinds of motion candidates with unequal motion vectors.

Example 5. The reference indices/prediction direction of default motion candidates may be dependent on the available motion candidates.

(a) In one example, the default motion candidate to be added may reuse the same reference indices/prediction direction as those of the first available motion candidate.

(b) Alternatively, the default motion candidate to be added may reuse the same reference indices/prediction direction that are the most frequently used reference indices/prediction directions among partial or all available motion candidates.

(c) Alternatively, the reference indices of default motion candidates may be dependent on reference pictures in the reference picture lists. In one example, the reference picture with the smallest POC distance relative to the current picture containing current block may be used.

(d) The above methods may be invoked only when there is at least one available motion candidate before adding the first default motion candidate.

(e) The above methods may be invoked only when there is at least one available motion candidate before adding the first default motion candidate.

(f) The above methods may be applied to the first M (e.g., M=1) default motion candidate.

Example 6. The virtual candidates (e.g., virtual candidates derived from available ones), as described in embodiments in PCT/CN2018/115183, filed on Nov. 13, 2018, the entire disclosure of which is incorporated by reference, may be utilized as default motion candidates. For example, a virtual candidate can be derived based on normal affine merge candidates or available motion candidates of the current block.

Example 7. The default candidate cannot have a reference picture that is the current picture.

Example 8. The virtual TPM candidates (e.g., virtual candidates derived from available TPM candidates), as described in embodiments in PCT/CN2018/114057, filed on Nov. 6, 2018, the entire disclosure of which is incorporated by reference, may be utilized as default motion candidates. For example, a virtual TPM candidate can be derived based on available TPM motion candidates of the current block.

Example 9. The above methods may be also applicable to the AMVP candidate list or other kinds of motion candidate lists.

Example 10. It is proposed to treat pairwise average candidates as regular motion candidates and these candidates may be used to derive TPM candidates.

(a) In one example, list 0 information of a pairwise average candidate may be used as a TPM candidate and added to the TPM candidate list.

(b) In one example, list 1 information of a pairwise average candidate may be used as a TPM candidate and added to the TPM candidate list.

(c) Alternatively, one MV from list 0 and the other from list 1 of one regular motion candidate or two TPM candidates may be averaged to get a MV of a TPM candidate.

Example 11. It is proposed to identify other temporal blocks in addition to the bottom-right and central co-located temporal blocks to derive regular motion candidates and use them to derive TPM candidates which may be added to the TPM candidate list.

(a) In one example, other temporal blocks may be identified by existing regular motion candidates/TPM candidates.

(b) Alternatively, only one of the bottom-right and central co-located temporal blocks may be checked to derive regular motion candidates.

(c) Alternatively, either bottom-right or central co-located temporal blocks, or both of them are not used to derive regular motion candidates. In one example, furthermore, other locations of temporal blocks are utilized instead.

Example 12. When using a regular motion candidate to derive TPM candidates, if the derived TPM candidate has a reference picture associated with the CPR mode (e.g., the reference picture is the current picture), such TPM candidate is set to be unavailable, therefore, no need to add it to the TPM candidate list.

(a) Alternatively, furthermore, the above method is applied only when the current TPM block is not coded with CRP mode.

Example 13. When using a regular motion candidate to derive TPM candidates, if the derived TPM candidate has a reference picture not associated with the CPR mode (e.g., the reference picture is the current picture), such TPM candidate is set to be unavailable, therefore, no need to add it to the TPM candidate list.

(a) Alternatively, furthermore, the above method is applied only when the current TPM block is coded with CRP mode.

Example 14. A special weighting factor group may replace the weighted average process for samples located at the diagonal edge.

(a) Zero weighting factor is assigned to one of the motion compensated block due to different motion information for multiple partitions. Therefore, the motion compensated results based on motion information of the other partition are directly used as the final prediction values.

(b) In one example, the weighting factor group is defined as $\{0, 0, \ldots 0\}$ or $\{1, 1, 1\}$.

(c) Alternatively, furthermore, for all sub-blocks, the motion information to be stored is uni-prediction.

Example 15. The usage of the special weighting factor group for a sub-block may depend on the position of a sub-block.

Example 16. Selection of a weighting factor group for TPM coded block may depend on the coded mode/MV precisions/color component.
  (a) In one example, for the CPR coded block (at least one reference picture is the current picture), the above defined special weighting factor may be utilized.
  (b) In one example, if both MVs of the two partitions are in integer precisions, the above defined special weighting factor may be utilized.
  (c) In one example, for chroma blocks, the above defined special weighting factor may be utilized.

Example 17. Selection of a weighting factor group for TPM coded block may be dependent on the low delay check flag.

Example 18. Selection of a weighting factor group for TPM coded block is dependent on the scaled motion vector differences. Assume there are two MVs, denoted by Mv0(x0, y0) and Mv1 (x1, y1) associated with the first and second partitions, respectively. Mv1 is firstly scaled to the reference picture that Mv0 is pointing to and the scaled MV is denoted as Mv1' (x1', y1').
  (a) The selection of a weighting factor group is dependent on F(x1', x0, y1', y0) wherein F is a function. If F(x1', x0, y1', y0) is larger than or equal to a threshold T, one of the multiple weighting factor groups (e.g., 2nd) may be selected.
    (i) The threshold T may be pre-defined, e.g., T is (16<<MV_PRECISION) wherein MV_PRECISION tells the precision of stored motion vectors. For example, if MV are stored in 1/16-pel, MV_PRECISION is set to 4.
    (ii) Alternatively, T may be signalled in SPS/VPS/PPS/picture header/slice header/tile group header/tiles/CTUs/region.
    (iii) T may further be different for different modes/different block dimensions/slice or tile or picture type/
  (b) In one example, F is defined as max(abs(x1'-x0), abs(y1'-y0)).
  (c) Alternatively, F is defined as min(abs(x1'-x0), abs(y1'-y0)).
  (d) Alternatively, F is defined as summation of abs(x1'-x0) and abs (y1'-y0).
  (e) Alternatively, F is defined as average of the two motion vectors Mv0 and Mv1'.
  (f) In one example, the above examples may be applied only when the two reference pictures of the two partitions are the same. Alternatively, furthermore, the two reference pictures couldn't be the current picture.
  (g) Alternatively, selection of a weighting factor group may depend on the reference pictures, such as POC distance between two reference pictures, or POC distance between one reference picture and current picture.

Example 19. Pruning is applied to regular merge candidates derivation process while there is no further pruning for the TPM candidates derived from pruned regular merge candidates.
  (a) In one example, whether to apply pruning may depend on whether a TPM candidate is derived from a bi-prediction or a uni-direction regular merge candidate.
    (i) In one example, only for TPM candidates derived from bi-prediction regular merge candidates may apply pruning to other TPM candidates.
      (a) Alternatively, furthermore, a TPM candidate derived from a bi-prediction regular merge candidate may be compared to the first L (e.g., L is 1 or 2) TPM candidates in the TPM candidate list.
      (b) Alternatively, furthermore, a TPM candidate derived from a bi-prediction regular merge candidate may be compared to the last L (e.g., L is 1 or 2) TPM candidates in the TPM candidate list constructed before adding the new candidate, i.e., the previously added L TPM candidates before adding a new TPM candidate.
    (ii) In one example, pruning to other TPM candidates regardless what kinds of regular merge candidates are used to derive them may be further applied.
    (iii) Alternatively, only pruning to other TPM candidates derived from uni-prediction regular merge candidates may be applied.
    (iv) Alternatively, only for TPM candidates derived from uni-prediction regular merge candidates may apply pruning to other TPM candidates.
      (a) Alternatively, furthermore, a TPM candidate derived from a uni-prediction regular merge candidate may be compared to the first L (e.g., L is 1 or 2) TPM candidates in the TPM candidate list.
      (b) Alternatively, furthermore, a TPM candidate derived from a uni-prediction regular merge candidate may be compared to the last L (e.g., L is 1 or 2) TPM candidates in the TPM candidate list constructed before adding the new candidate, i.e., the previously added L TPM candidates before adding a new TPM candidate.
  (b) In one example, whether to apply pruning may depend on the prediction direction of one TPM candidate.
    i. In one example, whether to apply pruning may depend on whether a TPM candidate is derived from motion information of list 0 of a bi-prediction or from list 1 information of a bi-prediction regular merge candidate.
      a) In one example, one TPM candidate derived from motion information of list 0 of a bi-prediction regular merge candidate may be directly added to the TPM candidate list without pruning.
      b) In one example, pruning may be applied to a TPM candidate derived from motion information of list 1 of a bi-prediction.
      c) Alternatively, furthermore, a TPM candidate derived from motion information of list 1 of a bi-prediction regular merge candidate may be compared to the TPM candidate derived from motion information of list 0 of the same bi-prediction regular merge candidate.
        a. Alternatively, furthermore, a TPM candidate derived from list 0 information of a bi-prediction regular merge candidate may be compared to the TPM candidate derived from motion information of list 1 of the same bi-prediction regular merge candidate.
      d) Alternatively, furthermore, a TPM candidate derived from motion information of list 1 of a bi-prediction regular merge candidate may be compared to the first L (e.g., L is 1 or 2) TPM candidates in the TPM candidate list.
      e) Alternatively, furthermore, a TPM candidate derived from motion information of list 1 of a bi-prediction regular merge candidate may be compared to the last L (e.g., L is 1 or 2) TPM candidates in the TPM candidate list constructed before adding the new candidate, i.e., the previously added L TPM candidates before adding a new TPM candidate.
  ii. Alternatively, whether to and/or how to apply pruning before adding a TPM candidate derived from motion information of list 0 or 1 of a bi-prediction regular merge candidate may be adaptively changed from block to block/region to region/tile to tile/tile group to tile group.
    a) In one example, whether to and/or how to apply pruning before adding a TPM candidate derived from motion information of list 0 or 1 of a bi-prediction regular merge candidate may depend on the prediction direction of the first TPM candidate in the list.
    b) Alternatively, whether to and/or how to apply pruning before adding a TPM candidate derived from motion information of list 0 or 1 of a bi-prediction regular merge candidate may depend on the prediction direction of the last uni-prediction regular merge candidate before the bi-prediction regular merge candidate.
  (c) In one example, before adding a TPM candidate derived from information of list 1 of a bi-prediction regular merge candidate and/or a TPM candidate derived from a uni-prediction regular merge candidate, pruning may be applied.
    i. Alternatively, furthermore, a TPM candidate derived from motion information of list 0 of a bi-prediction regular merge candidate may be directly added to the list without pruning.
    ii. Alternatively, furthermore, whether to and/or how to apply pruning may depend on the available TPM candidates in the list before adding a new one.
      a) In one example, when a TPM candidate is derived from a regular motion candidate with index greater than a threshold, it may be directly added to the list without pruning.
    iii. Alternatively, furthermore, whether to and/or how to apply pruning may depend on the index of the regular motion candidates wherein the TPM candidate is derived from.
      b) In one example, when a TPM candidate is derived from a regular motion candidate with index greater than a threshold, it may be directly added to the list without pruning.
  (d) The above methods may be applicable to certain TPM candidates, e.g., only applied to TPM candidates derived from the first bi-prediction regular merge candidate (denoted by $TPM_{sBI}$).
    (i) Alternatively, furthermore, if there are TPM candidates derived from uni-prediction regular motion candidate before adding TPMsBI, pruning may be applied.
    (ii) Alternatively, furthermore, if a $TPM_{sBI}$ is identical or similar to the last TPM candidate derived from uni-prediction regular merge candidate, such a TPMsBI is not added to the TPM candidate list.
  (e) Whether to and/or how to apply pruning among TPM candidates may depend on the block dimension.
    i. In one example, when the block's width and/or height are greater than given thresholds, pruning among TPM candidates may be disabled.
  (f) Whether to and/or how to apply pruning among TPM candidates may depend on the low delay check flag in the specification.
    i. Alternatively, whether to and/or how to apply pruning among TPM candidates may depend on reference pictures included in the reference picture lists.
      a) In one example, if the picture-order-count (POC) values of all reference pictures in a reference picture list or both reference picture lists are smaller than the current picture.
      b) In one example, if the picture-order-count (POC) values of all reference pictures in a reference picture list or both reference picture lists are smaller than or equal to the current picture.
    ii. Alternatively, whether to and/or how to apply pruning among TPM candidates may depend on whether two reference pictures lists contain at least one same reference picture.

Example 20. Limited pruning is applied to those TPM candidates derived from regular merge candidates.
  (a) In one example, how many TPM candidates need to be checked (e.g., similar or identical with previously added ones) may be fixed to be K. Once the number of checked TPM candidates K reaches a maximally allowed value (e.g., 5, 6, 7, 8), the following TPM candidates may be directly added to the list without pruning. Alternatively, furthermore, if the number of TPM candidates is smaller than K before adding a new one, partial/full pruning may be applied. In this example, when a new TPM candidate to be added is compared to L (L>1) previously inserted TPM candidates, it is counted as once.
    (i) How many TPM candidates need to be checked (e.g., similar or identical with previously added ones, K in above example) before being added may depend on the number of available regular merge candidates. Alternatively, it may depend on the number of available TPM candidates before pruning, or block dimension or slice/picture/tile type/low delay check flag/block dimension.
  (b) In one example, how many times of TPM candidates are compared to others may be restricted to be smaller than or equal to K. Once the number of pruning operations reaches a maximally allowed value (e.g., K=5, 6, 7, 8), the following TPM candidates may be directly added to the list without pruning. Alternatively, furthermore, if the number of pruning operations is smaller than K before adding a new one, partial/full pruning may be applied. In this example, when a new TPM candidate to be added is compared to L (L>1) previously inserted TPM candidates, it is counted as L times.
    (i) How many times of TPM candidates are compared to others (i.e., number of pruning operations, K in above example) before being added may depend on the number of available regular merge candidates. Alternatively, it may depend on the number of available TPM candidates before pruning, or block dimension or slice/picture/tile type/low delay check flag.
  (c) How to apply the pruning process (e.g., which of previously added TPM candidates should a new TPM candidate be compared to) may depend on which regular motion candidates those TPM candidates are derived from.
  (d) Alternatively, furthermore, when pruning is enabled for TPM candidate insertion process, pruning is not applied to regular merge candidates derivation process.

Example 21. Insertion order of List 0 or List 1 motion information from bi-prediction regular merge candidates may be based on previous inserting order.
- (a) If two consecutive regular motion candidates (e.g., after pruning) are both bi-prediction, List X of the first bi-prediction regular motion candidates may be firstly added before List Y. While List Y of the second bi-prediction regular motion candidates may be firstly added before List X. X+Y is equal to 1 and X/Y is 0 or 1.
- (b) If two consecutive regular motion candidates (e.g., after pruning) are uni-prediction from List X and bi-prediction, respectively, List Y of the bi-prediction regular motion candidates may be firstly added before List X. Y is equal to (1−X).
- (c) If the first available regular motion candidate is bi-prediction, List 0 of this bi-prediction regular motion candidate may be firstly added as a TPM candidate, followed by List 1 of this bi-prediction regular motion candidate.

Example 22. Checking of the SPS-level TPM enable flag and slice type equal to B slice in block level is removed.
- (a) A flag at VPS/PPS/slice header/tile group header/picture header may be signalled to indicate whether TPM could be applied.
- (b) Alternatively, furthermore, if the SPS-level TPM enable flag indicates TPM should be disabled for the whole sequence, there is no need to signal above flags and those flags are inferred to be false.
- (c) Alternatively, furthermore, if the slice type is not a B slice, above flags may be not signalled and those flags are inferred to be false.
- (d) Alternatively, furthermore, when coding a block (e.g., coding unit), the picture-level/tile-level/slice-level flag is checked instead. If the picture-level/tile-level/slice-level flag is false, there is no need to parse the TPM flag for this block and TPM is not applied to this block.

Example 23. How to generate the TPM candidate list may depend on the regular merge list size.

In one example, when the regular merge list size is smaller than the TPM candidate list size, more potential TPM candidates may be generated such as virtual TPM candidates/default TPM candidates etc. al.

Example 24. Whether to and/or how to apply pruning may depend on may depend on the low delay check flag in the specification.

Alternatively, whether to apply pruning among TPM candidates may depend on reference pictures included in the reference picture lists.

In one example, if the picture-order-count (POC) values of all reference pictures in a reference picture list or both reference picture lists are smaller than the current picture.

In one example, if the picture-order-count (POC) values of all reference pictures in a reference picture list or both reference picture lists are smaller than or equal to the current picture.

Alternatively, whether to apply pruning among TPM candidates may depend on whether two reference pictures lists contain at least one same reference picture.

Example 25. It is proposed that all kinds of motion candidates that may be added after the HMVP candidates are disallowed to use previously added HMVP information.
- (a) In one example, HMVP candidates are not allowed to generate the pairwise average bi-prediction candidates. That is, if one candidate in the combination of two candidates is an HMVP candidate, the next combination is checked instead.
- (b) In one example, HMVP candidates are not allowed to generate the combined bi-prediction candidates. That is, if one candidate in the combination of two candidates is an HMVP candidate, the next combination is checked instead.

Example 26. If one block is coded with a motion candidate that is derived after checking/inserting HMVP candidates in the candidate list, such block's motion information is disallowed to update the HMVP table.
- (a) In one example, if one block is coded with pairwise average bi-prediction candidate, such motion information is disallowed to update the HMVP table.
- (b) In one example, if one block is coded with combined bi-prediction candidate, such motion information is disallowed to update the HMVP table.
- (c) In one example, if one block is coded with zero motion candidate, such motion information is disallowed to update the HMVP table.
- (d) In one example, if one block is coded with other kinds of default motion information which are checked/added after checking HMVP candidate, such motion information is disallowed to update the HMVP table.

Example 27. The above methods may be applicable to certain block dimension.
- (a) In one example, it may be invoked only when the block width and/or height is smaller than or equal to M (e.g., M is set to 4).
- (b) In one example, it may be invoked only when the block width is smaller than or equal to M1 (e.g., M1=4) and block height is smaller than or equal to M2 (e.g., M2=4).

Example 28. It is proposed that when the list (e.g., merge/amvp) is not full after checking all the HMVP candidates, some default motion candidates from HMVP tables are added till the list is full.
- (a) In one example, the last entry of the HMVP table may be repeatedly added.
- (b) Alternatively, the last entry of the HMVP table may be repeatedly added.
- (c) In one example, it is invoked when the HMVP table is not empty.
- (d) In one example, when the HMVP table is empty, one of available candidates in the list is added instead.
- (e) Alternatively, multiple HMVP candidates from the HMVP table may be added to fill the candidate list.

Example 29. How to generate the IBC merge candidate list may depend on the regular merge list size.
- a. In one example, when the regular merge list size is smaller than the IBC merge candidate list size, more potential IBC merge candidates may be generated such as virtual IBC merge candidates/default IBC merge candidates etc. al.
- b. A conformance bitstream shall satisfy that the signalled IBC merge candidate index shall be smaller than the regular merge list size.
- c. A conformance bitstream shall satisfy that the signalled IBC merge candidate index shall be smaller than the maximum number of partial regular merge list that is used to derive the IBC merge candidate.
- d. In one example, the size of the IBC merge candidate list (the number of IBC merge candidates in the IBC merge candidate list) is the same as the size of the regular candidate list.
- e. In one example, a conformance bitstream shall satisfy that the size of the IBC merge candidate list should be no larger than the size of the regular candidate list.

f. In one example, a conformance bitstream shall satisfy that the size of the IBC merge candidate list should be no larger than P, where P is an integer such as 5.
g. In one example, a conformance bitstream shall satisfy that the size of the IBC merge candidate list should be no smaller than P, where P is an integer such as 0 or 1.
h. In one example, the size of the IBC merge candidate list may be signaled,
   1) For example, the size is binarized as a truncated unary code.
i. In one example, the difference between the size of the IBC merge candidate list denoted as C and an integer P (such as 5) may be signaled. For example, P-C or C-P is signaled.
   1) For example, the difference is binarized as a truncated unary code.
j. In one example, the difference of the size between the IBC merge candidate list (denoted as C) and the size of the regular candidate list (denoted as P) may be signaled. For example, P-C or C-P is signaled.
   1) For example, the difference is binarized as a truncated unary code.

Example 30: It is proposed that whether to reset the HMVP table may depend on the usage of IBC mode.
a. In one example, the HMVP table may be reset when IBC is enabled for one sequence/tile group/video coding data.
b. In one example, the HMVP table may be reset when IBC is enabled for one sequence/tile group/video coding data even the tile group is I-tile group (such as I-slice).
c. In one example, the HMVP table may be reset before encoding/decoding a new region (such as CTU row, tile, tile group) when IBC is enabled for one sequence/tile group/video coding data.

The examples described above may be incorporated in the context of the method described below, e.g., methods 2900, 3000, 3100, 3200, 3300 and 3400, which may be implemented at a video decoder or a video encoder.

Figure 29:
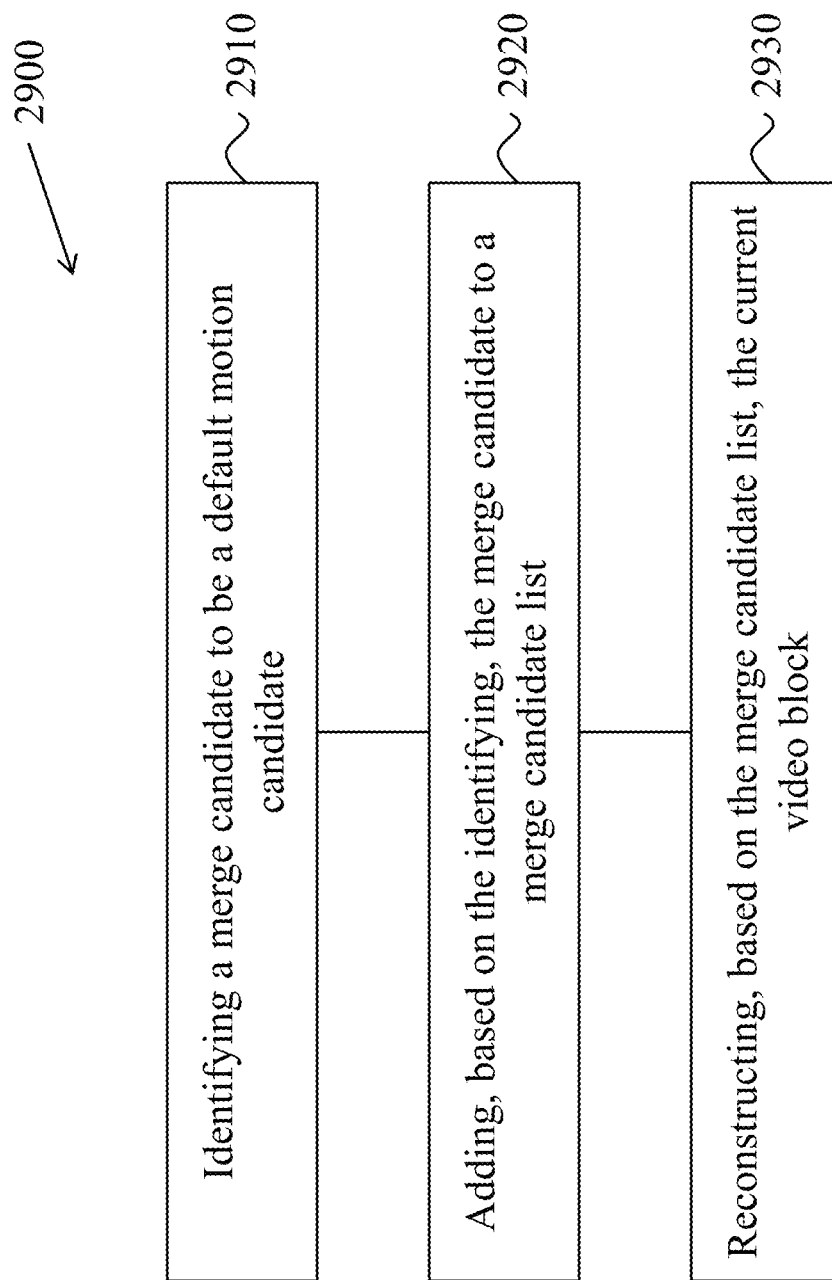
FIG. 29 shows a flowchart of an example method for video processing.

FIG. 29 shows a flowchart of an exemplary method for video processing. The method 2900 includes, at step 2910, identifying a merge candidate to be a default motion candidate.

The method 2900 includes, at step 2920, adding, based on the identifying, the merge candidate to a merge candidate list. In some embodiments, and in the context of Example 1, the merge candidate comprises a 6-parameter affine merge candidate, and wherein the merge candidate list comprises an affine or sub-block merge candidate list. In an example, a motion vector of the default motion candidate is set to (0, 0). In another example, a prediction direction for the motion vector is set to uni-prediction, and wherein the current video block is located in a P slice. In yet another example, a prediction direction for the motion vector is set to bi-prediction, and wherein the current video block is located in a B slice.

In some embodiments, and in the context of Example 2, the merge candidate list comprises an affine or sub-block merge candidate list, and a reference picture index of the default motion candidate is set to K, which is a non-negative integer.

In some embodiments, and in the context of Example 3, the merge candidate comprises an affine model, wherein the merge candidate list comprises an affine or sub-block merge candidate list, and wherein a type of the affine model is based on available motion candidates. In an example, the type of the affine model is based on an affine model of a first of the available motion candidates. In another example, the type of the affine model is based on an affine model that is most frequently used amongst the available motion candidates.

The method 2900 includes, at step 2930, reconstructing, based on the merge candidate list, the current video block.

In some embodiments, and in the context of Example 4, the merge candidate list comprises a triangular prediction mode (TPM) candidate list. The method 2900 may further include the step of repeatedly adding, upon determining the merge candidate list is not full, the default motion candidate to the merge candidate list. In some embodiments, the default motion candidate is associated with a reference picture index that is set to M, which is a non-negative integer. In an example, M is predetermined. In another example, M is signaled in a sequence parameter set (SPS), a video parameter set (VPS), a picture parameter set (PPS), a picture header, a slice header, a tile group header or a coding tree unit (CTU). In yet another example, M is further associated with a reference picture index of a co-located picture. In yet another example, a prediction direction of the default motion candidate is based on a slice type of the current video block, a tile type of the current video block or a picture type of the current video block.

In some embodiments, and in the context of Example 4, the default motion candidate comprises a zero motion vector associated with reference picture index 0 in List 0, and the method 2900 further includes the steps of adding, upon determining that the merge candidate list is not full, additional default motion candidates to the merge candidate list in the following order: zero motion vectors associated with reference picture indices 1 to $N_{List0}-1$, and zero motion vectors associated with reference picture indices 0 to $N_{List1}-1$; and repeatedly adding, upon determining that the merge candidate list is not full, zero motion vectors associated with a predetermined reference picture index from List 0 or List 1 to the merge candidate list, wherein $N_{List0}$ and $N_{List1}$ are integer sizes of List 0 and List 1, respectively. In other embodiments, the default motion candidate comprises a zero motion vector associated with reference picture index 0 in List 0, and the method 2900 further includes the steps of adding, upon determining that the merge candidate list is not full, additional default motion candidates to the merge candidate list in the following order: a zero motion vector associated with reference picture index 0 in List 1, a zero motion vector associated with reference picture index M in List 0, and a zero motion vector associated with reference picture index M in List 1, wherein M is an integer that equals 1, 2, ... $\min(N_{List0}, N_{List1})-1$; and repeatedly adding, upon determining that the merge candidate list is not full, zero motion vectors associated with a predetermined reference picture index from List 0 or List 1 to the merge candidate list, wherein $N_{List0}$ and $N_{List1}$ are integer sizes of List 0 and List 1, respectively.

In some embodiments, and in the context of Example 5, a reference picture index or a prediction direction of the default motion candidate is based on one or more available motion candidates. In an example, the reference picture index or the prediction direction is based on a reference index or a prediction direction of the first of the one or more available motion candidates, respectively. In another example, the reference picture index or the prediction direction is based on a reference index or a prediction direction that is most frequently used amongst the one or more available motion candidates, respectively. In these examples, the one or more available motion candidates may include all available motion candidates. In these examples, the one or more available motion candidates may include a first K available motion candidates, where K is a positive integer.

In some embodiments, and in the context of Example 6, the default motion candidate is associated with a reference picture that is different from a current picture that comprises the current video block.

In some embodiments, and in the context of Example 9, the merge candidate list comprises an advanced motion vector prediction (AMVP) candidate list.

Figure 30:
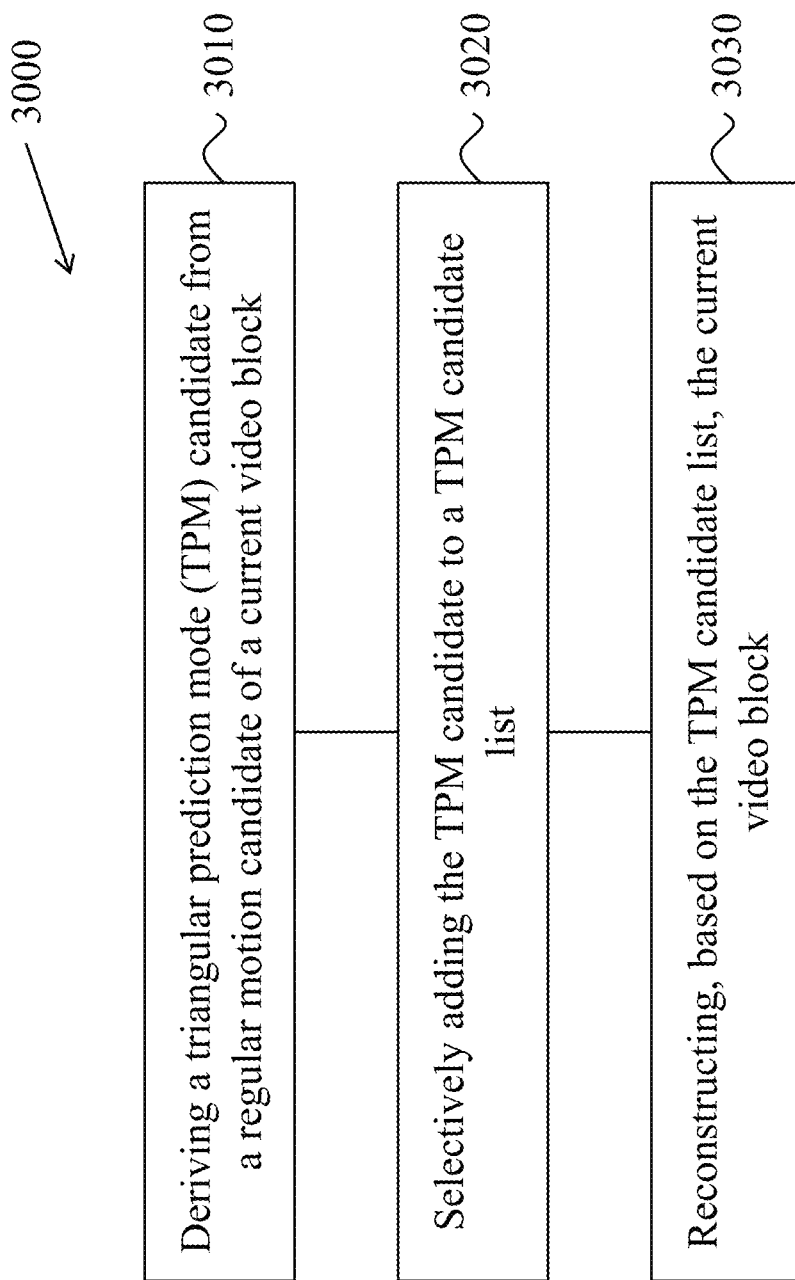
FIG. 30 shows a flowchart of another example method for video processing.

FIG. 30 shows a flowchart of an exemplary method for video processing. The method 3000 includes, at step 3010, deriving a triangular prediction mode (TPM) candidate from a regular motion candidate of a current video block. In some embodiments, and in the context of Example 10, the regular motion candidate comprises a pairwise average candidate. In an example, the TPM candidate comprises List 0 motion information of the pairwise average candidate. In another example, the TPM candidate comprises List 1 motion information of the pairwise average candidate. In yet another example, the TPM candidate contains averaged motion information of List 0 motion information and List 1 motion information of the regular motion candidate.

The method 3000 includes, at step 3020, selectively adding the TPM candidate to a TPM candidate list.

The method 3000 includes, at step 3030, reconstructing, based on the TPM candidate list, the current video block.

In some embodiments, and in the context of Example 11, the regular motion candidate is derived from a bottom-right co-located temporal block, a central co-located temporal block, or at least one temporal block that is different from the bottom-right and central co-located temporal blocks. In an example, the at most one temporal block is identified by the regular motion candidate.

In some embodiments, and in the context of Example 12, the TPM candidate comprises a reference picture that is not associated with a current picture referencing (CPR) mode, and wherein the TPM candidate is not added to the TPM candidate list. In other embodiments, the TPM candidate comprises a reference picture that is associated with a current picture referencing (CPR) mode, and wherein the TPM candidate is not added to the TPM candidate list.

Figure 31:
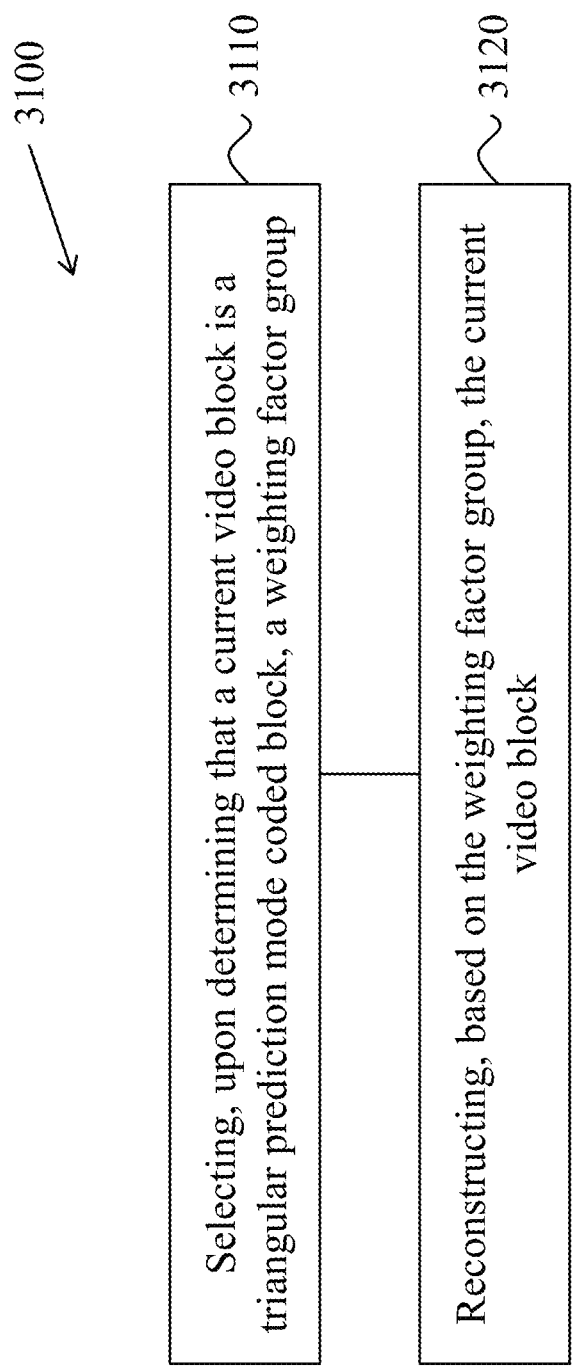
FIG. 31 shows a flowchart of yet another example method for video processing.

FIG. 31 shows a flowchart of an exemplary method for video processing. The method 3100 includes, at step 3110, selecting, upon determining that a current video block is a triangular prediction mode (TPM) coded block, a weighting factor group.

The method 3100 includes, at step 3120, reconstructing, based on the weighting factor group, the current video block.

In some embodiments, and in the context of Example 14, the method 3100 further includes the step of using the weighting factor group to replace a weighted average process. In an example, the weighting factor group is $\{0, 0, \ldots, 0\}$. In another example, the weighting factor group is $\{1, 1, \ldots, 1\}$.

In some embodiments, and in the context of Example 15, reconstructing the current video block comprises reconstructing a sub-block of the current video block, and wherein the selecting the weighting factor group is based on a location of the sub-block in the current video block.

In some embodiments, and in the context of Example 16, the selecting is further based on at least one of a coding mode of the current video block, a precision of a motion vector associated with the current video block, or a color component of the current video block. In an example, the precision of the motion vector is an integer precision. In another example, the color component of the current video block is a chroma component of the current video block.

In some embodiments, and in the context of Example 17, the selecting is further based on a value of a low-delay check flag in a bitstream representation of the current video block.

In some embodiments, and in the context of Example 18, the selecting is further based on a scaled motion vector difference associated with the current video block. The method 3100 may further include the step of generating a scaled motion vector MV1'(x1', y1') by scaling the second motion vector to the first motion vector, wherein a first motion vector MV0(x0, y0) is associated with a first partition of the TPM coded block, and a second motion vector MV1(x1, y1) is associated with a second partition of the TPM coded block.

In some embodiments, and continuing in the context of Example 18, $F(x1', x0, y1', y0) \geq T$, wherein $F(\bullet)$ is a function, and wherein T is a non-negative integer threshold. In an example, T is predetermined. In another example, T is signaled in a sequence parameter set (SPS), a video parameter set (VPS), a picture parameter set (PPS), a picture header, a slice header, a tile group header or a coding tree unit (CTU). In yet another example, T is based on a size of the current video block, a coding mode of the current video block, a slice type of the current video block or a picture type of the current video block.

In yet another example, $F=\max(abs(x1'-x0), abs(y1'-y0))$.

In yet another example, $F=\min(abs(x1'-x0), abs(y1'-y0))$.

In yet another example, $F=abs(x1'-x0)+abs(y1'-y0)$.

In yet another example, F is an average of MV0 and MV1'.

In some embodiments, the selecting is further based on a picture order count (POC) distance between two reference pictures.

Figure 32:
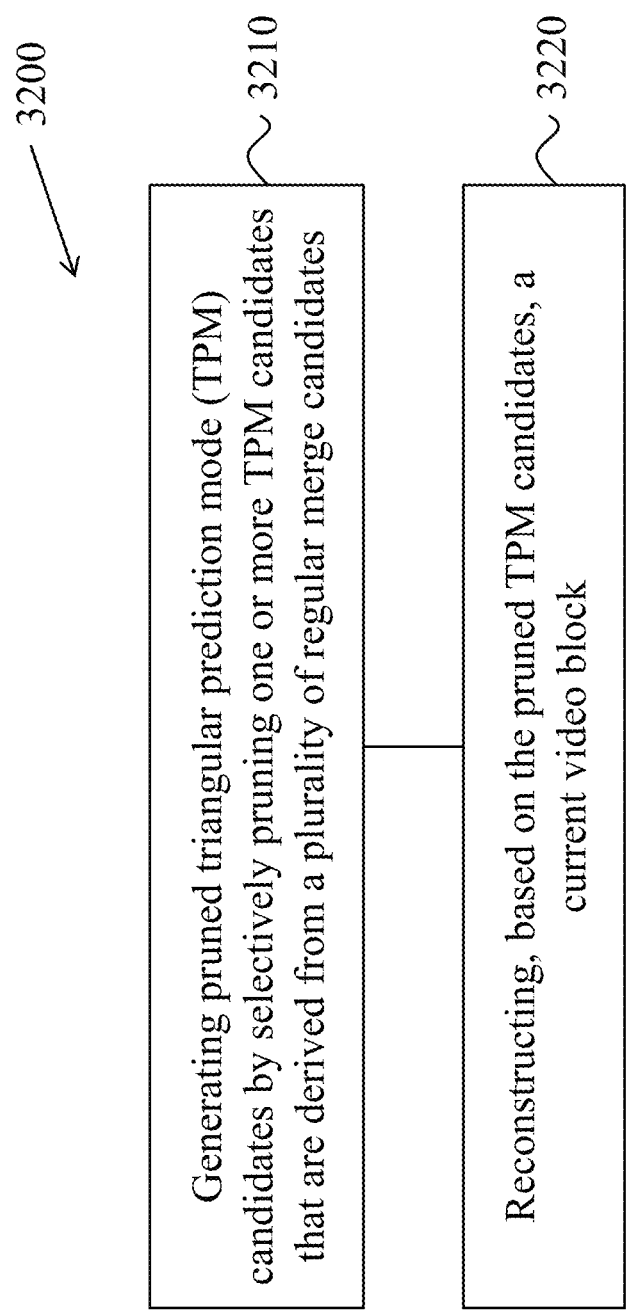
FIG. 32 shows a flowchart of yet another example method for video processing.

FIG. 32 shows a flowchart of an exemplary method for video processing. The method 3200 includes, at step 3210, generating pruned triangular prediction mode (TPM) candidates by selectively pruning one or more TPM candidates that are derived from a plurality of regular merge candidates.

The method 3200 includes, at step 3220, reconstructing, based on the pruned TPM candidates, a current video block.

In some embodiments, and in the context of Example 19, the one or more TPM candidates are pruned, and the plurality of regular merge candidates comprises a uni-prediction or a bi-prediction regular merge candidate.

In some embodiments, and in the context of Example 20, the selectively pruning comprises pruning a first K candidates of the one or more TPM candidates, wherein K is an integer. In an example, $5 \leq K \leq 8$. In another example, the plurality of regular merge candidates comprises a first bi-prediction regular merge candidate. In yet another example, the one or more TPM candidates are pruned, and the method 3200 may further include the step of refraining from pruning the plurality of regular merge candidates.

Figure 33:
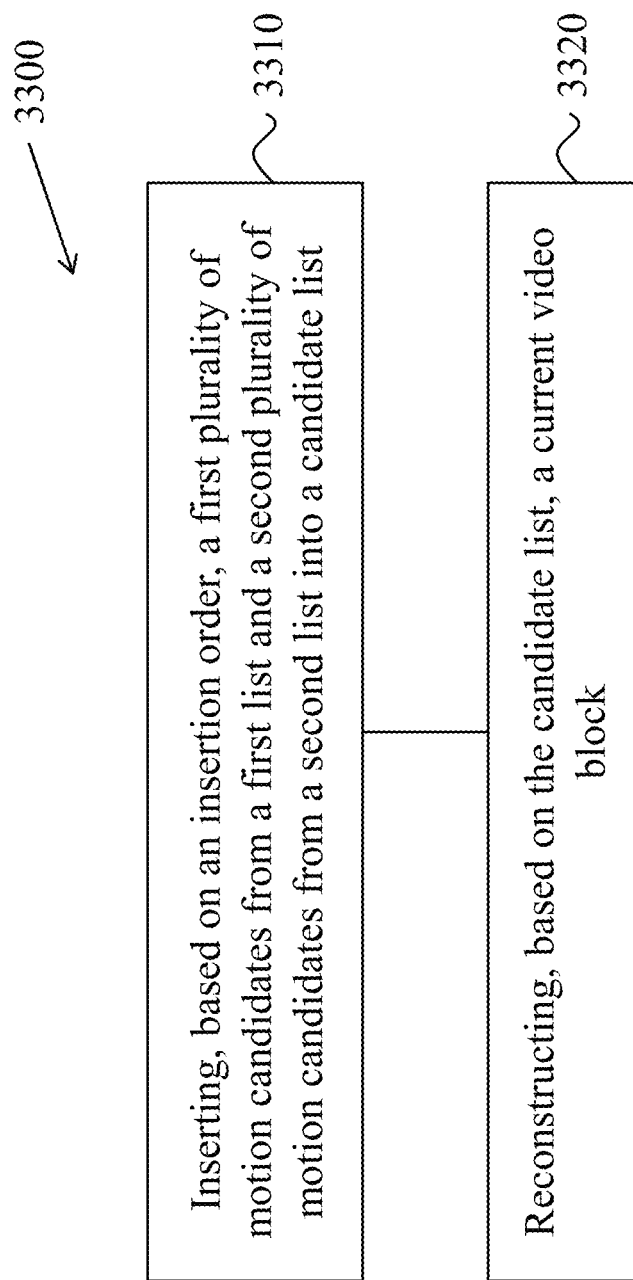
FIG. 33 shows a flowchart of yet another example method for video processing.

FIG. 33 shows a flowchart of an exemplary method for video processing. The method 3300 includes, at step 3310, inserting, based on an insertion order, a first plurality of motion candidates from a first list and a second plurality of motion candidates from a second list into a candidate list, where the insertion order is based on a previous insertion order of a third plurality of motion candidates into the candidate list.

The method 3300 includes, at step 3320, reconstructing, based on the candidate list, a current video block.

In some embodiments, and in the context of Example 21, the third plurality of motion candidates comprises two candidates derived from one bi-prediction regular motion candidate, wherein the candidate from the second list is added before the other candidate from the first list, and the insertion order comprises the first plurality of motion candidates followed by the second plurality of motion candidates. In other embodiments, the third plurality of motion candidates comprises one uni-prediction candidate from the first list, and the insertion order comprises the second plurality of motion candidates followed by the first plurality of motion candidates.

Figure 34:
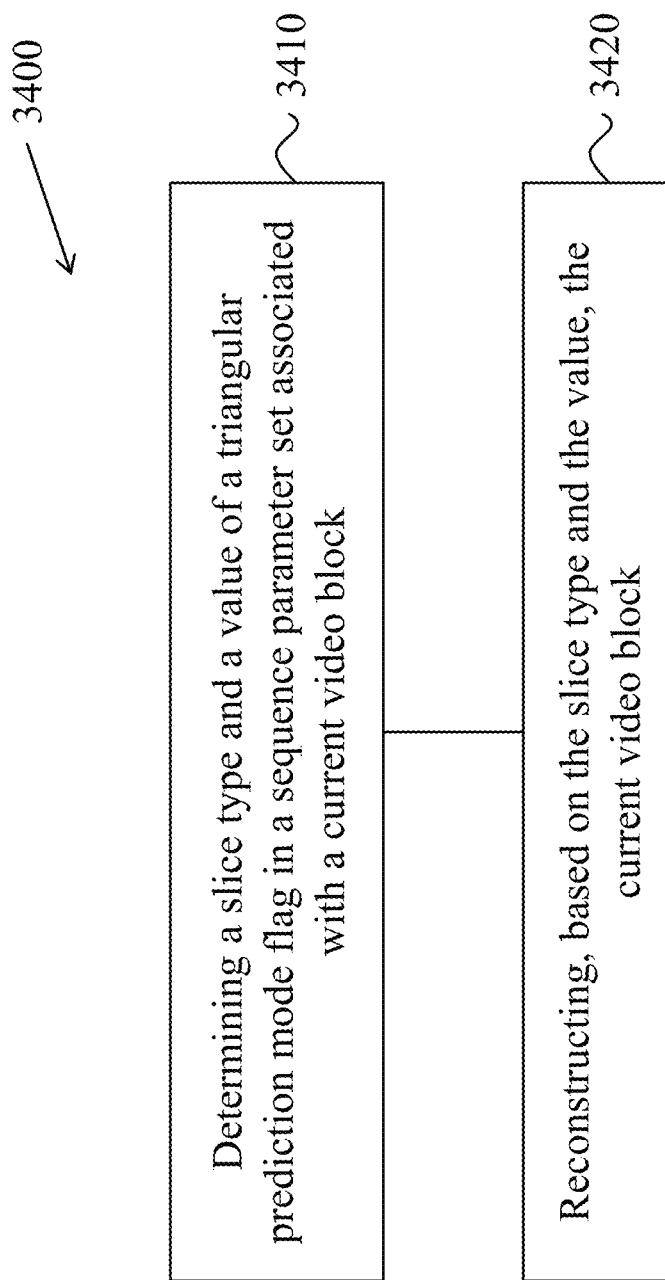
FIG. 34 shows a flowchart of yet another example method for video processing.

FIG. 34 shows a flowchart of an exemplary method for video processing. The method 3400 includes, at step 3410, determining a slice type and a value of a triangular prediction mode (TPM) flag in a sequence parameter set (SPS) associated with a current video block.

The method 3400 includes, at step 3420, reconstructing, based on the slice type and the value, the current video block.

In some embodiments, and in the context of Example 22, the slice type is a B slice. In other embodiments, the TPM flag is further signaled in a video parameter set (VPS), a picture parameter set (PPS), a picture header, a slice header or a tile group header.

Yet another exemplary method for video processing includes checking one or more history-based motion vector prediction (HMVP) candidates for addition to a merge candidate list, checking, after checking the one or more HMVP candidates, a set of new motion candidates for addition to the merge candidate list, wherein each of the set of new motion candidates is not based on previously added HMVP information and is not used to update an HMVP table, and reconstructing, based on the set of new motion candidates, a current video block. In some embodiments, the set of new motion candidates comprises a pairwise average bi-prediction candidate, a combined bi-prediction candidate, or a zero motion candidate. In other embodiments, a height or a width of the current video block is less than equal to M (e.g., M=4). In yet other embodiments, the method further includes the steps of determining, after checking the one or more HMVP candidates, that the merge candidate list is not full, and repeatedly adding, until the merge candidate list is full, a last entry of the HMVP table to the merge candidate list.

Yet another exemplary method for video processing includes checking or updating a history-based motion vector prediction (HMVP) table, deriving, based on the checking or updating, a motion candidate, coding a current video block with the motion candidate, and refraining from updating the HMVP table using motion information based on the current video block. In some embodiments, the motion candidate is a pairwise average bi-prediction candidate, a combined bi-prediction candidate, a zero motion candidate or a default motion candidate. In other embodiments, a height or a width of the current video block is less than equal to M. In an example, M=4.

5 Example Embodiments for Default Motion Candidates for Video Coding

The following exemplary embodiments are related to the TPM candidate list construction process, wherein the TPM candidate list size is denoted by M.

Embodiment #1: Uni-Prediction Candidate List for TPM (with Default Motion Candidates In this embodiment, there is no pruning when inserting a TPM candidate to the candidate list, however, there is pruning for regular motion candidates derivation process.

An example is described as follows: the following steps are involved to unify the TPM list and regular merg list as much as possible (In one example, the first three steps may be the same as the regular merge list):
1. Obtain regular motion candidates from $A_1$, B1, B0, $A_0$, B2 (corresponding to block 1-5 in FIG. 14) with pruning (e.g., limited pruning is done in the way that the regular merge list does)
2. Obtain regular motion candidates from Col1 or Col2 (corresponding to block 6-7 in FIG. 14)
3. Obtain regular motion candidates from HMVP candidates with pruning (e.g., pruning is done in the way that the regular merge list does).
4. Set variable numCurrMrgCand=0
5. For each available regular motion candidate after pruning and numCurrMrgCand is less than M, the following steps are performed to add TPM candidates to the list:
   If the regular motion candidate is uni-prediction (either from List 0 or List 1), it is directly added to the merge list as an TPM candidate with numCurrMrgCand increased by 1.
   If the regular motion candidate is bi-prediction, add the following two candidate in order.
   i) The motion information from List 0 is added to the TPM merge list (that is, modified to be uni-prediction from List 0) as a new TPM candidate and numCurrMrgCand increased by 1.
   ii) The motion information from List 1 is added to the TPM merge list (that is, modified to be uni-prediction from List 1) and numCurrMrgCand increased by 1.
6. If numCurrMrgCand is less than M, default motion candidates are added in the following steps in order till numCurrMrgCand equal to M:
   Set a variable numRef=minimum (number of reference pictures in list 0, number of reference pictures in list 1).
   For each i being 0 . . . numRef−1,
     i) add a default motion candidate with MV set to (0,0) and reference picture index set to i, prediction direction set to list 0, and numCurrMrgCand increased by 1.
     ii) add a default motion candidate with MV set to (0,0) and reference picture index set to i, prediction direction set to list 1, and numCurrMrgCand increased by 1.
   Set variable numPrevMrgCand=numCurrMrgCand.
   For i being 0 . . . (M−numPrevMrgCand−1), add a default motion candidate with MV set to (0,0) and reference picture index set to 0, prediction direction set to list 0, and numCurrMergeCand increased by 1.
Alternatively, step 6 may be replaced by:
6. If numCurrMergeCand is less than M, default motion candidates are added in the following steps in order till numCurrMergeCand equal to M:
   Set a variable numRefList0=number of reference pictures in list 0.
     i) For each i being 0 . . . numRefList0−1, add a default motion candidate with MV set to (0,0) and reference picture index set to i, prediction direction set to list 0, and numCurrMrgCand increased by 1.
   Set a variable numRefList1=number of reference pictures in list 1.
     i) For each i being 0 . . . numRefList1−1, add a default motion candidate with MV set to (0,0) and reference picture index set to i, prediction direction set to list 1, and numCurrMrgCand increased by 1.

Set variable numPrevMrgCand=numCurrMrgCand.

For i being 0 . . . (M−numPrevMrgCand−1), add a default motion candidate with MV set to (0,0) and reference picture index set to 0, prediction direction set to list 0, and numCurrMrgCand increased by 1.

Embodiment #2: Uni-Prediction Candidate List for TPM (with Adaptive Orders of TPM Candidates Derived from List 0/List 1 Bi-Prediction Regular Merge Candidate)

The following steps are involved to unify the TPM list and regular merge list as much as possible (In one example, the first three steps may be the same as the regular merge list):

1. Obtain regular motion candidates from $A_1$, B1, B0, $A_0$, B2 (corresponding to block 1-5 in FIG. 14) with pruning (e.g., limited pruning is done in the way that the regular merge list does)
2. Obtain regular motion candidates from Col1 or Col2 (corresponding to block 6-7 in FIG. 14)
3. Obtain regular motion candidates from HMVP candidates with pruning (e.g., pruning is done in the way that the regular merge list does).
4. Set variable numCurrMrgCand=0, prevDir=List 1;
5. For each regular motion candidate and num-CurrMrgCand is less than 5, the following steps are performed to add TPM candidates to the list:
   If the regular motion candidate is uni-prediction (either from List 0 or List 1), it is directly added to the merge list as an TPM candidate with numCurrMrgCand increased by 1. And prevDir set to the direction of the uni-prediction regular merge candidate;
   If the regular motion candidate is bi-prediction, add the following two candidate in order.
   i) Set variable currDir=prevDir==List 0? List 1: List 0.
   ii) The motion information from currDir is added to the TPM merge list (that is, modified to be uni-prediction from currDir) as a new TPM candidate and numCurrMrgCand increased by 1.
   iii) The motion information from prevDir is added to the TPM merge list (that is, modified to be uni-prediction from prevDir) and numCurrMrgCand increased by 1.
   iv) prevDir=currDir;
6. If numCurrMrgCand is less than M, default motion candidates are added in order till numCurrMrgCand equal to M, such as the procedure in embodiment #1.

Embodiment #3: Uni-Prediction Candidate List for TPM (with Limited Pruning Among TPM Candidates)

The following steps are involved to unify the TPM list and regular merge list as much as possible (In one example, the first three steps may be the same as the regular merge list):

1. Obtain regular motion candidates from $A_1$, B1, B0, $A_0$, B2 (corresponding to block 1-5 in FIG. 14) with pruning (e.g., limited pruning is done in the way that the regular merge list does)
2. Obtain regular motion candidates from Col1 or Col2 (corresponding to block 6-7 in FIG. 14)
3. Obtain regular motion candidates from HMVP candidates with pruning (e.g., pruning is done in the way that the regular merge list does).
4. Set variable numCurrMrgCand=0, isFirstUsedBi is false;
5. For each regular motion candidate and num-CurrMrgCand is less than 5, the following steps are performed to add TPM candidates to the list:
   If the regular motion candidate is uni-prediction (either from List 0 or List 1), it is directly added to the merge list as an TPM candidate (denoted by TPM[numCurrMrgCand]) with numCurrMrgCand increased by 1.
   If the regular motion candidate is bi-prediction, add the following two candidates in order.
   i) Set variable numPrevMrgCand=numCurrMrgCand.
   ii) The motion information from List 0 is added to the TPM merge list (that is, modified to be uni-prediction from List 0) as a new TPM candidate denoted by TPM[numCurrMrgCand],
   if numCurrMrgCand is non-zero, isFirstUsedBi is true and TPM[numCurrMrgCand] is same as TPM[numPrevMrgCand−1], go to step iii).
   Otherwise, add TPM[numCurrMrgCand] and numCurrMrgCand increased by 1.
   iii) The motion information from List 1 is added to the TPM merge list (that is, modified to be uni-prediction from list 1) denoted by TPM[numCurrMrgCand],
   if numCurrMrgCand is non-zero, isFirstUsedBi is true and TPM[numCurrMrgCand] is same as TPM[numPrevMrgCand−1], go to the next regular merge candidate.
   Otherwise, add TPM[numCurrMrgCand] and numCurrMrgCand increased by 1.
   iv) isFirstUsedBi set to false.
6. If numCurrMrgCand is less than M, default motion candidates are added in order till numCurrMrgCand equal to M, such as the procedure in embodiment #1.

Embodiment #4: Uni-Prediction Candidate List for TPM (No Pruning for Regular Motion Candidates and Limited Pruning for TPM Candidates)

The following steps are involved to derive the TPM list and redundancy check (pruning process) for regular motion candidates are removed and TPM candidates pruning is applied. It is noted that the redundancy check/pruning process refers to checking an element to be added to a list to see if the element is redundant, and determining a subsequent step accordingly. The subsequent step can be discarding the element. The subsequent step can also be removing an existing element in the list that is redundant and adding the element to the list.

An example is described as follows:

1. Obtain regular motion candidates from $A_1$, B1, B0, $A_0$, B2 (corresponding to block 1-5 in FIG. 14) without pruning
2. Obtain regular motion candidates from Col1 and/or Col2 (corresponding to block 6-7 in FIG. 14) without pruning
3. Obtain regular motion candidates from HMVP candidates without pruning.
4. Set variable numCurrMrgCand=0, numCheckedCand=0;
5. For each available regular motion candidate and numCurrMrgCand is less than M, the following steps are performed to add TPM candidates to the list:

If the regular motion candidate is uni-prediction (either from List 0 or List 1),
1) If numCheckedCand is smaller than Thres, pruning is applied to the regular motion candidate. If the pruning process returns false (i.e., no identical or similar TPM candidates found), such a regular motion candidate added to the merge list as an TPM candidate with numCurrMrgCand increased by 1. Otherwise, it is directly added to the merge list as an TPM candidate with numCurrMrgCand increased by 1.
2) numCheckedCand increased by 1.

If the regular motion candidate is bi-prediction, add the following two candidate in order.
1) The motion information from List 0 (that is, modified to be uni-prediction from List 0) is set to be a first new TPM candidate.
2) If numCheckedCand is smaller than Thres, pruning is applied to the first new TPM candidate. If the pruning process returns false (i.e., no identical or similar TPM candidates found), such a first new TPM candidate added to the merge list as an TPM candidate with numCurrMrgCand increased by 1. Otherwise, it is directly added to the merge list as an TPM candidate with numCurrMrgCand increased by 1.
3) numCheckedCand increased by 1.
4) The motion information from List 1 (that is, modified to be uni-prediction from List 1) is set to be a second new TPM candidate.
5) If numCheckedCand is smaller than Thres, pruning is applied to the second new TPM candidate. If the pruning process returns false (i.e., no identical or similar TPM candidates found), such a second new TPM candidate added to the merge list as an TPM candidate with numCurrMrgCand increased by 1. Otherwise, it is directly added to the merge list as an TPM candidate with numCurrMrgCand increased by 1.
6) numCheckedCand increased by 1.

6. If numCurrMrgCand is less than M, default motion candidates are added in order till numCurrMrgCand equal to M, such as the procedure in embodiment #1.

The variable Thres may be pre-defined, e.g., 5 or 6. Or it may be adaptively changed based on how many regular motion candidates are available.

Embodiment #5: Uni-Prediction Candidate List for TPM (with Limited TPM Pruning)

An example is described as follows: the following steps are involved to unify the TPM list and regular merg list as much as possible. In one example, the regular merge list construction process before invoking the virtual merge candidates (i.e., terminates right after HMVP candidates checking process) is reused to obtain regular motion candidates. Alternatively, the regular merge list construction process before invoking the HVMP merge candidates checking process (i.e., terminates right after TMVP candidates checking process or right after spatial merge candidates checking process) is reused to obtain regular motion candidates 1. Set variable numCurrMrgCand=0
2. For each available regular motion candidate after pruning and numCurrMrgCand is less than M, the following steps are performed to add TPM candidates to the list:

If the regular motion candidate is uni-prediction (either from List 0 or List 1), the following apply:
i) It is directly added to the merge list as an TPM candidate with numCurrMrgCand increased by 1.
ii) Alternatively, if numCurrMrgCand is equal to 0, it is directly added to the merge list as an TPM candidate with numCurrMrgCand increased by 1, and if numCurrMrgCand is unequal to 0 and it is different from the previous TPM candidate with index equal (numCurrMrgCand−1), it is added to the merge list as an TPM candidate with numCurrMrgCand increased by 1.
iii) Alternatively, if numCurrMrgCand is unequal to 0 and it is different from the first TPM candidate with index equal 0, it is added to the merge list as an TPM candidate with numCurrMrgCand increased by 1.
iv) Alternatively, if numCurrMrgCand is unequal to 0 and it is different from the first or previous L TPM candidates, it is added to the merge list as an TPM candidate with numCurrMrgCand increased by 1.

If the regular motion candidate is bi-prediction, add the following two candidate in order.
i) The motion information from List 0 is added to the TPM merge list (that is, modified to be uni-prediction from List 0) as a new TPM candidate and numCurrMrgCand increased by 1.
(1) Alternatively, if numCurrMrgCand is unequal to 0 and it is different from the previous TPM candidate with index equal (numCurrMrgCand−1), it is added to the merge list as an TPM candidate with numCurrMrgCand increased by 1.
(2) Alternatively, if numCurrMrgCand is unequal to 0 and it is different from the first TPM candidate with index equal 0, it is added to the merge list as an TPM candidate with numCurrMrgCand increased by 1.
(3) Alternatively, if numCurrMrgCand is unequal to 0 and it is different from the first or previous L TPM candidates, it is added to the merge list as an TPM candidate with numCurrMrgCand increased by 1.
ii) If the motion information from List 1 is different from the previous TPM candidate with index equal (numCurrMrgCand−1), it is added to the merge list as an TPM candidate with numCurrMrgCand increased by 1.
(1) Alternatively, it is added to the TPM merge list (that is, modified to be uni-prediction from List 1) and numCurrMrgCand increased by 1.
(2) Alternatively, if it is different from the first TPM candidate with index equal 0, it is added to the merge list as an TPM candidate with numCurrMrgCand increased by 1.
(3) Alternatively, if it is different from the first/previous L TPM candidates, it is added to the merge list as an TPM candidate with numCurrMrgCand increased by 1.

3. If numCurrMrgCand is less than M, default motion candidates are added in the following steps in order till numCurrMrgCand equal to M
a) Set a variable numRef=minimum (number of reference pictures in list 0, number of reference pictures in list 1).
b) For each i being 0 . . . numRef−1, i) add a default motion candidate with MV set to (0,0) and reference picture index set to i, prediction direction set to list 0, and numCurrMrgCand increased by 1.

ii) add a default motion candidate with MV set to (0,0) and reference picture index set to i, prediction direction set to list 1, and numCurrMrgCand increased by 1.

c) Repeat the above step 2).

In one example, M is set to 5.

The default motion candidates utilized in step 3 may be replaced by other kinds of default motion candidates.

Whether two candidates are different as mentioned above may be defined as follows:

1) If low delay check flag is false (such as in random access configuration) or all reference pictures have smaller and/or equal POC values as current picture, two candidates are always treated to be different.
2) If either the POC value of the reference pictures of two candidates are different, or the motion vectors of two candidates are different, they are treated to be different.
3) If either the prediction direction or reference picture index of the reference pictures of two candidates are different, or the motion vectors of two candidates are different, they are treated to be different.

For the embodiments described above, it should be noted that different spatial/temporal blocks and/or different checking orders compared to that used in the regular merge candidate list may be used to derive regular motion candidates. Step 1)-3) may be also replaced by other kinds of regular motion candidate derivation process used for non-triangular block coding.

It should also be noted, when adding a new TPM candidate, no pruning/partial/full pruning to previously added TPM candidates may be invoked.

The regular motion candidate may be firstly compared to other regular motion candidate, if it is the same or similar to another one, such a regular motion candidate is not used to derive TPM candidates.

In addition to the steps described above, other kinds of TPM candidates may be derived and added to the TPM candidate list, such as averaged of two TPM candidates/averaged MVs of one bi-prediction regular motion candidate/new TPM candidates derived from existing TPM candidates with offsets, etc. al.

6 Example Implementations of the Disclosed Technology

Figure 35:
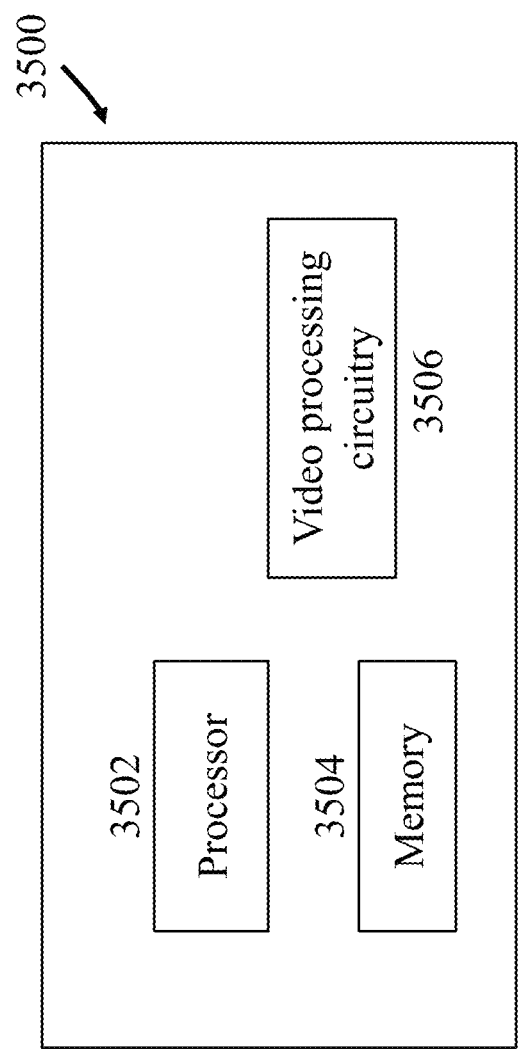
FIG. 35 is a block diagram of an example of a hardware platform for implementing a visual media decoding or a visual media encoding technique described in the present document.

FIG. 35 is a block diagram of a video processing apparatus 3500. The apparatus 3500 may be used to implement one or more of the methods described herein. The apparatus 3500 may be embodied in a smartphone, tablet, computer, Internet of Things (IoT) receiver, and so on. The apparatus 3500 may include one or more processors 3502, one or more memories 3504 and video processing hardware 3506. The processor(s) 3502 may be configured to implement one or more methods (including, but not limited to, methods 2900, 3000, 3100, 3200, 3300 and 3400) described in the present document. The memory (memories) 3504 may be used for storing data and code used for implementing the methods and techniques described herein. The video processing hardware 3506 may be used to implement, in hardware circuitry, some techniques described in the present document.

In some embodiments, the video coding methods may be implemented using an apparatus that is implemented on a hardware platform as described with respect to FIG. 35.

The following listing of clauses described example embodiments that implement some of the disclosed techniques.

1. A method for video processing, comprising: identifying a merge candidate to be a default motion candidate; adding, based on the identifying, the merge candidate to a merge candidate list; and reconstructing, based on the merge candidate list, the current video block.

2. The method of clause 1, wherein the merge candidate comprises a 6-parameter affine merge candidate, and wherein the merge candidate list comprises an affine or sub-block merge candidate list.

3. The method of clause 2, wherein a motion vector of the default motion candidate is set to (0, 0).

4. The method of clause 3, wherein a prediction direction for the motion vector is set to uni-prediction, and wherein the current video block is located in a P slice.

5. The method of clause 3, wherein a prediction direction for the motion vector is set to bi-prediction, and wherein the current video block is located in a B slice.

6. The method of clause 1, wherein the merge candidate list comprises an affine or sub-block merge candidate list, wherein a reference picture index of the default motion candidate is set to K, and wherein K is a non-negative integer.

7. The method of clause 1, wherein the merge candidate comprises an affine model, wherein the merge candidate list comprises an affine or sub-block merge candidate list, and wherein a type of the affine model is based on available motion candidates.

8. The method of clause 7, wherein the type of the affine model is based on an affine model of a first of the available motion candidates.

9. The method of clause 7, wherein the type of the affine model is based on an affine model that is most frequently used amongst the available motion candidates.

10. The method of clause 1, wherein the merge candidate list comprises a triangular prediction mode (TPM) candidate list.

11. The method of clause 10, further comprising: repeatedly adding, upon determining the merge candidate list is not full, the default motion candidate to the merge candidate list.

12. The method of clause 11, wherein the default motion candidate is associated with a reference picture index that is set to M, wherein M is a non-negative integer.

13. The method of clause 12, wherein M is predetermined.

14. The method of clause 12, wherein M is signaled in a sequence parameter set (SPS), a video parameter set (VPS), a picture parameter set (PPS), a picture header, a slice header, a tile group header or a coding tree unit (CTU).

15. The method of clause 12, wherein M is further associated with a reference picture index of a co-located picture.

16. The method of clause 12, wherein a prediction direction of the default motion candidate is based on a slice type of the current video block, a tile type of the current video block or a picture type of the current video block.

17. The method of clause 10, wherein the default motion candidate comprises a zero motion vector associated with reference picture index 0 in List 0, and wherein the method further comprises: adding, upon determining that the merge candidate list is not full, additional default motion candidates to the merge candidate list in the following order: zero motion vectors associated with reference picture indices 1 to NList0−1, and zero motion vectors associated with reference picture indices 0 to NList1−1; and repeatedly adding, upon determining that the merge candidate list is not full, zero motion vectors associated with a predetermined reference picture index from List 0 or List 1 to the merge candidate list, wherein NList0 and NList1 are integer sizes of List 0 and List 1, respectively.

18. The method of clause 10, wherein the default motion candidate comprises a zero motion vector associated with reference picture index 0 in List 0, and wherein the method further comprises: adding, upon determining that the merge candidate list is not full, additional default motion candidates to the merge candidate list in the following order: a zero motion vector associated with reference picture index 0 in List 1, a zero motion vector associated with reference picture index M in List 0, and a zero motion vector associated with reference picture index M in List 1, wherein M is an integer that equals 1, 2, . . . min(NList0, NList1)−1; and repeatedly adding, upon determining that the merge candidate list is not full, zero motion vectors associated with a predetermined reference picture index from List 0 or List 1 to the merge candidate list, wherein NList0 and NList1 are integer sizes of List 0 and List 1, respectively.

19. The method of clause 1, wherein a reference picture index or a prediction direction of the default motion candidate is based on one or more available motion candidates.

20. The method of clause 19, wherein the reference picture index or the prediction direction is based on a reference index or a prediction direction of the first of the one or more available motion candidates, respectively.

21. The method of clause 19, wherein the reference picture index or the prediction direction is based on a reference index or a prediction direction that is most frequently used amongst the one or more available motion candidates, respectively.

22. The method of any of clauses 19 to 21, wherein the one or more available motion candidates comprises all available motion candidates.

23. The method of any of clauses 19 to 21, wherein the one or more available motion candidates comprises a first K available motion candidates, wherein K is a positive integer.

24. The method of clause 1, wherein the default motion candidate is associated with a reference picture that is different from a current picture that comprises the current video block.

25. The method of clause 1, wherein the merge candidate list comprises an advanced motion vector prediction (AMVP) candidate list.

26. A method for video processing, comprising: deriving a triangular prediction mode (TPM) candidate from a regular motion candidate of a current video block; selectively adding the TPM candidate to a TPM candidate list; and reconstructing, based on the TPM candidate list, the current video block.

27. The method of clause 26, wherein the regular motion candidate comprises a pairwise average candidate.

28. The method of clause 27, wherein the TPM candidate comprises List 0 motion information of the pairwise average candidate.

29. The method of clause 27, wherein the TPM candidate comprises List 1 motion information of the pairwise average candidate.

30. The method of clause 27, wherein the TPM candidate contains averaged motion information of List 0 motion information and List 1 motion information of the regular motion candidate.

31. The method of clause 26, wherein the regular motion candidate is derived from a bottom-right co-located temporal block, a central co-located temporal block, or at least one temporal block that is different from the bottom-right and central co-located temporal blocks.

32. The method of clause 31, wherein the at most one temporal block is identified by the regular motion candidate.

33. The method of clause 26, wherein the TPM candidate comprises a reference picture that is not associated with a current picture referencing (CPR) mode, and wherein the TPM candidate is not added to the TPM candidate list.

34. The method of clause 26, wherein the TPM candidate comprises a reference picture that is associated with a current picture referencing (CPR) mode, and wherein the TPM candidate is not added to the TPM candidate list.

35. A method for video processing, comprising: selecting, upon determining that a current video block is a triangular prediction mode (TPM) coded block, a weighting factor group; and reconstructing, based on the weighting factor group, the current video block.

36. The method of clause 35, further comprising: using the weighting factor group to replace a weighted average process.

37. The method of clause 35, wherein the weighting factor group is {0, 0, . . . , 0}.

38. The method of clause 35, wherein the weighting factor group is {1, 1, . . . , 1}.

39. The method of clause 35, wherein reconstructing the current video block comprises reconstructing a sub-block of the current video block, and wherein the selecting the weighting factor group is based on a location of the sub-block in the current video block.

40. The method of clause 35, wherein the selecting is further based on at least one of a coding mode of the current video block, a precision of a motion vector associated with the current video block, or a color component of the current video block.

41. The method of clause 40, wherein the precision of the motion vector is an integer precision.

42. The method of clause 40, wherein the color component of the current video block is a chroma component of the current video block.

43. The method of clause 35, wherein the selecting is further based on a value of a low-delay check flag in a bitstream representation of the current video block.

44. The method of clause 35, wherein the selecting is further based on a scaled motion vector difference associated with the current video block.

45. The method of clause 44, wherein a first motion vector MV0(x0, y0) is associated with a first partition of the TPM coded block, wherein a second motion vector MV1(x1, y1) is associated with a second partition of the TPM coded block, and wherein the method further comprises: generating a scaled motion vector MV1'(x1', y1') by scaling the second motion vector to the first motion vector.

46. The method of clause 45, wherein $F(x1', x0, y1', y0) \geq T$, wherein $F(\bullet)$ is a function, and wherein T is a non-negative integer threshold.

47. The method of clause 46, wherein T is predetermined.

48. The method of clause 46, wherein T is signaled in a sequence parameter set (SPS), a video parameter set (VPS), a picture parameter set (PPS), a picture header, a slice header, a tile group header or a coding tree unit (CTU).

49. The method of clause 46, wherein T is based on a size of the current video block, a coding mode of the current video block, a slice type of the current video block or a picture type of the current video block.

50. The method of any of clauses 46 to 49, wherein $F = \max(abs(x1'-x0), abs(y1'-y0))$.

51. The method of any of clauses 46 to 49, wherein $F = \min(abs(x1'-x0), abs(y1'-y0))$.

52. The method of any of clauses 46 to 49, wherein F=abs(x1'−x0)+abs(y1'−y0).

53. The method of any of clauses 46 to 49, wherein F is an average of MV0 and MV1'.

54. The method of clause 35, wherein the selecting is further based on a picture order count (POC) distance between two reference pictures.

55. A method for video processing, comprising: generating pruned triangular prediction mode (TPM) candidates by selectively pruning one or more TPM candidates that are derived from a plurality of regular merge candidates; and reconstructing, based on the pruned TPM candidates, a current video block.

56. The method of clause 55, wherein the one or more TPM candidates are pruned, and wherein the plurality of regular merge candidates comprises a uni-prediction or a bi-prediction regular merge candidate.

57. The method of clause 55, wherein the selectively pruning comprises pruning a first K candidates of the one or more TPM candidates, wherein K is an integer.

58. The method of clause 57, wherein 5≤K≤8.

59. The method of clause 55, wherein the plurality of regular merge candidates comprises a first bi-prediction regular merge candidate.

60. The method of clause 55, wherein the one or more TPM candidates are pruned, and wherein the method further comprises: refraining from pruning the plurality of regular merge candidates.

61. A method for video processing, comprising: inserting, based on an insertion order, a first plurality of motion candidates from a first list and a second plurality of motion candidates from a second list into a candidate list, wherein the insertion order is based on a previous insertion order of a third plurality of motion candidates into the candidate list; and reconstructing, based on the candidate list, a current video block.

62. The method of clause 61, wherein the third plurality of motion candidates comprises two candidates derived from one bi-prediction regular motion candidate, wherein the candidate from the second list is added before the other candidate from the first list, and wherein the insertion order comprises the first plurality of motion candidates followed by the second plurality of motion candidates.

63. The method of clause 61, wherein the third plurality of motion candidates comprises one uni-prediction candidate from the first list, and wherein the insertion order comprises the second plurality of motion candidates followed by the first plurality of motion candidates.

64. A method for video processing, comprising: determining a slice type and a value of a triangular prediction mode (TPM) flag in a sequence parameter set (SPS) associated with a current video block; and reconstructing, based on the slice type and the value, the current video block.

65. The method of clause 64, wherein the slice type is a B slice.

66. The method of clause 64, wherein the TPM flag is further signaled in a video parameter set (VPS), a picture parameter set (PPS), a picture header, a slice header or a tile group header.

67. A method for video processing, comprising: checking one or more history-based motion vector prediction (HMVP) candidates for addition to a merge candidate list; checking, after checking the one or more HMVP candidates, a set of new motion candidates for addition to the merge candidate list, wherein each of the set of new motion candidates is not based on previously added HMVP information and is not used to update an HMVP table; and reconstructing, based on the set of new motion candidates, a current video block.

68. The method of clause 67, wherein the set of new motion candidates comprises a pairwise average bi-prediction candidate, a combined bi-prediction candidate, or a zero motion candidate.

69. The method of clause 67 or 68, wherein a height or a width of the current video block is less than equal to M.

70. The method of clause 69, wherein M=4.

71. The method of clause 67, further comprising: determining, after checking the one or more HMVP candidates, that the merge candidate list is not full; and repeatedly adding, until the merge candidate list is full, a last entry of the HMVP table to the merge candidate list.

72. The method of any of clauses 1 to 71, further comprising: reconstructing other video blocks in a same picture as the current video block.

73. A method for video processing, comprising: checking or updating a history-based motion vector prediction (HMVP) table; deriving, based on the checking or updating, a motion candidate; coding a current video block with the motion candidate; and refraining from updating the HMVP table using motion information based on the current video block.

74. The method of clause 73, wherein the motion candidate is a pairwise average bi-prediction candidate, a combined bi-prediction candidate, a zero motion candidate or a default motion candidate.

75. The method of clause 73 or 74, wherein a height or a width of the current video block is less than equal to M.

76. The method of clause 75, wherein M=4.

77. A method of video processing, comprising: controlling, during a conversion between a current video block and a bitstream representation of the current video block, generation of a merge candidate list for an intra coding mode based on a size of a regular merge candidate list; and performing the conversion using the merge candidate list for the intra coding mode.

78. The method of clause 77, wherein the intra coding mode is an intra block copy (IBC) mode.

79. The method of any of clauses 77-78, wherein the controlling includes upon determining that the regular merge candidate list is smaller than the merge candidate list for the intra coding mode, adding additional candidates to the merge candidate list for the intra coding mode.

80. The method of any of clauses 77-78, wherein a merge candidate index signaled in the bitstream representation is smaller than the size of the regular merge candidate list.

81. The method of any of clauses 77-78, wherein a size of the merge candidate list for the intra coding mode is no larger than a predetermined number P.

82. The method of clause 81, wherein the predetermined number P is signaled in the bitstream representation.

83. The method of any of clauses 77-78, wherein a difference in the size of the merge candidate list for the intra coding mode and the size of the regular merge candidate list is signaled in the bitstream representation.

Example 29 in the previous section provides additional examples of embodiments of clauses 77-83.

84. A video processing method, comprising: performing, for a history based motion vector predictor (HMVP) table for a conversion between a current video block and a bitstream representation of the current video block, a reset operation at a boundary of a video region in which an intra coding mode is enabled, wherein the current video block is a part of the video region; and performing the conversion using the HMVP table.

85. The method of clause 84, wherein the video region is a tile group.

86. The method of clause 84, wherein the reset operation is performed for the video region for which an Intra-tile group is used for coding.

87. The method of any of clauses 77-86, wherein the conversion comprises generating the bitstream representation from the current video block or generating the current video block from the bitstream representation.

Example item 30 provides additional embodiments of clauses 84 to 87.

88. An apparatus in a video system comprising a processor and a non-transitory memory with instructions thereon, wherein the instructions upon execution by the processor, cause the processor to implement the method in any one of clauses 1 to 87.

89. A computer program product stored on a non-transitory computer readable media, the computer program product including program code for carrying out the method in any one of clauses 1 to 87.

Figure 36:
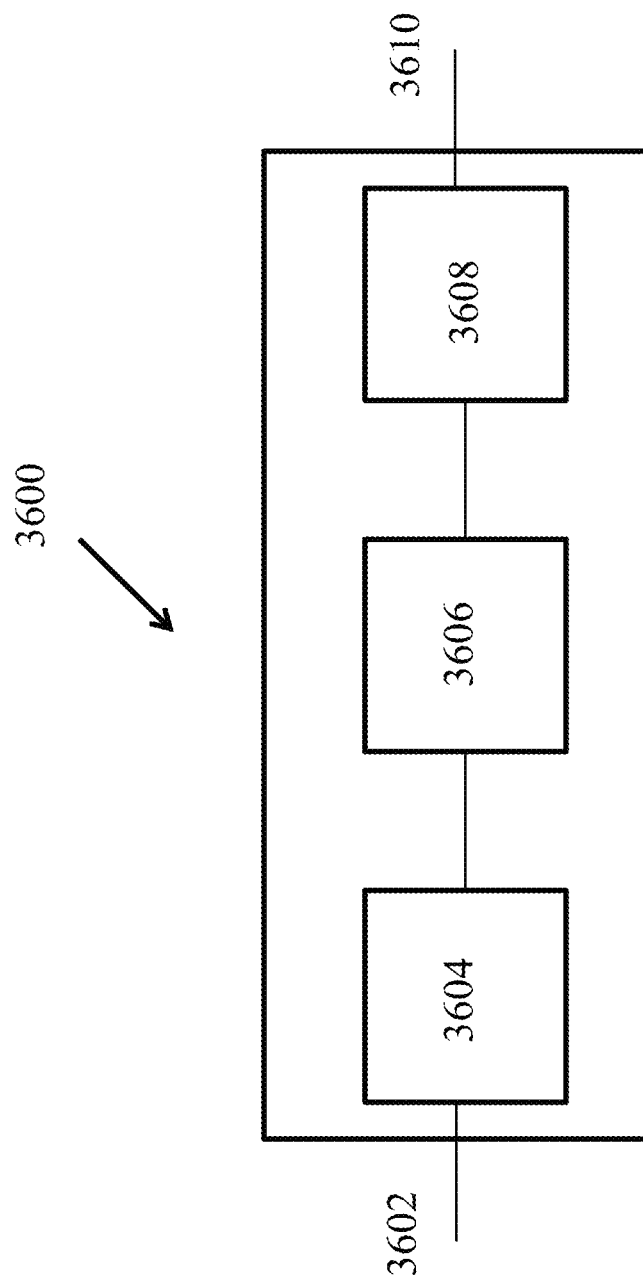
FIG. 36 is a block diagram of an example video processing system in which disclosed techniques may be implemented.

FIG. 36 is a block diagram showing an example video processing system 3600 in which various techniques disclosed herein may be implemented. Various implementations may include some or all of the components of the system 3600. The system 3600 may include input 3602 for receiving video content. The video content may be received in a raw or uncompressed format, e.g., 8 or 10 bit multi-component pixel values, or may be in a compressed or encoded format. The input 3602 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3600 may include a coding component 3604 that may implement the various coding or encoding methods described in the present document. The coding component 3604 may reduce the average bitrate of video from the input 3602 to the output of the coding component 3604 to produce a coded representation of the video. The coding techniques are therefore sometimes called video compression or video transcoding techniques. The output of the coding component 3604 may be either stored, or transmitted via a communication connected, as represented by the component 3606. The stored or communicated bitstream (or coded) representation of the video received at the input 3602 may be used by the component 3608 for generating pixel values or displayable video that is sent to a display interface 3610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 37:
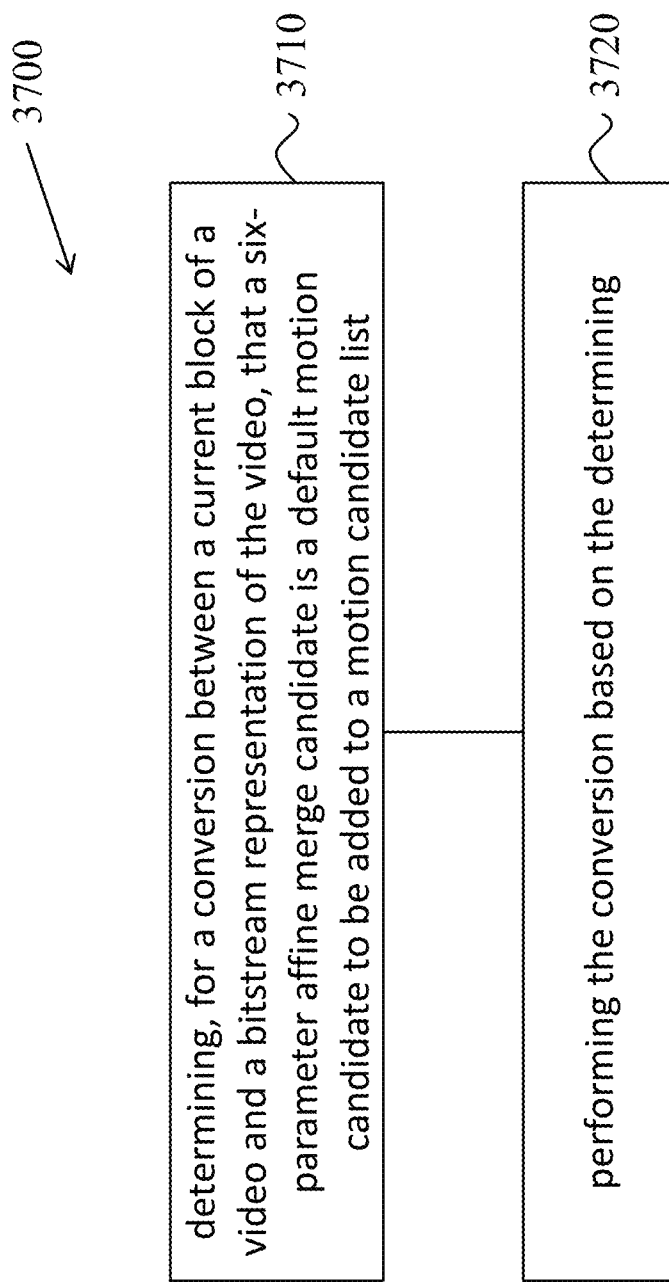
FIG. 37 is a flowchart representation of a method for video processing in accordance with the present disclosure.

FIG. 37 is a flowchart representation of a method 3700 for video processing in accordance with the present disclosure. The method 3700 includes, at operation 3710, determining, for a conversion between a current block of a video and a bitstream representation of the video, that a six-parameter affine merge candidate is a default motion candidate to be added to a motion candidate list. The default motion candidate is added to the motion candidate list in response to a number of candidates in the motion candidate list being less than a maximum value allowed. The method 3700 also includes, at operation 3720, performing the conversion based on the determining.

In some embodiments, the merge candidate list comprises an affine merge candidate list or a sub-block merge candidate list. In some embodiments, the default motion candidate has a zero motion vector (0, 0). In some embodiments, in case the current block is located in a P slice, a prediction direction of the default motion candidate is set to uni-prediction based on a reference picture List 0. In some embodiments, in case the current block is located in a B slice, a prediction direction of the default motion candidate is set to bi-prediction.

Figure 38:
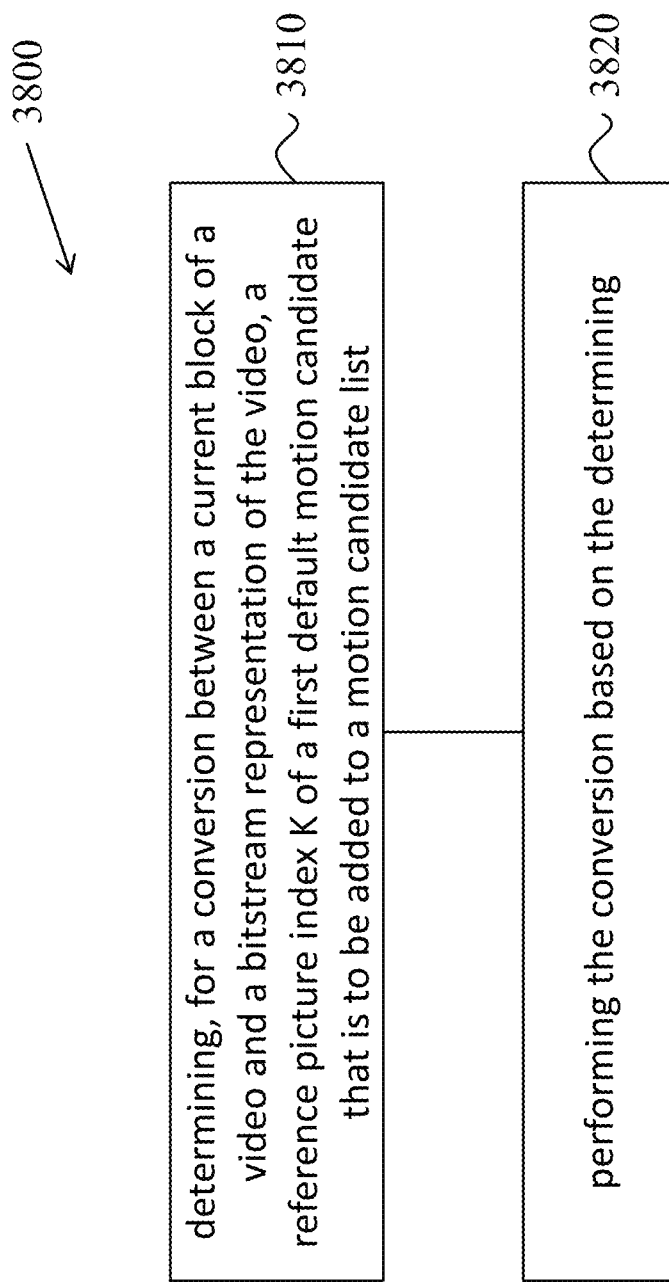
FIG. 38 is a flowchart representation of another method for video processing in accordance with the present disclosure.

FIG. 38 is a flowchart representation of a method 3800 for video processing in accordance with the present disclosure. The method 3800 includes, at operation 3810, determining, for a conversion between a current block of a video and a bitstream representation of the video, a reference picture index K of a first default motion candidate that is to be added to a motion candidate list, K being a non-negative integer. The first default motion candidate is added to the motion candidate list in response to a number of candidates in the motion candidate list being less than a maximum value allowed. The method 3800 also includes, at operation 3820, performing the conversion based on the determining.

In some embodiments, K=0. In some embodiments, the method includes determining a second default motion candidate that is to be added to the motion candidate list. The first and second default motion candidates are added to the motion candidate list according to an increasing order of respective reference picture indices.

Figure 39:
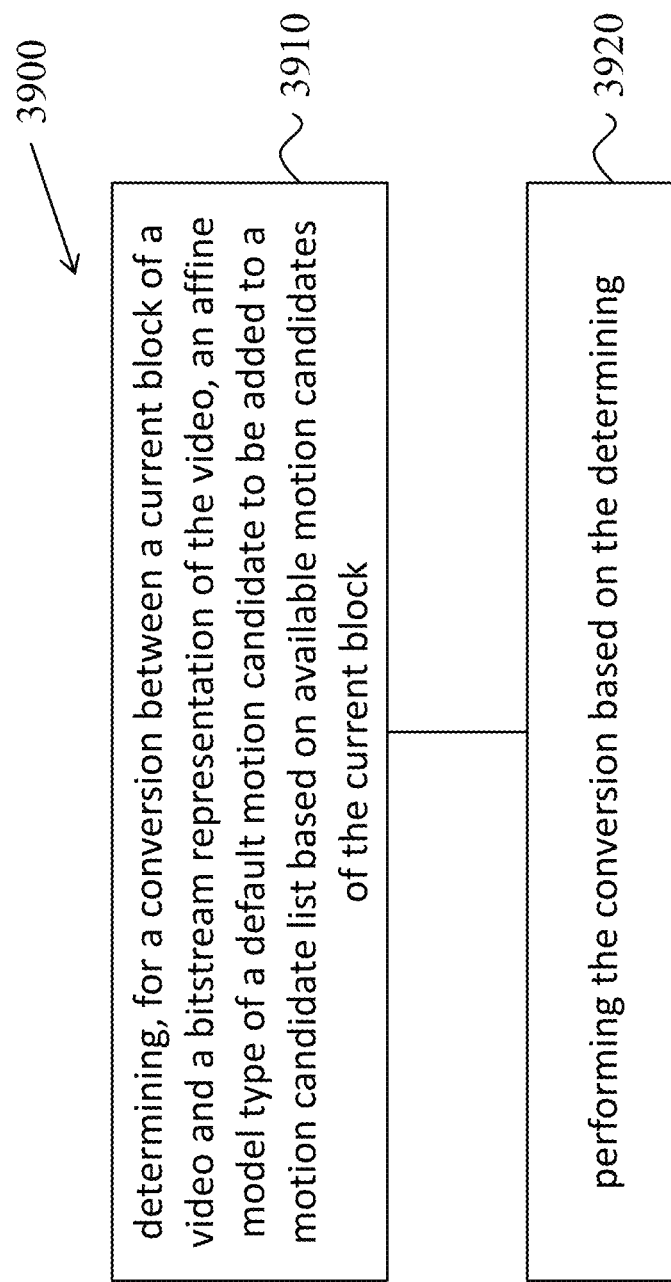
FIG. 39 is a flowchart representation of another method for video processing in accordance with the present disclosure.

FIG. 39 is a flowchart representation of a method 3900 for video processing in accordance with the present disclosure. The method 3900 includes, at operation 3910, determining, for a conversion between a current block of a video and a bitstream representation of the video, an affine model type of a default motion candidate to be added to a motion candidate list based on available motion candidates of the current block. The default motion candidate is added to the motion candidate list in response to a number of candidates in the motion candidate list being less than a maximum value allowed. The method 3900 also includes, at operation 3920, performing the conversion based on the determining.

In some embodiments, the affine model type of the default motion candidate is same as an affine model type of a first available motion candidate of the current block. In some embodiments, the affine model type of the default motion candidate is an affine model type that is most frequently used by a subset or all of the available motion candidates of the current block.

Figure 40:
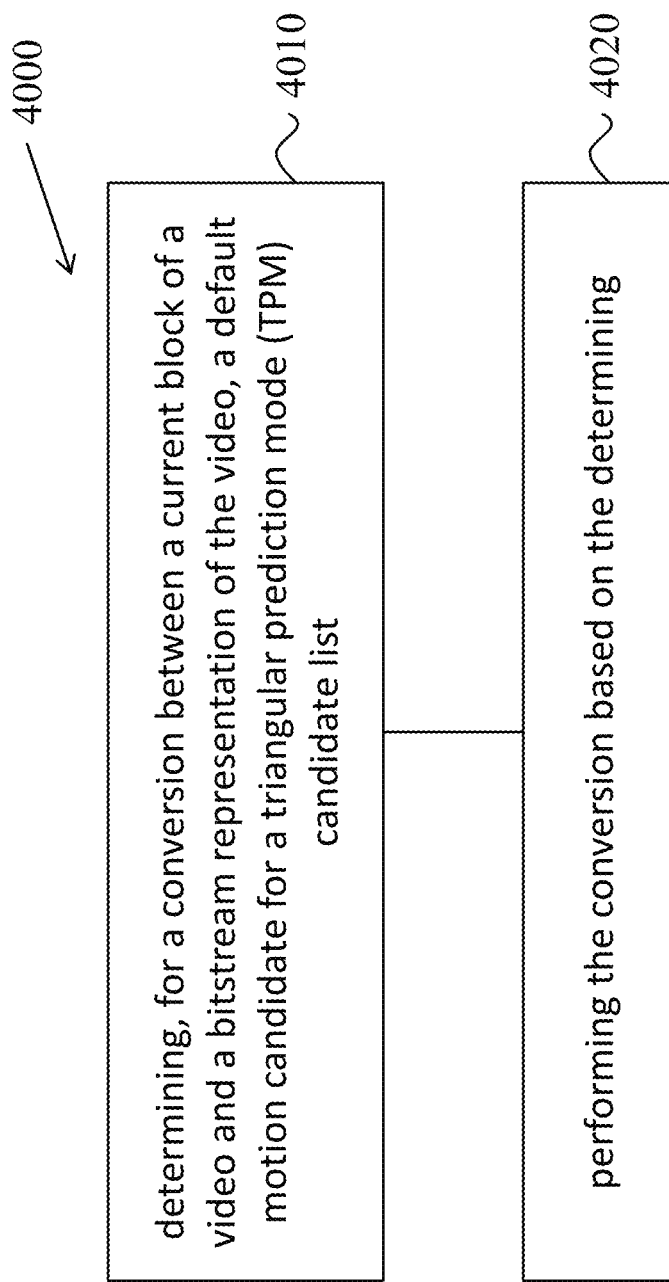
FIG. 40 is a flowchart representation of another method for video processing in accordance with the present disclosure.

FIG. 40 is a flowchart representation of a method 4000 for video processing in accordance with the present disclosure. The method 4000 includes, at operation 4010, determining, for a conversion between a current block of a video and a bitstream representation of the video, a default motion candidate for a geometry prediction mode candidate list. The triangular prediction mode partitions the current video block into multiple partitions. The method 4000 also includes, at operation 4020, performing the conversion based on the determining.

In some embodiments, the default motion candidate is repeatedly added to the geometry prediction mode candidate list until the geometry prediction mode candidate list is full. In some embodiments, the default motion candidate has a zero motion vector. In some embodiments, a reference picture index of the default motion candidate is equal to M, M being a non-negative integer. In some embodiments, M=0.

In some embodiments, a reference picture index of the default motion candidate is signaled in a sequence parameter set (SPS), a video parameter set (VPS), a picture parameter set (PPS), a picture header, a slice header, a tile group header or a coding tree unit (CTU). In some embodiments, the reference picture index of the default motion candidate is associated with a picture co-located with the current block. In some embodiments, a prediction direction of the default motion candidate is based on a slice type, a tile type, or a picture type of the current block.

In some embodiments, a reference picture List 0 comprises N reference pictures, and a reference picture List 1 comprises M reference pictures. The geometry prediction mode candidate list is constructed by inserting a first set of default candidates to the geometry prediction mode candidate list, each default candidate comprising a predefined motion vector and a reference picture index in a range of 0 to N−1 associated with the reference picture List 0. In case the geometry prediction mode candidate list is not full, constructing the list by inserting a second set of default candidates to the geometry prediction mode candidate list, each default candidate comprising the predefined motion vector and a reference picture index in a range of 0 to M−1 associated with the reference picture List 1. In case the geometry prediction mode candidate list is not full, constructing the list by inserting a third default candidate to the geometry prediction mode candidate list repeatedly until the geometry prediction mode candidate list is full, the third default candidate comprising the predefined motion vector and a specific reference picture index associated with either the reference picture List 0 or the reference picture List 1.

In some embodiments, a reference picture List 0 comprises N reference pictures and a reference picture List 1 comprises M reference pictures. The geometry prediction mode candidate list is constructed by inserting a first default candidate and a second default candidate to the geometry prediction mode candidate list repeatedly. The first default candidate comprises a predefined motion vector and a first reference picture index, and the second default candidate comprises the predefined motion vector and a second reference picture index. The first reference picture index is selected based on a predefined order from a range of 0 to N−1 associated with the reference picture List 0, and the second reference picture index is selected based on a predefined order from a range of 0 to M−1 associated with the reference picture List 1. In case the geometry prediction mode candidate list is not full, the list is constructed by adding a third default candidate to the geometry prediction mode candidate list repeatedly until the geometry prediction mode candidate list is full. The third default candidate comprises the predefined motion vector and a specific reference picture index associated with either the reference picture List 0 or the reference picture List 1.

In some embodiments, the predefined order comprises an ascending order or a descending order. In some embodiments, the predefined motion vector comprises a zero motion vector. In some embodiments, the predefined motion vector comprises a default motion vector that is not a zero motion vector. In some embodiments, default candidates inserted before inserting of the third default candidate are replaced by motion candidates having unequal motion vectors. In some embodiments, the default motion candidate comprises a geometry prediction mode virtual motion candidate, and the geometry prediction mode virtual motion candidate is derived based on available geometry prediction mode candidates of the current block.

In some embodiments of the above methods, a reference picture index or a prediction direction of the default motion candidate is based on available motion candidates of the current block. In some embodiments, the reference picture index or the prediction direction of the default motion candidate is same as a reference picture index or a prediction direction of a first available motion candidate of the current block. In some embodiments, the reference picture index or the prediction direction of the default motion candidate is a reference picture index or a prediction direction that is most frequently used by a subset or all of the available motion candidates of the current block. In some embodiments, a reference picture index of the default motion candidate is based on reference pictures in a reference picture list. In some embodiments, the reference picture index of the default motion candidate is based on a reference picture having a smallest picture-order-count distance relative to a current picture in which the current block is located. In some embodiments, the current block has at least one available motion candidate. In some embodiments, the default motion candidate is a Kth default motion candidate of the current block. In some embodiments, K=1.

In some embodiments of the above methods, the default motion candidate is determined based on a virtual motion candidate that is derived based on available motion candidates of the current block. In some embodiments, the current block is located in a current picture, and the default motion candidate is associated with a reference picture that is different than the current picture. In some embodiments, the merge candidate list comprises an advanced motion vector prediction (AMVP) candidate list.

Figure 41:
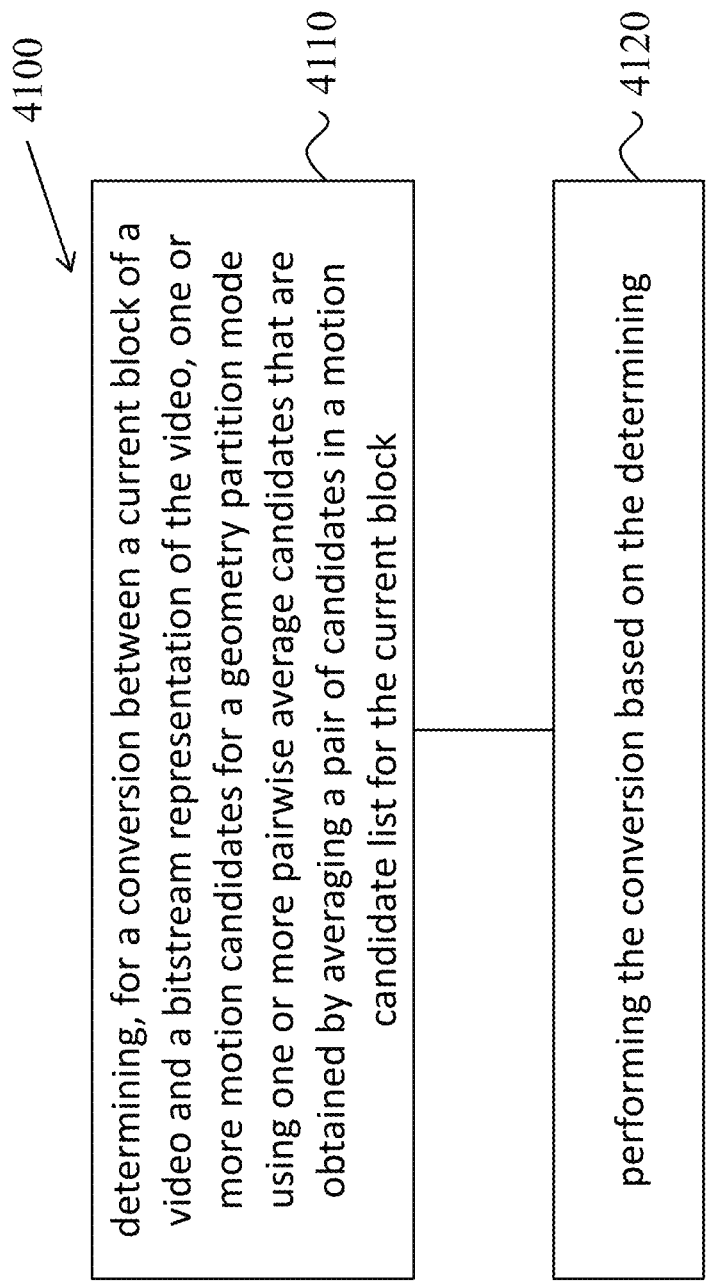
FIG. 41 is a flowchart representation of another method for video processing in accordance with the present disclosure.

FIG. 41 is a flowchart representation of a method 4100 for video processing in accordance with the present disclosure. The method 4100 includes, at operation 4110, determining, for a conversion between a current block of a video and a bitstream representation of the video, one or more motion candidates for a geometry partition mode using one or more pairwise average candidates that are obtained by averaging a pair of candidates in a motion candidate list for the current block. The triangular prediction mode partitions the current video block into multiple partitions. The method 4100 also includes, at operation 4120, performing the conversion based on the determining.

In some embodiments, the merge candidate list comprises an affine merge candidate list or a sub-block merge candidate list. In some embodiments, the default motion candidate has a zero motion vector (0, 0). In some embodiments, in case the current block is located in a P slice, a prediction direction of the default motion candidate is set to uni-prediction based on a reference picture List 0. In some embodiments, in case the current block is located in a B slice, a prediction direction of the default motion candidate is set to bi-prediction.

Figure 42:
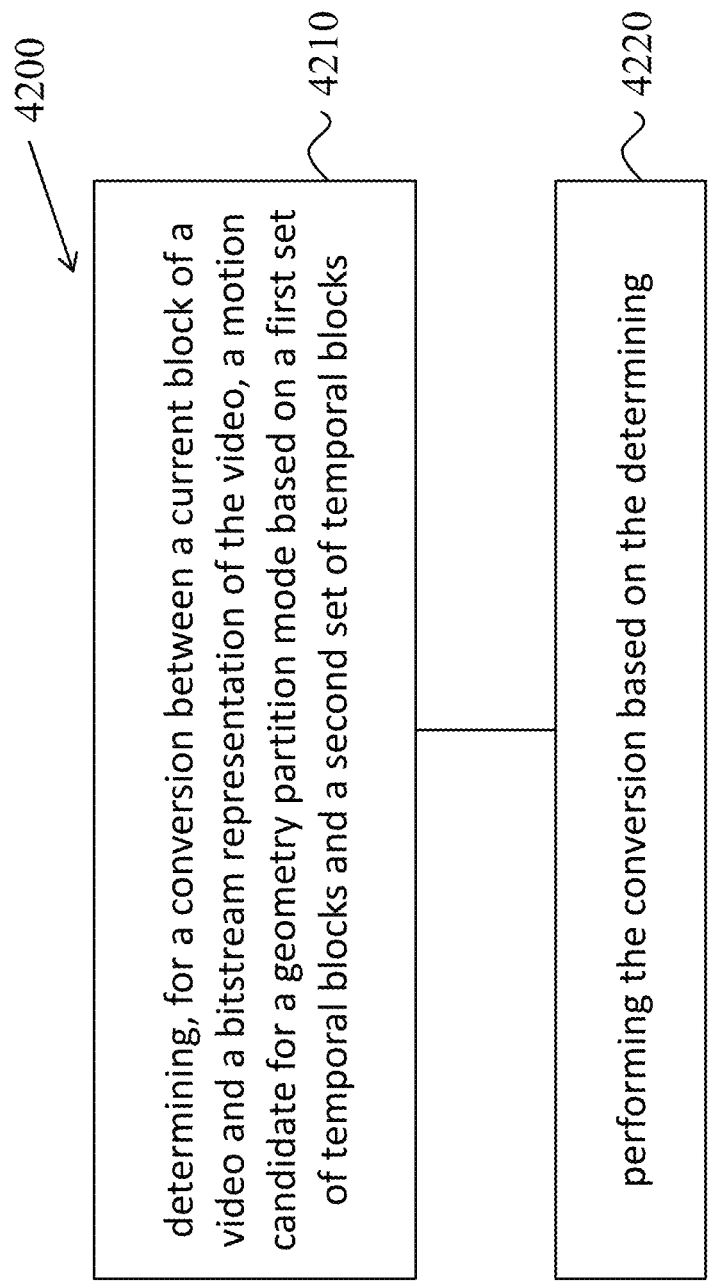
FIG. 42 is a flowchart representation of another method for video processing in accordance with the present disclosure.

FIG. 42 is a flowchart representation of a method 4200 for video processing in accordance with the present disclosure. The method 4200 includes, at operation 4210, determining, for a conversion between a current block of a video and a bitstream representation of the video, a motion candidate for a geometry partition mode based on a first set of temporal blocks and a second set of temporal blocks. The first set of temporal blocks comprises a bottom-right temporal block and a central temporal block that are co-located with the current block, and the second set is different than the first set. The method 4200 also includes, at operation 4220, performing the conversion based on the determining.

In some embodiments, the second set of temporal blocks is identified based on existing motion candidates. In some embodiments, only one of the bottom-right temporal block or the central temporal block in the first set is used for determining the motion candidate. In some embodiments, at least one temporal block in the first set of temporal blocks is excluded for determining the motion candidate. In some embodiments, the motion candidate is added to a candidate list for the geometry partition mode.

Figure 43:
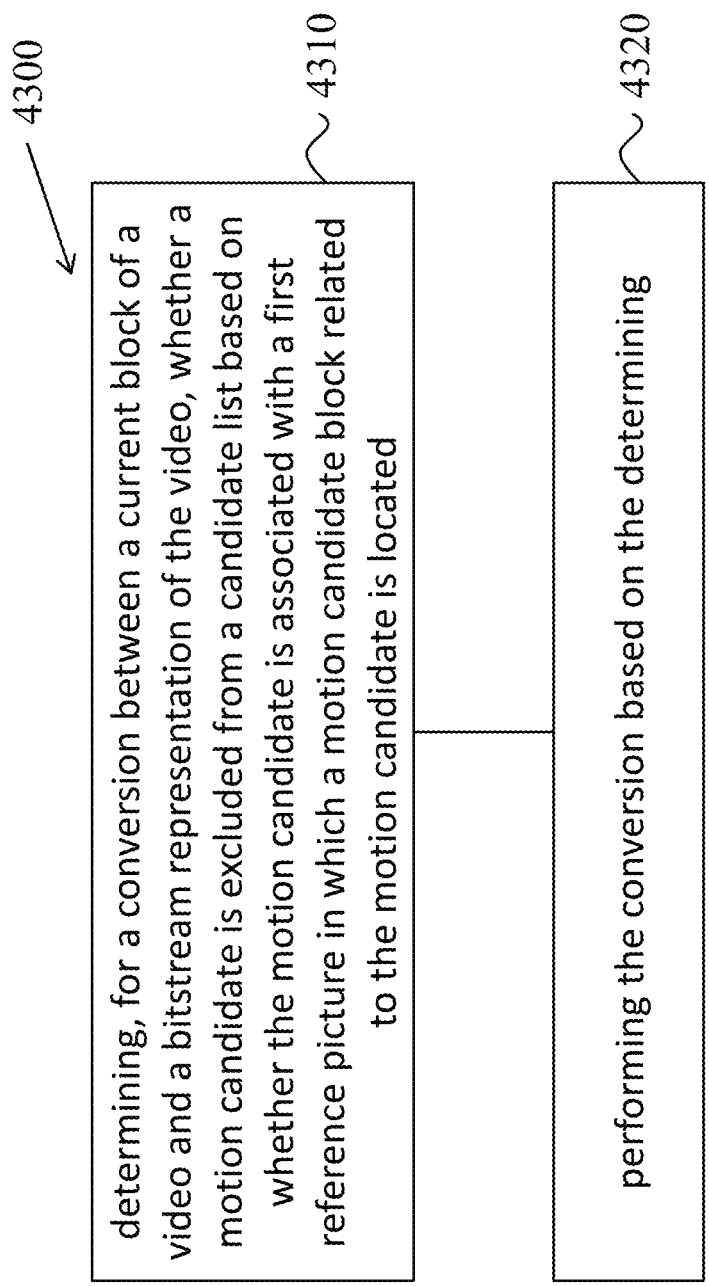
FIG. 43 is a flowchart representation of another method for video processing in accordance with the present disclosure.

FIG. 43 is a flowchart representation of a method 4300 for video processing in accordance with the present disclosure. The method 4300 includes, at operation 4310, determining, for a conversion between a current block of a video and a bitstream representation of the video, whether a motion candidate is excluded from a candidate list based on whether the motion candidate is associated with a first reference picture in which a motion candidate block related to the motion candidate is located. The current block is coded with a second reference picture not pointing to the current picture. The method 4300 also includes, at operation 4320, performing the conversion based on the determining.

In some embodiments, the motion candidate is excluded from the candidate list in case the motion candidate is associated with the first reference picture. In some embodiments, the motion candidate is excluded from a candidate list in case the motion candidate is not associated with the first reference picture. The motion candidate is associated with a third reference picture not in the current picture.

Figure 44:
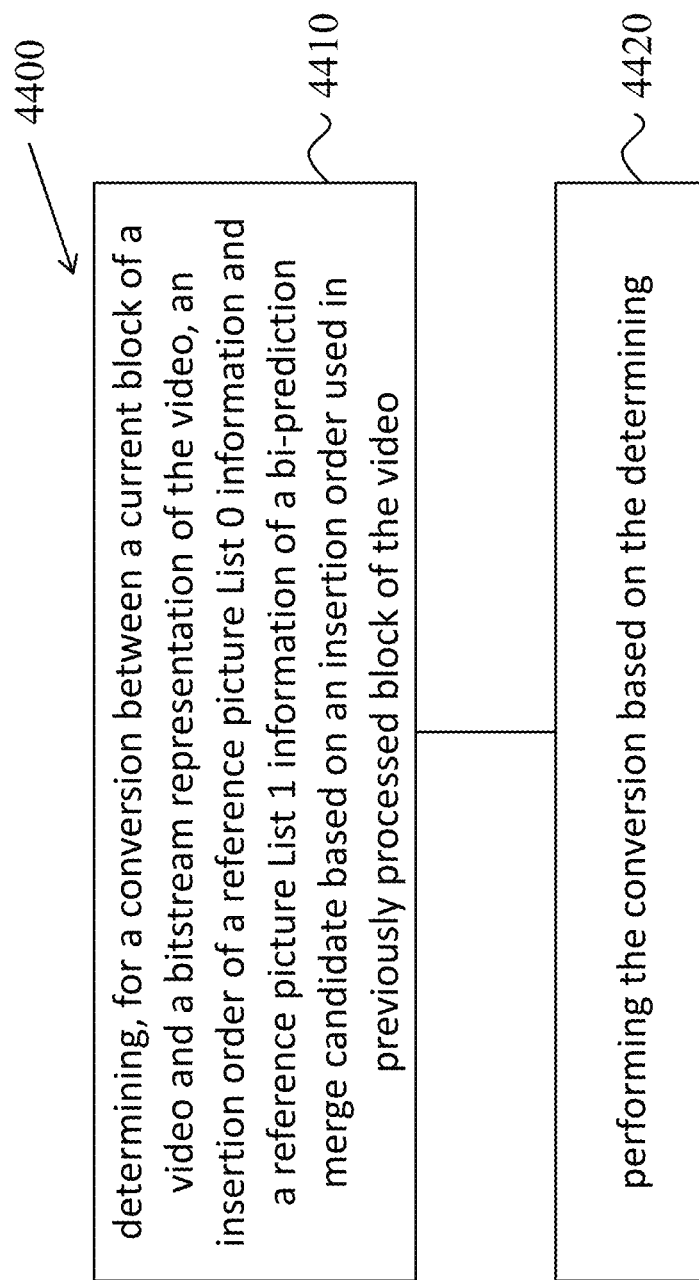
FIG. 44 is a flowchart representation of another method for video processing in accordance with the present disclosure.

FIG. 44 is a flowchart representation of a method 4400 for video processing in accordance with the present disclosure. The method 4400 includes, at operation 4410, determining, for a conversion between a current block of a video and a bitstream representation of the video, an insertion order of a reference picture List 0 information and a reference picture List 1 information of a bi-prediction merge candidate based on an insertion order used in previously processed block of the video. The method 4400 also includes, at operation 4420, performing the conversion based on the determining.

In some embodiments, the two merge candidates are two consecutive bi-prediction candidates in the merge candidate list. For a first merge candidate of the two merge candidates, the reference picture List X information is placed before the reference picture List Y information, and, for a second merge candidate of the two merge candidates, the reference picture List Y information is placed before the reference picture List X information, X+Y being equal to 1, X and Y being non-negative integers. In some embodiments, a first of the two merge candidates is a uni-prediction candidate associated with a reference list X and a second of the two merge candidates is a bi-prediction candidate positioned consecutively after the first merge candidate in the merge candidate list. For the second merge candidate, the reference picture List Y information is placed before the reference picture List X information, X+Y being equal to 1, X and Y being non-negative integers. In some embodiments, a first of the two merge candidates is a bi-prediction candidate. The reference picture List 0 information of the first merge candidate is placed before the reference picture List 1 information of the first merge candidate. A geometry partition mode candidate is determined according to the reference picture List 0 information, the geometry partition mode including partitioning the current block into multiple partitions.

Figure 45:
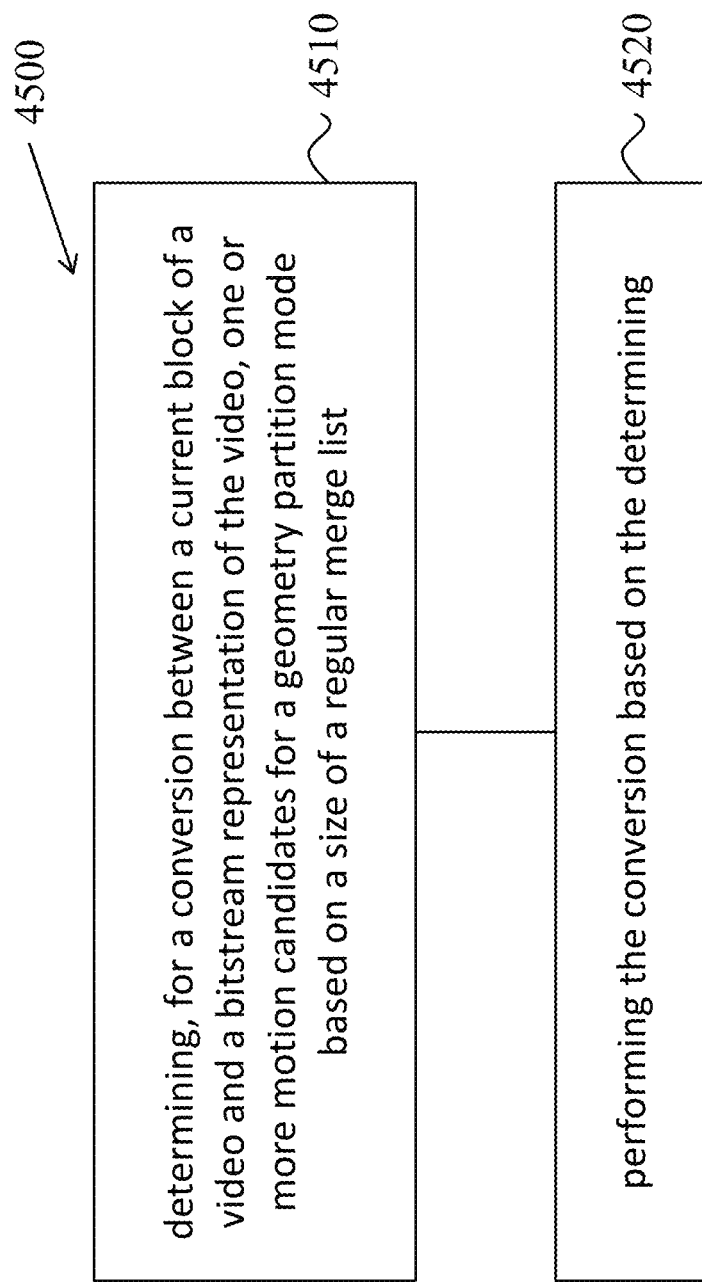
FIG. 45 is a flowchart representation of another method for video processing in accordance with the present disclosure.

FIG. 45 is a flowchart representation of a method 4500 for video processing in accordance with the present disclosure. The method 4500 includes, at operation 4510, determining, for a conversion between a current block of a video and a bitstream representation of the video, one or more motion candidates for a geometry partition mode based on a size of a regular merge list. The geometry partition mode includes partitioning the current block into multiple partitions. The method 4500 also includes, at operation 4520, performing the conversion based on the determining.

In some embodiments, a number of the one or more motion candidates increases in case the size of the regular merge list is smaller than a size of a geometry partition mode candidate list. The one or more motion candidates include at least a virtual motion candidate or a default motion candidate. In some embodiments, a candidate index of a motion candidate signaled in the bitstream is smaller than the size of the regular merge list. In some embodiments, a candidate index of a motion candidate signaled in the bitstream is smaller than a maximum number of merge candidates in the regular merge list used to derive the motion candidate. In some embodiments, the size of the regular merge list is same as a size of a geometry partition mode candidate list. In some embodiments, a size of a geometry partition mode candidate list signaled in the bitstream is smaller than or equal to the size of the regular merge list. In some embodiments, a size of a geometry partition mode candidate list signaled in the bitstream is smaller than or equal to P, P being an integer. In some embodiments, P=5. In some embodiments, a size of a geometry partition mode candidate list signaled in the bitstream is larger than or equal to Q, Q being an integer. In some embodiments, Q is 0 or 1. In some embodiments, a size of a geometry partition mode candidate list is signaled in the bitstream. In some embodiments, the size of the geometry partition mode candidate list is binarized as a truncated unary code. In some embodiments, a difference between the size of the regular merge list and a size of a geometry partition mode candidate list is signaled in the bitstream. In some embodiments, the difference is binarized as a truncated unary code.

Figure 46:
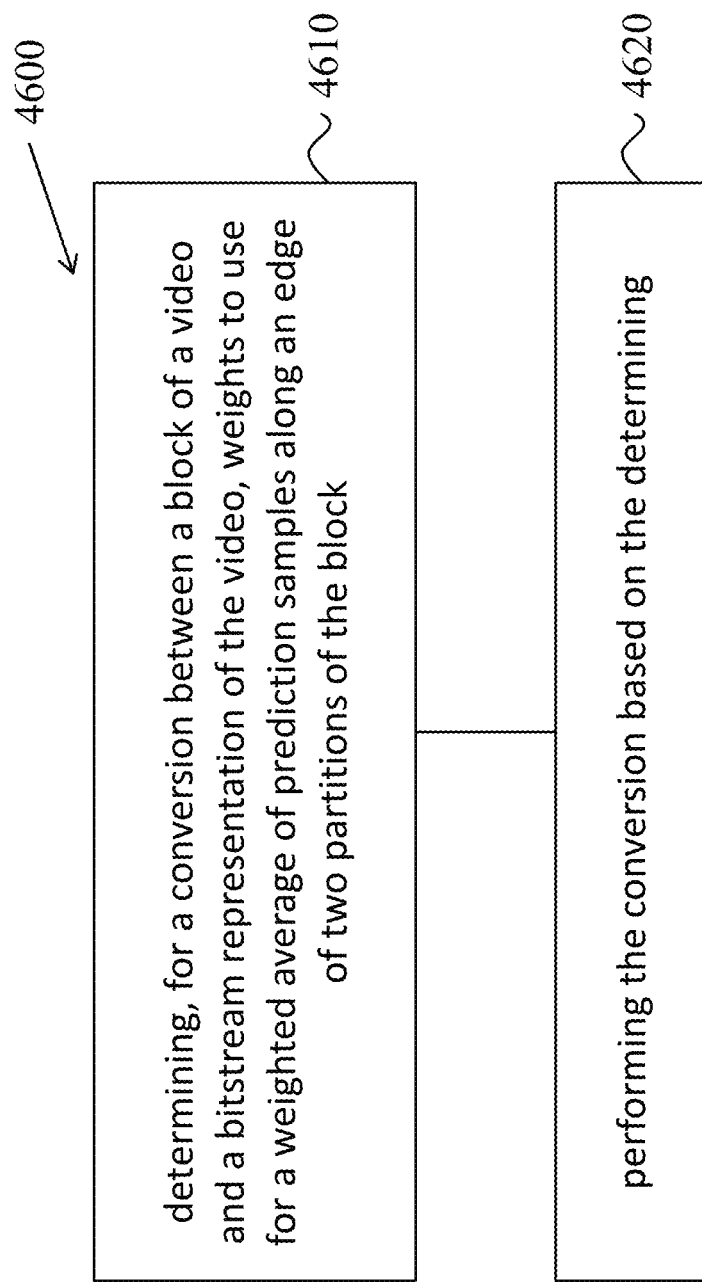
FIG. 46 is a flowchart representation of another method for video processing in accordance with the present disclosure.

FIG. 46 is a flowchart representation of a method 4600 for video processing in accordance with the present disclosure. The method 4600 includes, at operation 4610, determining, for a conversion between a block of a video and a bitstream representation of the video, weights to use for a weighted average of prediction samples along an edge of two partitions of the block. The two partitions are generated according to a geometry partition mode. The weights are selected from a first weighting factor group that at least one of the weights is equal to 0 or 1. The method 4600 also includes, at operation 4620, performing the conversion based on the determining.

In some embodiments, the first weighting factor group comprises all 0 values or all 1 values, and a final prediction result of the block is determined based on motion information of only one of the two partitions. In some embodiments, motion information of all sub-blocks of the block is stored in uni-prediction mode. In some embodiments, the method comprises determining whether the first weighting factor group is applicable to a sub-block of the block based on a position of the sub-block.

Figure 47:
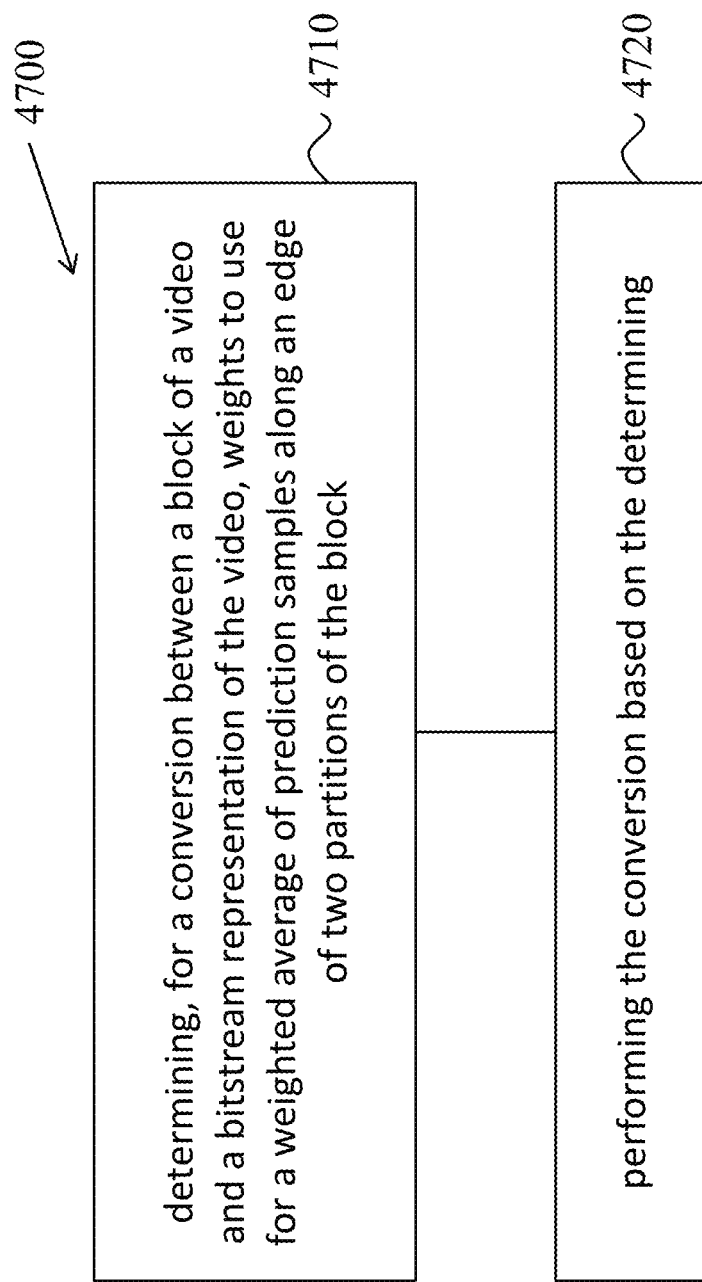
FIG. 47 is a flowchart representation of another method for video processing in accordance with the present disclosure.

FIG. 47 is a flowchart representation of a method 4700 for video processing in accordance with the present disclosure. The method 4700 includes, at operation 4710, determining, for a conversion between a block of a video and a bitstream representation of the video, weights to use for a weighted average of prediction samples along an edge of two partitions of the block. The two partitions are generated according to a geometry partition mode. The weights are selected from a first weighting factor group of at least two weighting factor groups based on a characteristic of the block. The method 4700 also includes, at operation 4720, performing the conversion based on the determining.

In some embodiments, the characteristic comprises a coding mode of the block, a precision of a motion vector of the block, a color characteristic of the block, or an indicator indicating a latency attribute of the block. In some embodiments, the weights are selected from the first weighting factor group in case at least one reference picture of the current block is located in a current picture that includes the current block. In some embodiments, the weights are selected from the first weighting factor group in case all motion vectors of the two partitions have an integer precision. In some embodiments, the weights are selected from the first weighting factor group in case the current block is a chroma block.

In some embodiments, a first motion vector associated with a first partition is denoted as Mv0(x0, y0) a second motion vector associated with a second partition is denoted as Mv1(x1, y1). The second motion vector is scaled as Mv1'(x1', y1') according to a reference picture that the first motion vector points to. The weights are selected from the first weighting factor group based on a function F with respect to x1', x0, y1', y0. In some embodiments, weights in a second weighting factor group are used in case a value of the function F is larger than or equal to a threshold. In some embodiments, the threshold is predefined. In some embodiments, the threshold is 16<<MV_PRECISION, where << represents a left-shift operation, and MV_PRECISION represents a precision of a stored motion vector. In some embodiments, MV_PRECISION is set to 4 in case the precision of the stored motion vector is 1/16-pel. In some embodiments, the threshold is signaled in a sequence parameter set (SPS), a video parameter set (VPS), a picture parameter set (PPS), a picture header, a slice header, a tile group header, a coding tree unit (CTU), or a region. In some embodiments, the threshold varies for different blocks having different characteristics.

In some embodiments, the characteristics include a coding mode, a dimension, a slice type, a tile type, or a picture type. In some embodiments, F is max(abs(x1'−x0), abs (y1'−y0)). In some embodiments, F is min(abs(x1'−x0), abs (y1'−y0)). In some embodiments, F is abs(x1'−x0)+abs (y1'−y0). In some embodiments, F is an average of Mv0 and Mv1'. In some embodiments, two reference pictures of the two partitions are same, and the two reference pictures are different than a current reference picture in which the block is located.

In some embodiments, the weights are selected from the first weighting factor group based on a characteristic associated with one or more reference pictures of the block. In some embodiments, the characteristic comprises a picture-order-count (POC) distance between two reference pictures of the block. In some embodiments, the characteristic comprises a picture-order-count (POC) distance between a reference picture of the block and a current picture in which the block is located.

Figure 48:
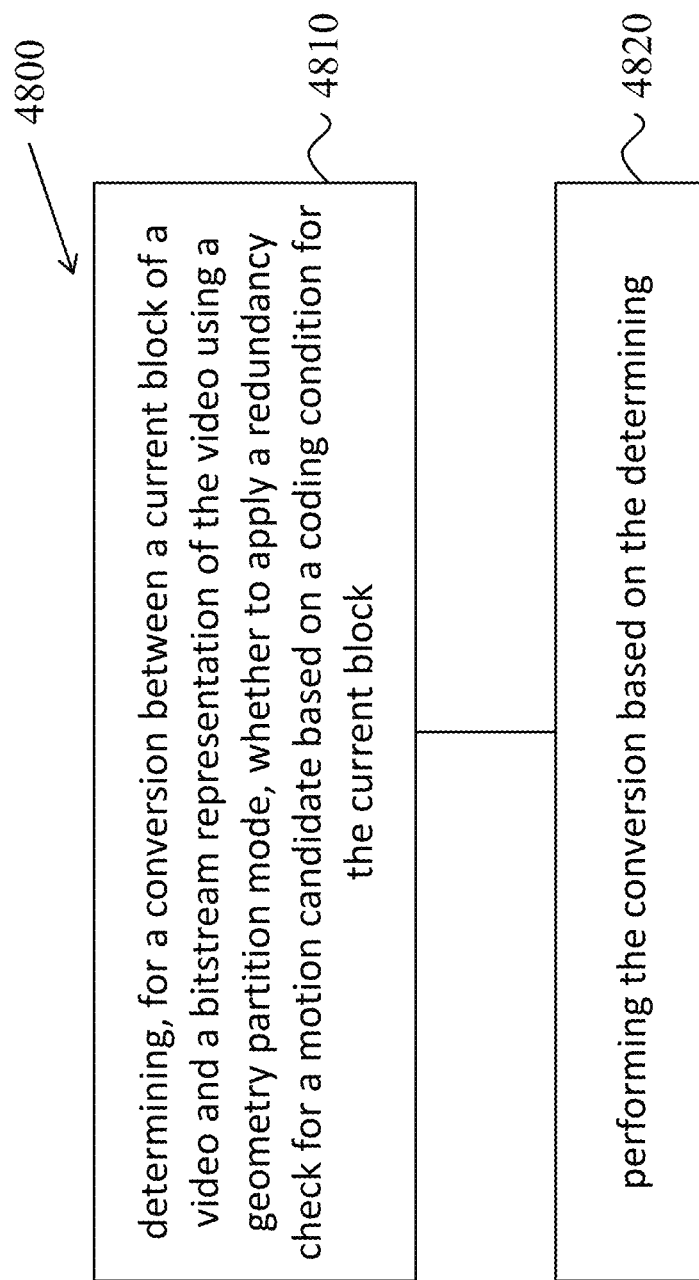
FIG. 48 is a flowchart representation of another method for video processing in accordance with the present disclosure.

FIG. 48 is a flowchart representation of a method 4800 for video processing in accordance with the present disclosure. The method 4800 includes, at operation 4810, determining, for a conversion between a current block of a video and a bitstream representation of the video using a geometry partition mode, whether to apply a redundancy check for a motion candidate based on a coding condition for the current block. The motion candidate is derived from one or more regular merge candidates for the geometry partition mode. The method 4800 also includes, at operation 4820, performing the conversion based on the determining.

In some embodiments, the coding condition depends on whether a redundancy check was used in generating the one or more regular merge candidates. In some embodiments, the coding condition depends on whether the one or more regular merge candidates are bi-prediction regular merge candidates. In some embodiments, the coding condition depends on whether the one or more regular merge candidates are uni-prediction regular merge candidates. In some embodiments, the redundancy check is applied against other motion candidates in the candidate list in case the regular merge candidate is a bi-prediction regular merge candidate. In some embodiments, the redundancy check is applied against first L motion candidates in the candidate list, L being a positive integer. In some embodiments, the redundancy check is applied against last L motion candidates in the candidate before adding the motion candidate, L being a positive integer. In some embodiments, the redundancy check is applied against other motion candidates in the candidate list in case the regular merge candidate is a uni-prediction regular merge candidate. In some embodiments, the redundancy check is applied against first L motion candidates in the candidate list, L being a positive integer. In some embodiments, the redundancy check is applied against last L motion candidates in the candidate list before adding the motion candidate, L being a positive integer. In some embodiments, L is 1 or 2.

In some embodiments, the redundancy check is applied only against motion candidates that are derived from uni-prediction regular merge candidates. In some embodiments, whether the redundancy check is applicable to the motion candidate is based on a prediction direction of the motion candidate. In some embodiments, whether the redundancy check is applicable to the motion candidate is based on whether the motion candidate is derived based on a reference picture List 0 or reference picture List 1 of the regular merge candidate, the regular merge candidate being a bi-prediction regular merge candidate. In some embodiments, the redundancy check is skipped in case the motion candidate is derived based on the reference picture List 0 of the regular merge candidate. In some embodiments, the redundancy check is applied in case the motion candidate is derived based on the reference picture List 1 of the regular merge candidate. In some embodiments, the redundancy check is applied against another motion candidate derived based on the reference picture List 0 of the regular merge candidate. In some embodiments, the redundancy check is applied against first L motion candidates in the candidate list, L being a positive integer. In some embodiments, the redundancy check is applied against last L motion candidates in the candidate list before adding the motion candidate, L being a positive integer. In some embodiments, L is 1 or 2.

In some embodiments, the redundancy check is applicable varies for different blocks, different regions, different tiles, or different tile groups. In some embodiments, whether the redundancy check is applicable is based on a prediction direction of a first motion candidate in the candidate list. In some embodiments, whether the redundancy check is applicable is based on a prediction direction of a last motion candidate in the candidate list. In some embodiments, whether the redundancy check is applicable to the motion candidate is based on available candidates in the candidate list.

In some embodiments, whether the redundancy check is applicable to the motion candidate is based on an index of the regular merge candidate. In some embodiments, the redundancy check is skipped when the index is greater than a threshold. In some embodiments, the regular merge candidate is a first bi-prediction regular merge candidate. In some embodiments, the redundancy check is applied in case the candidate list includes other candidate derived from uni-prediction regular merge candidates before adding the motion candidate. In some embodiments, the redundancy check is applied to the motion candidate to discard the motion candidate in case the motion candidate is identical or similar to a last motion candidate derived from a uni-prediction regular merge candidate.

In some embodiments, whether the redundancy check is applicable to the motion candidate is based on a dimension of the current block. In some embodiments, the redundancy check is skipped in case a width or a height of the current block is greater than a threshold. In some embodiments, whether the redundancy check is applicable to the motion candidate is based on an indication of latency in the bitstream. In some embodiments, whether the redundancy check is applicable to the motion candidate is based on reference pictures in reference picture lists of the current block. In some embodiments, the redundancy check is performed in case picture-order-count (POC) values of all reference pictures in one or both reference picture lists are smaller than a POC value of a current picture in which the current block is located. In some embodiments, the redundancy check is performed in case picture-order-count (POC) values of all reference pictures in one or both reference picture lists are smaller or equal to a POC value of a current picture in which the current block is located. In some embodiments, whether the redundancy check is applicable to the motion candidate is based on whether the two reference picture lists include at least one common reference picture.

In some embodiments, a limited redundancy check is applied to motion candidates in the candidate list. In some embodiments, a number of motion candidates to be checked for redundancy is limited to K. In some embodiments, the redundancy check is skipped in case the number of motion candidates that have been checked for redundancy reaches K. In some embodiments, in case the number of motion candidates that have been checked for redundancy is smaller than K, the redundancy check is applied against a subset of candidates in the candidate list. In some embodiments, a number of times that the motion candidate is compared against other motion candidates is limited to K. In some embodiments, the redundancy check is skipped in case the motion candidate has been compared against other motion candidates for K times. In some embodiments, in case the motion candidate has been compared against other motion candidates less than K times, the redundancy check is applied against a subset of candidates in the candidate list. In some embodiments, the subset of candidates is based on a number of available regular merge candidates. In some embodiments, the subset of candidates is based on a number of motion candidates for the geometry partition mode before any redundancy check is performed. In some embodiments, the subset of candidates is based on at least one of: a dimension of the current block, a slice, a picture, a tile type, or an indication of latency in the bitstream. In some embodiments, the subset of candidates is based on a set of regular merge candidates that the subset of candidates is derived from. In some embodiments, in case the redundancy check is applied to the motion candidate, a redundancy check is skipped in a derivation process to determine regular merge candidates. In some embodiments, the redundancy check is skipped for the motion candidate in case a redundancy check has been used in generating the one or more regular merge candidates.

Figure 49:
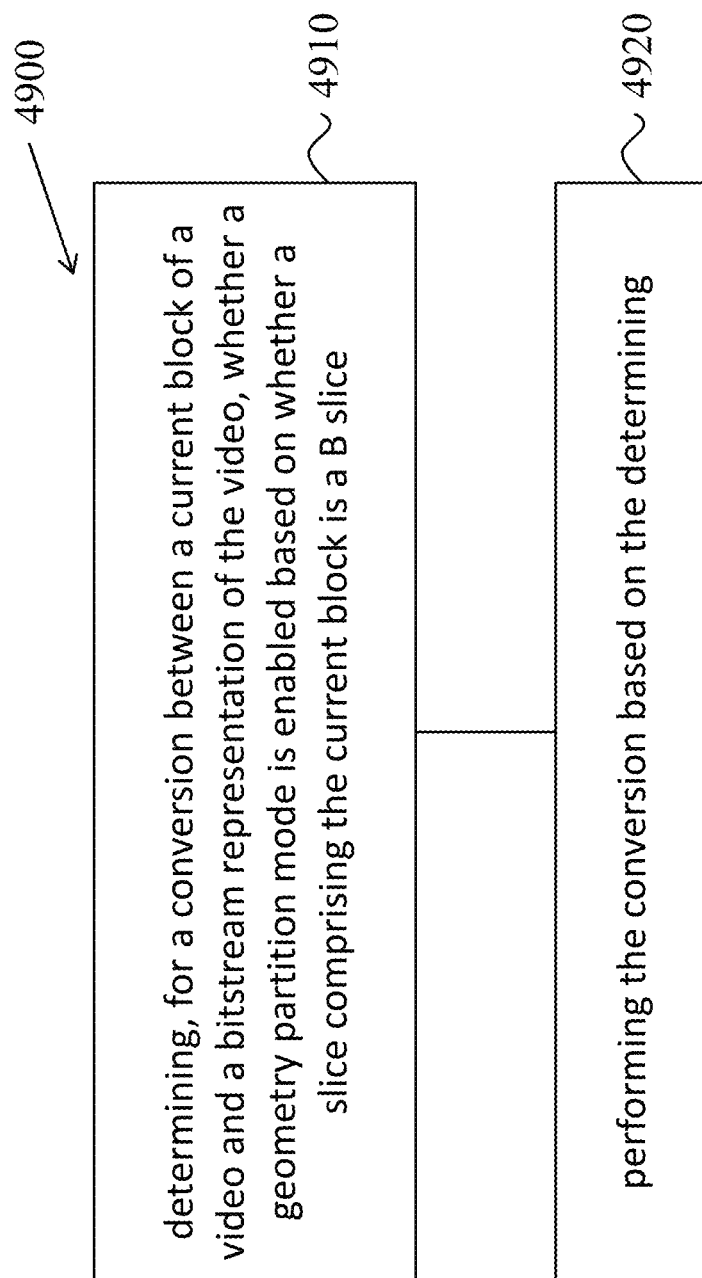
FIG. 49 is a flowchart representation of another method for video processing in accordance with the present disclosure.

FIG. 49 is a flowchart representation of a method 4900 for video processing in accordance with the present disclosure. The method 4900 includes, at operation 4910, determining, for a conversion between a current block of a video and a bitstream representation of the video, whether a geometry partition mode is enabled based on whether a slice comprising the current block is a B slice. The geometry partition mode includes partitioning the current block into multiple partitions. The method 4900 also includes, at operation 4920, performing the conversion based on the determining.

In some embodiments, the determining is performed without checking an indicator in a sequence parameter set in the bitstream. In some embodiments, the determining is based on an indicator at a video level, picture level, a tile level, or a slice level in the bitstream representation. In some embodiments, the determining is based on an indicator in a video parameter set (VPS), a picture parameter set (PPS), a slice header, a tile group header, or a picture header in the bitstream representation. In some embodiments, the determining is based on only an indicator in a sequence parameter set in the bitstream indicating that the geometry partition mode is disabled for an entire sequence, and the bitstream excludes additional indicators in a video parameter set (VPS), a picture parameter set (PPS), a slice header, a tile group header, or a picture header. In some embodiments, the bitstream excludes any indicator indicating whether the geometry partition mode is enabled or disabled in case the slice is not a B slice. In some embodiments, the determining is performed without checking an indicator at a block level in case an indicator at a picture level, a tile level, or a slice level indicates that the geometry mode is disabled.

In some embodiments of the above methods, the current block is split into multiple partitions based on at least one splitting pattern. In some embodiments, the geometry partition mode comprises a triangular partitioning mode. In some embodiments, at least one of the multiple partitions partitioned in the geometry partition mode is a non-square and non-rectangular block.

Figure 50:
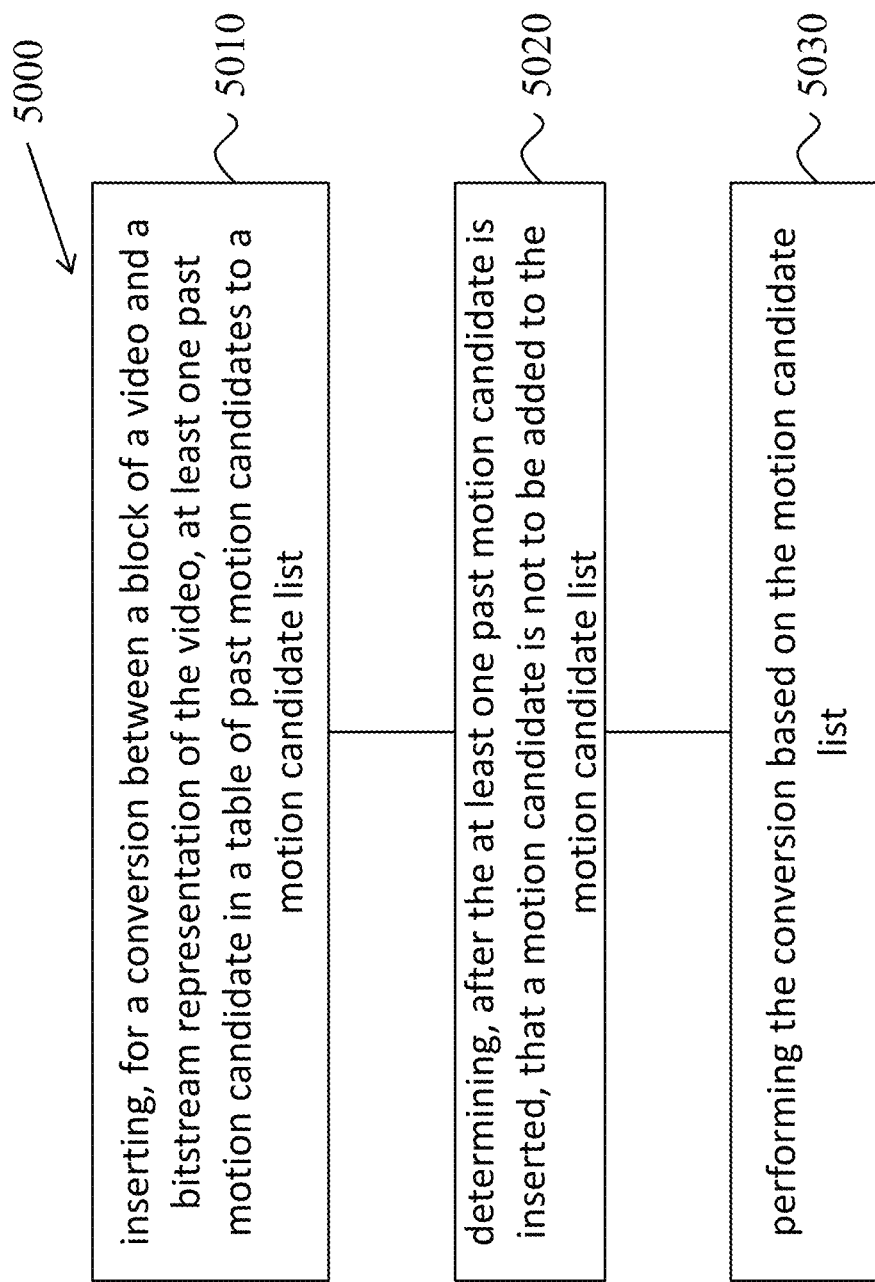
FIG. 50 is a flowchart representation of another method for video processing in accordance with the present disclosure.

FIG. 50 is a flowchart representation of a method 5000 for video processing in accordance with the present disclosure. The method 5000 includes, at operation 5010, inserting, for a conversion between a block of a video and a bitstream representation of the video, at least one past motion candidate in a table of past motion candidates to a motion candidate list. The table of past motion candidates is derived based on past conversions. The method 5000 includes, at operation 5020, determining, after the at least one past motion candidate is inserted, that a motion candidate is not to be added to the motion candidate list. The motion candidate is derived based on the table of past motion candidates. The method 5000 also includes, at operation 5030, performing the conversion based on the motion candidate list.

In some embodiments, the motion candidate list is a merge candidate list. In some embodiments, the past motion candidates in the table are History-based Motion Vector Prediction (HMVP) candidates. In some embodiments, the motion candidate is a pairwise average of two motion candidates. At least one of the two motion candidates is from the table of past motion candidates. In some embodiments, the motion candidate comprises a combined bi-predictive merge candidate that combines two bi-prediction candidates. At least one of the two bi-prediction candidates is from the table of past motion candidates.

Figure 51:
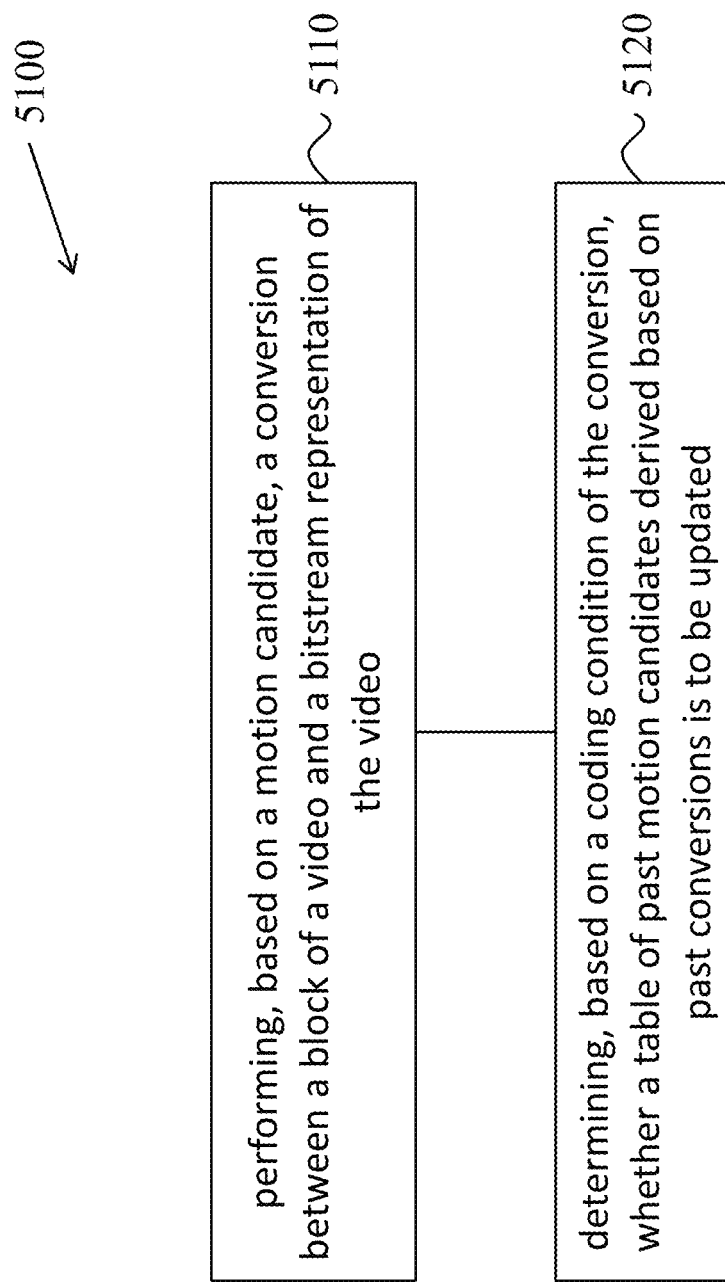
FIG. 51 is a flowchart representation of another method for video processing in accordance with the present disclosure.

FIG. 51 is a flowchart representation of a method 5100 for video processing in accordance with the present disclosure. The method 5100 includes, at operation 5110, performing, based on a motion candidate, a conversion between a block of a video and a bitstream representation of the video. The method 5100 also includes, at operation 5120, determining, based on a coding condition of the conversion, whether a table of past motion candidates derived based on past conversions is to be updated.

In some embodiments, the table is not to be updated in case the coding condition indicates that the block is coded using the motion candidate. In some embodiments, past motion candidates in the table are History-based Motion Vector Prediction (HMVP) candidates. In some embodiments, the method comprises, for the conversion, adding at least one past candidate in the table of past motion candidates to a motion candidate list and adding, after the at least one past candidate is added, the motion candidate to the motion candidate list. In some embodiments, the motion candidate comprises a pairwise average bi-prediction candidate. In some embodiments, the motion candidate comprises a combined bi-predictive motion candidate. In some embodiments, the motion candidate comprises a zero motion candidate. In some embodiments, the motion candidate comprises a default motion candidate.

In some embodiments, the coding condition is associated with a dimension of the block. In some embodiments, the table is not to be updated in case the coding condition indicates that a width or a height of the block is smaller than or equal to M, M being a positive integer. In some embodiments, M is 4. In some embodiments, the table is not to be updated in case the coding condition indicates that a width is smaller than or equal to M1 and a height of the block is smaller or equal to M2, M1 and M2 being a positive integer. In some embodiments, M1 is 4 and M2 is 4.

Figure 52:
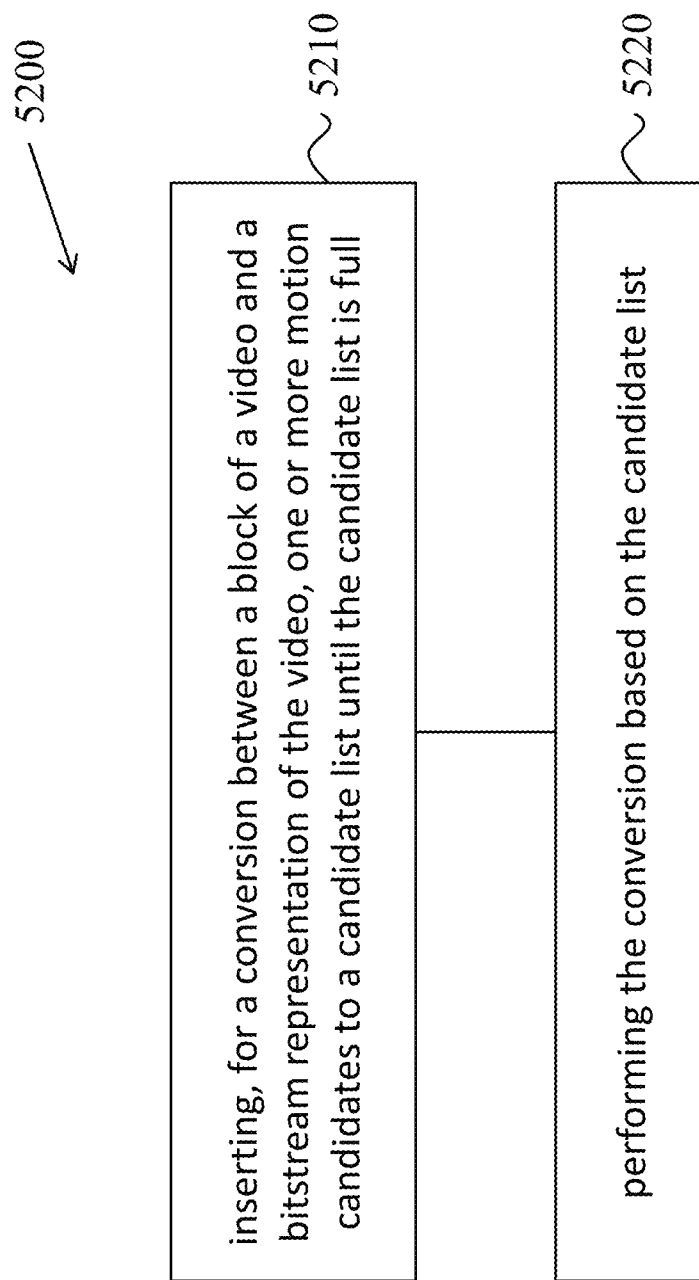
FIG. 52 is a flowchart representation of another method for video processing in accordance with the present disclosure.

FIG. 52 is a flowchart representation of a method 5200 for video processing in accordance with the present disclosure. The method 5200 includes, at operation 5210, inserting, for a conversion between a block of a video and a bitstream representation of the video, one or more motion candidates to a candidate list until the candidate list is full. The one or more motion candidates are determined according to a table of past motion candidates derived based on past conversions. The method 5200 includes, at operation 5220, performing the conversion based on the candidate list.

In some embodiments, past motion candidates in the table are History-based Motion Vector Prediction (HMVP) candidates. In some embodiments, the one or more motion candidates comprises a first or a last candidate in the table of past motion candidates. In some embodiments, the first candidate or the last candidate is inserted repeatedly. In some embodiments, the one or more motion candidates comprises multiple candidates in the table of past motion candidates. In some embodiments, the inserting is performed in case the table of past motion candidates is not empty. In some embodiments, the table of past motion candidates is empty, and the one or more motion candidates comprises an available candidate of the block.

Figure 53:
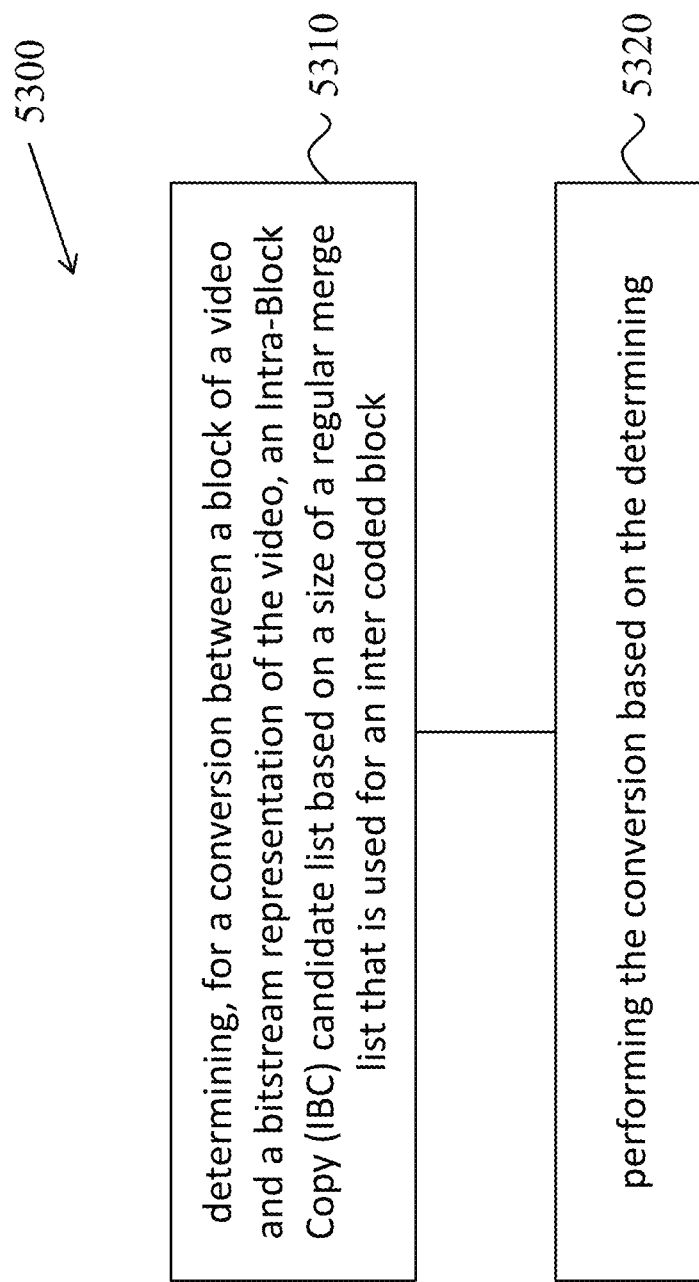
FIG. 53 is a flowchart representation of another method for video processing in accordance with the present disclosure.

FIG. 53 is a flowchart representation of a method 5300 for video processing in accordance with the present disclosure. The method 5300 includes, at operation 5310, determining, for a conversion between a block of a video and a bitstream representation of the video, an Intra-Block Copy (IBC) candidate list based on a size of a regular merge list that is used for an inter coded block. The IBC represents a technique in which the block is reconstructed based on previously coded samples in a same picture of the block. The method 5300 includes, at operation 5320, performing the conversion based on the determining.

In some embodiments, the IBC merge candidate list comprises at least one virtual or default IBC candidate in case a size of the IBC merge candidate list is larger than the size of the regular merge list. In some embodiments, the bitstream comprises an IBC merge candidate index that is always smaller than the size of the regular merge list. In some embodiments, the bitstream representation comprises an IBC merge candidate index that is always smaller than a maximum number of regular merge candidates used to derive IBC merge candidates in the IBC merge candidate list. In some embodiments, a size of the IBC merge candidate list is same as the size of the regular merge list. In some embodiments, a size of the IBC merge candidate list is smaller than the size of the regular merge list.

Figure 54:
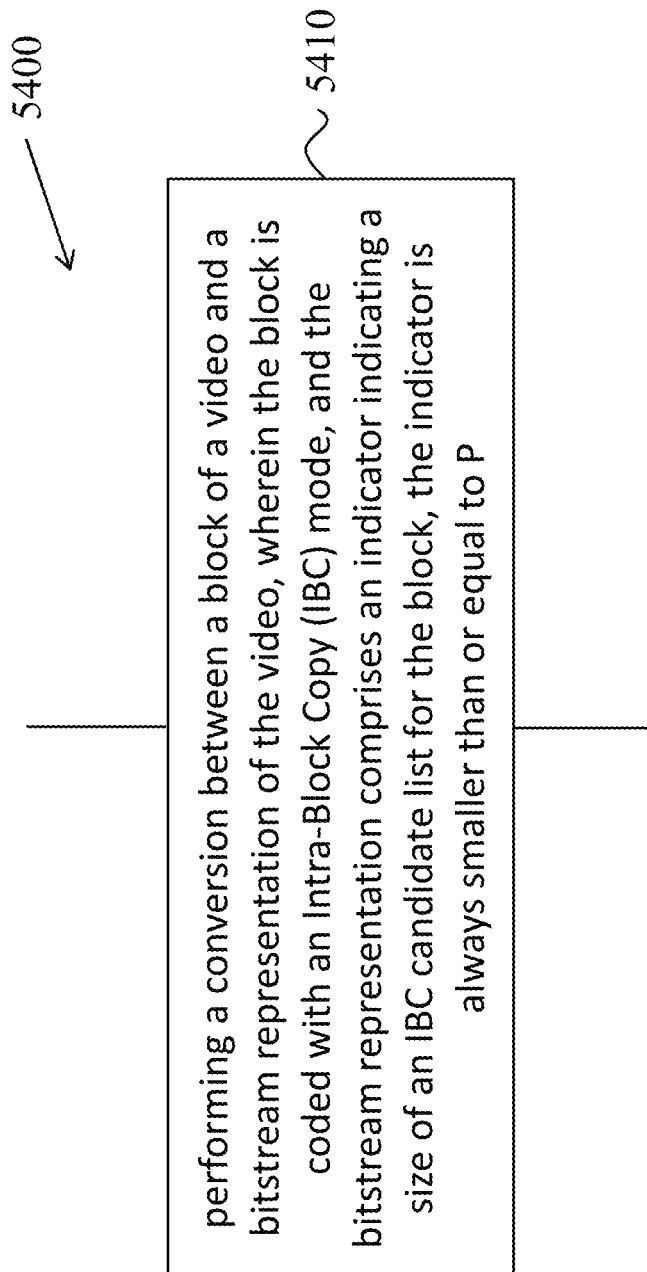
FIG. 54 is a flowchart representation of another method for video processing in accordance with the present disclosure.

FIG. 54 is a flowchart representation of a method 5400 for video processing in accordance with the present disclosure. The method 5400 includes, at operation 5410, performing a conversion between a block of a video and a bitstream representation of the video. The block is coded with an Intra-Block Copy (IBC) mode, and the bitstream representation comprises an indicator indicating a size of an IBC candidate list for the block. The indicator is always smaller than or equal to P, P being a positive integer. The IBC represents a technique in which the block is reconstructed based on previously coded samples in a same picture of the block. In some embodiments, P is 5 or 6.

Figure 55:
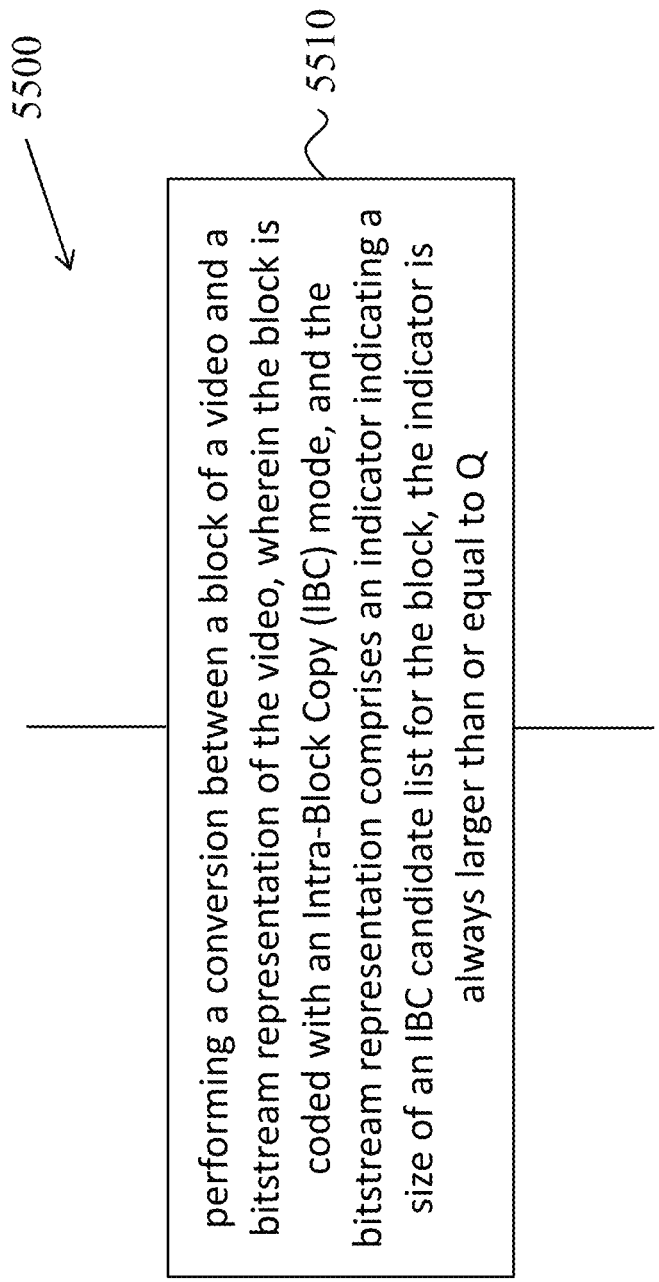
FIG. 55 is a flowchart representation of another method for video processing in accordance with the present disclosure.

FIG. 55 is a flowchart representation of a method 5500 for video processing in accordance with the present disclosure. The method 5500 includes, at operation 5510, performing a conversion between a block of a video and a bitstream representation of the video. The block is coded with an Intra-Block Copy (IBC) mode, and the bitstream representation comprises an indicator indicating a size of an IBC candidate list for the block. The indicator is always larger than or equal to Q, Q being a non-negative integer. The IBC represents a technique in which the block is reconstructed based on previously coded samples in a same picture of the block. In some embodiments, Q is 0 or 1.

Figure 56:
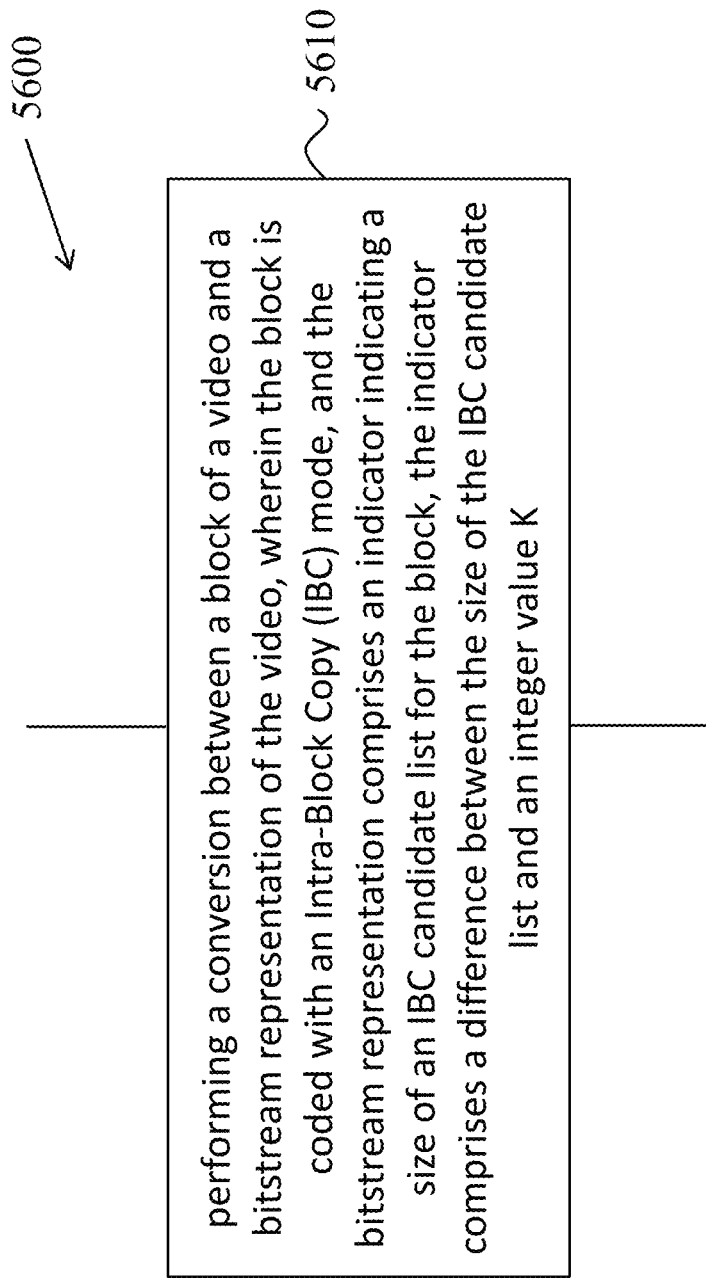
FIG. 56 is a flowchart representation of another method for video processing in accordance with the present disclosure.

FIG. 56 is a flowchart representation of a method 5600 for video processing in accordance with the present disclosure. The method 5600 includes, at operation 5610, performing a conversion between a block of a video and a bitstream representation of the block. The block is coded with an Intra-Block Copy (IBC) mode, and the bitstream representation comprises an indicator indicating a size of an IBC candidate list. The indicator comprises a difference between the size of the IBC candidate list and an integer value K.

In some embodiments, the IBC candidate list comprises an IBC merge candidate list or an IBC advanced motion vector prediction (AMVP) candidate list. In some embodiments, the indicator is binarized as a truncated unary code.

In some embodiments, the integer value K is 5 or 6. In some embodiments, the integer value K is a size of a regular merge candidate list.

Figure 57:
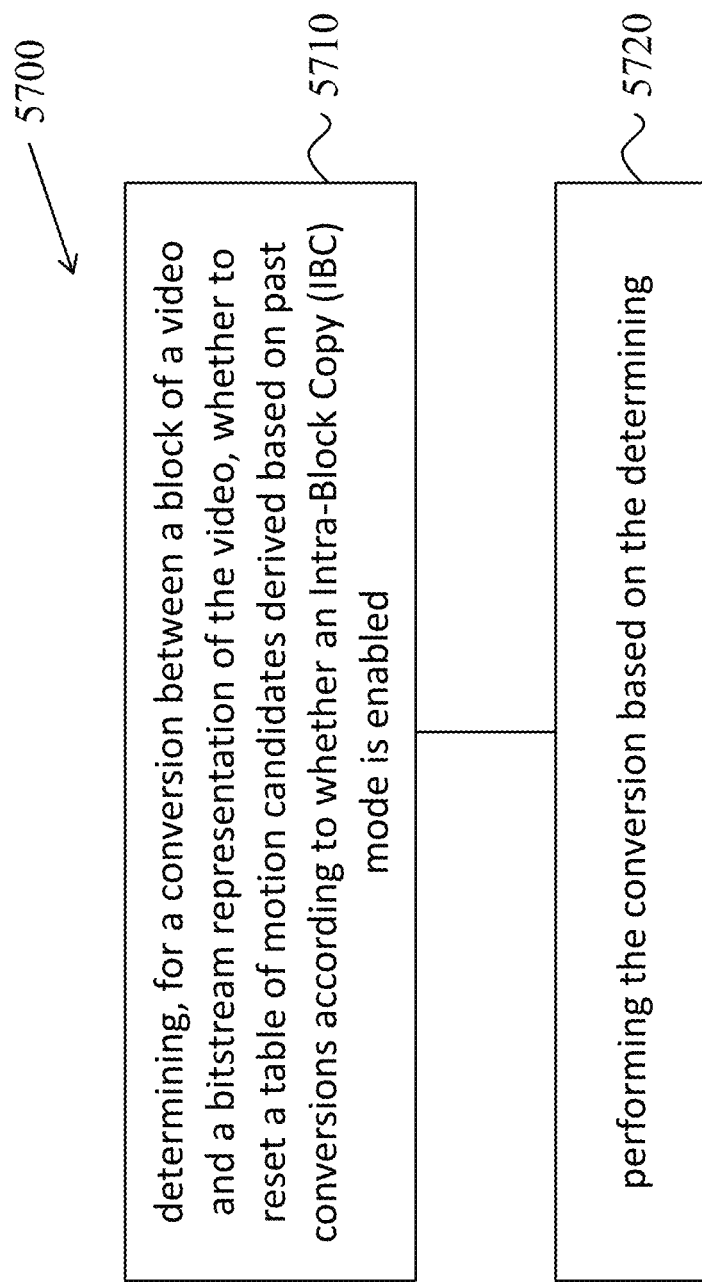
FIG. 57 is a flowchart representation of yet another method for video processing in accordance with the present disclosure.

FIG. 57 is a flowchart representation of a method 5700 for video processing in accordance with the present disclosure. The method 5700 includes, at operation 5710, determining, for a conversion between a block of a video and a bitstream representation of the video, whether to reset a table of motion candidates derived based on past conversions according to whether an Intra-Block Copy (IBC) mode is enabled. The IBC represents a technique in which the block is reconstructed based on previously coded samples in a same picture. The method 5700 also includes, at operation 5720, performing the conversion based on the determining.

In some embodiments, the table of motion candidates is reset before processing a first region in case the IBC mode is enabled for the first region, the first region including a sequence, slice, a tile group, or a video coding data unit. In some embodiments, the first region comprises an I-slice or an I-tile group. In some embodiments, the table of motion candidates is reset prior to processing a new region. In some embodiments, the new region comprises a coding tree unit (CTU) row, a slice, a tile, or a tile group.

In some of the above methods, performing the conversion includes generating the bitstream representation based on the current block of the video. In some embodiments, performing the conversion includes generating the current block of the video from the bitstream representation.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   determining, for a conversion between a block of a video and a bitstream of the video, weights to use for a weighted average of prediction samples along an edge of two partitions of the block, wherein the two partitions are generated according to a geometry partition mode, wherein the weights are selected from a first weighting factor group of at least two weighting factor groups based on a first motion vector associated with a first partition and a second motion vector associated with a second partition; and
   performing the conversion based on the determining,
   wherein the first motion vector associated with the first partition is denoted as $Mv0(x0, y0)$, the second motion vector associated with the second partition is denoted as $Mv1(x1, y1)$, and wherein the second motion vector is scaled as $Mv1'(x1', y1')$ according to a reference picture that the first motion vector points to, and
   wherein the weights in the first weighting factor group are used in a case that a value of a function F with respect to $(x1', x0, y1', y0)$ is larger than or equal to a threshold, and
   wherein the threshold varies for different blocks having different characteristics.

2. The method of claim 1, wherein the weights are selected from the first weighting factor group in a case that at least one reference picture of the block is located in a current picture that includes the block, in a case that all motion vectors of the two partitions have an integer precision, or in a case the block is a chroma block.

3. The method of claim 1, wherein the threshold is predefined or the threshold is signaled in a sequence parameter set (SPS), a video parameter set (VPS), a picture parameter set (PPS), a picture header, a slice header, a tile group header, a coding tree unit (CTU), or a region.

4. The method of claim 3, wherein in a case where the threshold is predefined, the threshold is 16<<MV_PRECISION, wherein << represents a left-shift operation, and wherein MV_PRECISION represents a precision of a stored motion vector.

5. The method of claim 4, wherein MV_PRECISION is set to 4 in case the precision of the stored motion vector is $\frac{1}{16}$-pel.

6. The method of claim 1, wherein the characteristics include a coding mode, a dimension, a slice type, a tile type, or a picture type.

7. The method of claim 1, wherein F is max(abs(x1'−x0), abs (y1'−y0)), min(abs(x1'−x0), abs (y1'−y0)), abs(x1'−x0)+ abs (y1'−y0) or an average of Mv0 and Mv1'.

8. The method of claim 1, wherein two reference pictures of the two partitions are same, and wherein the two reference pictures are different than a current reference picture in which the block is located.

9. The method of claim 1, wherein the weights are selected from the first weighting factor group based on a characteristic associated with one or more reference pictures of the block.

10. The method of claim 9, wherein the characteristic comprises at least one of a picture-order-count (POC) distance between two reference pictures of the block, and a picture-order-count (POC) distance between a reference picture of the block and a current picture in which the block is located.

11. The method of claim 1, wherein the block is split into multiple partitions based on at least a splitting pattern.

12. The method of claim 1, wherein the geometry partition mode comprises a triangular partitioning mode.

13. The method of claim 1, wherein at least one of the multiple two partitions partitioned in the geometry partition mode is a non-square and non-rectangular block.

14. The method of claim 1, wherein the conversion includes encoding the block of the video into the bitstream.

15. The method of claim 1, wherein the conversion includes decoding the block of the video from the bitstream.

16. An apparatus for processing video data comprising a processor and a non-transitory memory with instructions thereon, wherein the instructions upon execution by the processor, cause the processor to:
   determine, for a conversion between a block of a video and a bitstream of the video, weights to use for a weighted average of prediction samples along an edge of two partitions of the block, wherein the two partitions are generated according to a geometry partition mode, wherein the weights are selected from a first weighting factor group of at least two weighting factor groups based on a first motion vector associated with a first partition and a second motion vector associated with a second partition; and
   perform the conversion based on the determining,
   wherein the first motion vector associated with the first partition is denoted as $Mv0(x0, y0)$, the second motion vector associated with the second partition is denoted as $Mv1(x1, y1)$, and wherein the second motion vector is scaled as $Mv1'(x1', y1')$ according to a reference picture that the first motion vector points to, and
   wherein the weights in the first weighting factor group are used in a case a value of a function F with respect to ($x1'$, $x0$, $y1'$, $y0$) is larger than or equal to a threshold, and wherein the threshold varies for different blocks having different characteristics.

17. The apparatus of claim 16, wherein the characteristics include a coding mode, a dimension, a slice type, a tile type, or a picture type.

18. The apparatus of claim 16, wherein F is max(abs($x1'$-$x0$), abs ($y1'$-$y0$)), min(abs($x1'$-$x0$), abs ($y1'$-$y0$)), abs($x1'$-$x0$)+abs ($y1'$-$y0$) or an average of Mv0 and Mv1'.

19. The apparatus of claim 16, wherein two reference pictures of the two partitions are same, and wherein the two reference pictures are different than a current reference picture in which the block is located.

20. A method for storing a bitstream of a video, wherein the method comprises:

determining, for generating the bitstream from a block of a video, weights to use for a weighted average of prediction samples along an edge of two partitions of the block, wherein the two partitions are generated according to a geometry partition mode, wherein the weights are selected from a first weighting factor group of at least two weighting factor groups based on a first motion vector associated with a first partition and a second motion vector associated with a second partition;

generating the bitstream based on the determining, and storing the bitstream in a non-transitory computer-readable recording medium, wherein a characteristic of the block comprises a precision of a motion vector of the block, or an indicator indicating a latency attribute of the block, wherein the first motion vector associated with the first partition is denoted as Mv0($x0$, $y0$), the second motion vector associated with the second partition is denoted as Mv1($x1$, $y1$), and wherein the second motion vector is scaled as Mv1'($x1'$, $y1'$) according to a reference picture that the first motion vector points to, and wherein the weights in the first weighting factor group are used in a case a value of a function F with respect to ($x1'$, $x0$, $y1'$, $y0$) is larger than or equal to a threshold, and wherein the threshold varies for different blocks having different characteristics.

* * * * *